United States Patent
Chourasiya

(10) Patent No.: US 10,521,248 B2
(45) Date of Patent: Dec. 31, 2019

(54) ELECTRONIC DEVICE AND METHOD THEREOF FOR MANAGING APPLICATIONS

(71) Applicant: Samsung Electronics Co., Ltd., Suwon-si, Gyeonggi-do (KR)

(72) Inventor: Abhishek Chourasiya, Jaipur (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 15/714,134

(22) Filed: Sep. 25, 2017

(65) Prior Publication Data

US 2018/0088966 A1 Mar. 29, 2018

(30) Foreign Application Priority Data

Sep. 26, 2016 (IN) .............................. 201641032853

(51) Int. Cl.
*G06F 3/048* (2013.01)
*G06F 9/451* (2018.01)
*G06F 3/0481* (2013.01)
*G06F 3/0484* (2013.01)
*G06F 3/0488* (2013.01)
*G06F 9/54* (2006.01)

(52) U.S. Cl.
CPC ............ *G06F 9/451* (2018.02); *G06F 3/0481* (2013.01); *G06F 3/0484* (2013.01); *G06F 3/04886* (2013.01); *G06F 9/54* (2013.01)

(58) Field of Classification Search
CPC ...... G06F 9/4443; G06F 9/54; G06F 3/04886; G06F 3/0481; G06F 3/0484; G06F 2203/04803; G06F 3/04883; G06F 9/451
See application file for complete search history.

(56) References Cited

U.S. PATENT DOCUMENTS

| | | | |
|---|---|---|---|
| 6,212,577 B1* | 4/2001 | Stern | G06F 9/451 719/329 |
| 8,766,922 B2* | 7/2014 | Kim | G06F 3/016 345/168 |
| 9,094,534 B2* | 7/2015 | Seymour | H04M 19/04 |
| 2008/0046837 A1* | 2/2008 | Beauchamp | G06F 3/0481 715/804 |
| 2008/0163082 A1 | 7/2008 | Rytivaara | |
| 2009/0031237 A1 | 1/2009 | Jessen et al. | |

(Continued)

FOREIGN PATENT DOCUMENTS

KR 10-2010-0078413 A 7/2010

OTHER PUBLICATIONS

European Office Action dated Jul. 18, 2019; Reference #: P268748EP/OKS; Application #/Patent #: 17853356.8-1224/3485358 PCT/KR2017010102.

*Primary Examiner* — Thanh T Vu
(74) *Attorney, Agent, or Firm* — Jefferson IP Law, LLP

(57) ABSTRACT

A method for managing applications of an electronic device is provided. The method includes displaying a graphical representation of at least one second application within a graphical representation of a first application, detecting a user input on at least one portion of the graphical representation of the at least one second application displayed in the at least one background portion of the graphical representation of the first application, and performing at least one action on the at least one second application based on the user input while accessing the first application.

24 Claims, 45 Drawing Sheets

(56) References Cited

U.S. PATENT DOCUMENTS

| | | |
|---|---|---|
| 2012/0289290 A1 | 11/2012 | Chae et al. |
| 2014/0095874 A1 | 4/2014 | Desai et al. |
| 2014/0165000 A1* | 6/2014 | Fleizach ............... H04M 19/04 715/810 |
| 2014/0289650 A1 | 9/2014 | Cotlarciuc |
| 2014/0351729 A1* | 11/2014 | Park ...................... G06F 9/451 715/767 |
| 2014/0359504 A1 | 12/2014 | Kim |
| 2015/0040145 A1 | 2/2015 | Partridge et al. |
| 2015/0227166 A1* | 8/2015 | Lee ........................ G06F 1/169 345/173 |
| 2015/0293664 A1* | 10/2015 | Burchell ............... G06F 3/0481 715/768 |
| 2016/0092081 A1 | 3/2016 | Reichie |

\* cited by examiner

FIG. 10B
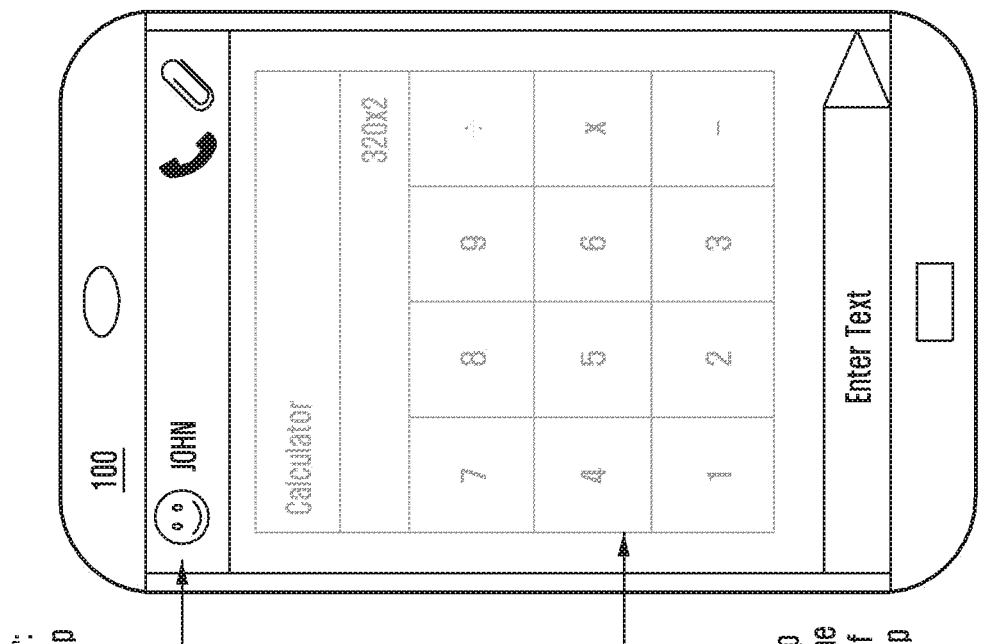
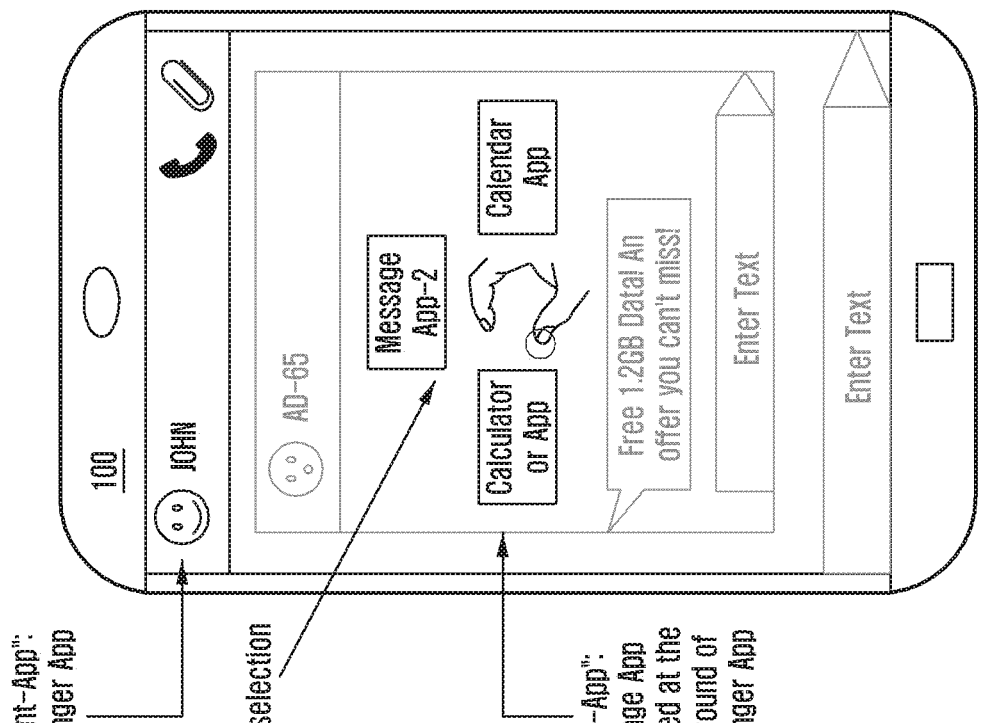

FIG. 20
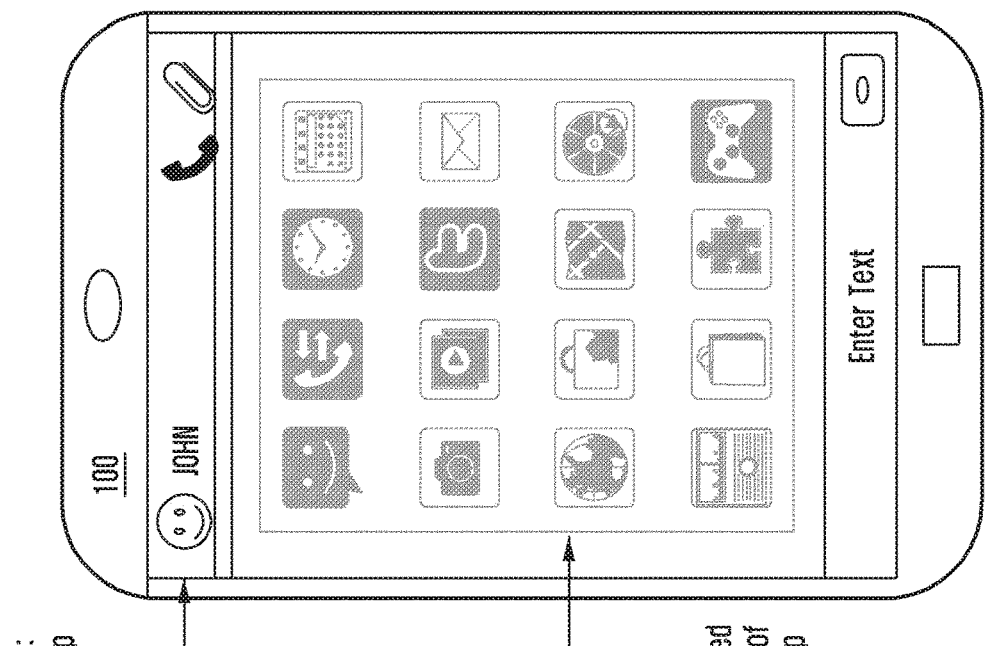
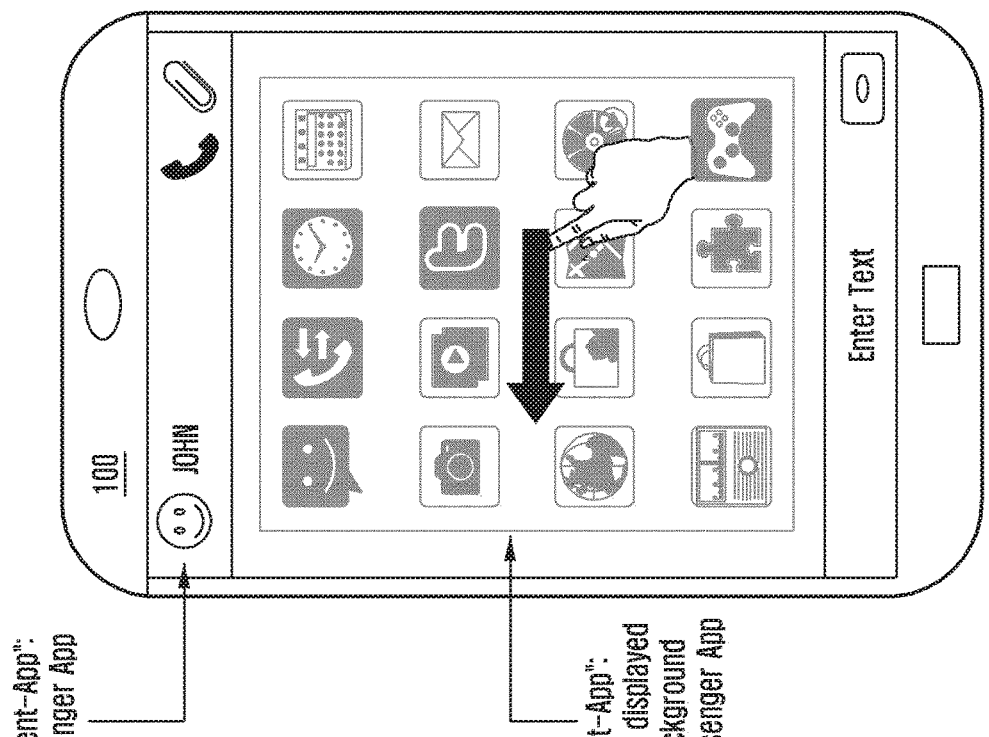

ELECTRONIC DEVICE AND METHOD THEREOF FOR MANAGING APPLICATIONS

CROSS-REFERENCE TO RELATED APPLICATION(S)

This application claims the benefit under 35 U.S.C. § 119(a) of an Indian patent application filed on Sep. 26, 2016, in the Indian Intellectual Property Office and assigned Serial number 201641032853, the entire disclosure of which is hereby incorporated by reference.

TECHNICAL FIELD

The present disclosure relates to electronic devices. More particularly, the present disclosure relates to an electronic device and method thereof for managing applications of the electronic device.

BACKGROUND

Generally, computing devices, especially mobile phones, are equipped with many useful applications for varying purposes. Often, a user is involved in operations using multiple applications or accessing/transferring information from a first application to a second application. The user may also need to perform operations, access data, or share information from one of the past program states of the first application to one of the past program states of the second application.

In systems and methods of the related art, mobile applications are opaque to other applications as well as to their past program states. Thus, in order to switch from the first application to the second application or another past program state, the user has to manually select the desired application. Further, multiple applications are simultaneously active thus consuming more power as well as more computation power. Further, the methods induce transparency only amongst the applications of the related art.

In another systems and methods of the related art, the user has to select the application with which the user wishes to interact (e.g., view or provide input) by varying a level of transparency associated with each displayed application layer. Thus, requiring multiple input methods for simultaneously handling the multiple applications.

SUMMARY

Aspects of the present disclosure are to address at least the above-mentioned problems and/or disadvantages and to provide at least the advantages described below. Accordingly, an aspect of the present disclosure is to provide a method for managing applications of an electronic device.

Another aspect of the present disclosure is to provide a method for detecting a user input on at least one portion of the graphical representation of the at least one second application displayed in the at least one background portion of the graphical representation of the first application.

Another aspect of the present disclosure is to provide a method for performing at least one action on the at least one second application based on the user input while accessing the first application.

Another aspect of the present disclosure is to provide a method for performing at least one action on at least one state of the at least one second application based on the second user input while accessing the first application.

In accordance with an aspect of the present disclosure, a method for managing applications of an electronic device is provided. The method includes displaying a graphical representation of at least one second application within a graphical representation of a first application, detecting a user input on at least one portion of the graphical representation of the at least one second application displayed in the at least one background portion of the graphical representation of the first application, and performing at least one action on the at least one second application based on the user input while accessing the first application.

In accordance with another aspect of the present disclosure, a method for managing applications of an electronic device is provided. The method includes displaying a graphical representation of at least one second application within a graphical representation of a first application, detecting a first user input on at least one portion of the graphical representation of the at least one second application, displaying a graphical representation of at least one state of the at least one second application within the graphical representation of the first application based on the user input, detecting a second user input on at least one portion of the graphical representation of the at least one second application, and performing at least one action on at least one state of the at least one second application based on the second user input while accessing the first application.

In accordance with another aspect of the present disclosure, an electronic device for managing applications is provided. The electronic device includes a memory unit, a controller unit, coupled to the memory unit, configured to display a graphical representation of at least one second application within a graphical representation of a first application. Further, the controller unit is configured to detect a user input on at least one portion of the graphical representation of the at least one second application displayed in the at least one background portion of the graphical representation of the first application. Further, the controller unit is configured to perform at least one action on the at least one second application based on the user input while accessing the first application.

In accordance with another aspect of the present disclosure, an electronic device for managing applications is provided. The electronic device includes a memory unit, and a controller unit, coupled to the memory unit, configured to display a graphical representation of at least one second application within a graphical representation of a first application. Further, the controller unit is configured to detect a first user input on at least one portion of the graphical representation of the at least one second application. Further, the controller unit is configured to display a graphical representation of at least one state of the at least one second application within the graphical representation of the first application based on the user input. Further, the controller unit is configured to detect a second user input on at least one portion of the graphical representation of the at least one second application. Further, the controller unit is configured to perform at least one action on at least one state of the at least one second application based on the second user input while accessing the first application.

In accordance with another aspect of the present disclosure, a computer program product including a computer executable program code recorded on a computer readable non-transitory storage medium. The computer executable program code when executed causing the actions including displaying a graphical representation of at least one second application within a graphical representation of a first application. Further, the computer executable program code when executed causing the actions including detecting a user input on at least one portion of the graphical representation of the at least one second application displayed in the at least one background portion of the graphical representation of the first application. Further, the computer executable program code when executed causing the actions including performing at least one action on the at least one second application based on the user input while accessing the first application.

Other aspects, advantages and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10B is an example scenario in which a complete cycle operation is performed for selecting a "Past-App", according to an embodiment of the present disclosure;

FIG. 20 is an example scenario in which a complete cycle operation is performed to access application list, according to an embodiment of the present disclosure;

Throughout the drawings, like reference numerals will be understood to refer to like parts, components, and structures.

DETAILED DESCRIPTION

Figure 1:
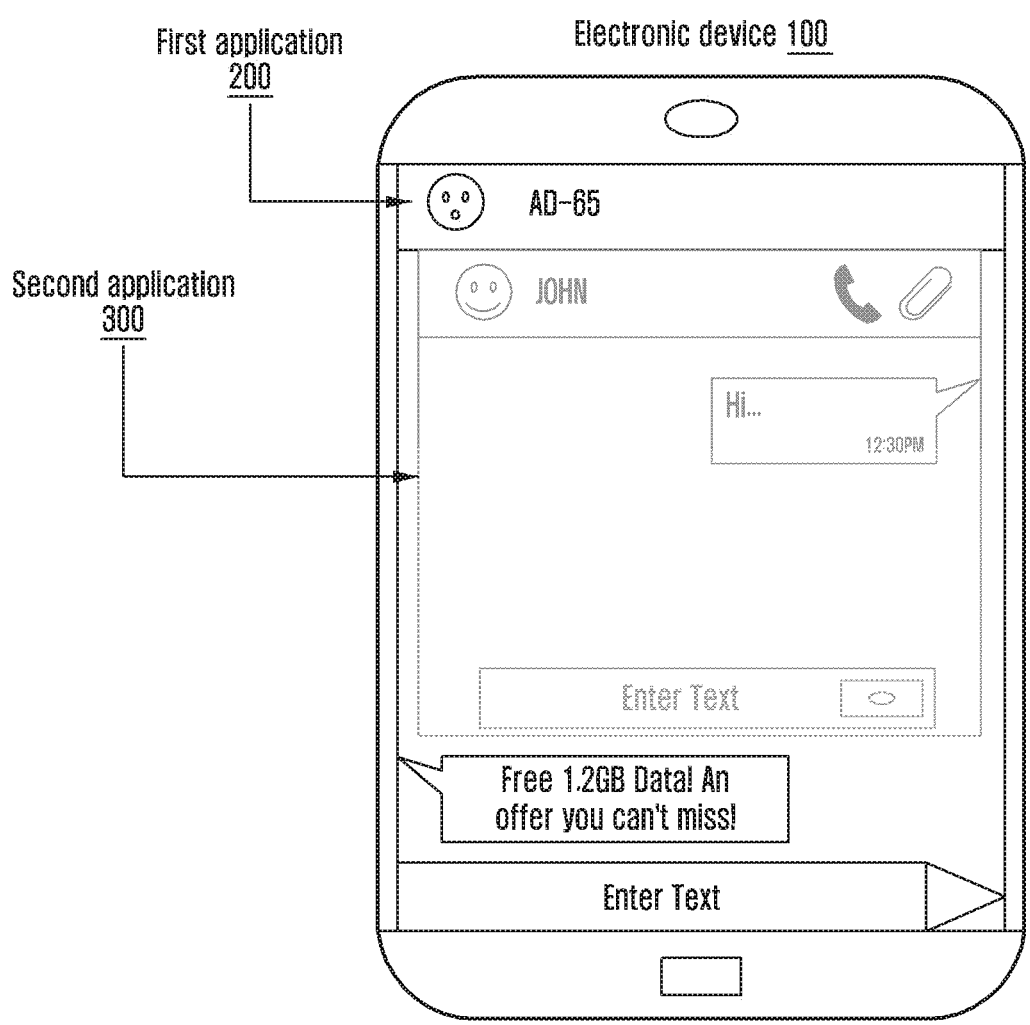
FIG. 1 is an example scenario in which a proposed method for managing applications of an electronic device is illustrated, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Prior to describing the embodiments in detail, it is useful to provide definitions for key terms used herein. Unless defined otherwise, all technical terms used herein have the same meaning as commonly understood by a person having ordinary skill in the art to which this disclosure belongs.

Present Application (i.e., "Present-App"): Refers to a first application which is at a foreground and is currently active.

Past Application (i.e., "Past-App"): Refers to a second application which is at a background and is not active.

Past State (i.e., "Past-State"): Refers to a program state of an application in which a user accessed in recent past.

Non-"Present-App" portion: Refers to a background of the "Present-App".

Partial cycle operation: Refers to an operation cycle in which the "Present-App" is made as the background or wallpaper of the "Past-App" and the "Past-App" is made as the foreground.

Complete cycle operation: Refers to an operation cycle in which the background or the wallpaper of the "Present-App" is updated after performing the operation on the "Past-App".

Accordingly, the embodiments herein provide a method for managing applications of an electronic device. The method includes displaying a graphical representation of at least one second application within a graphical representation of a first application. The method includes detecting a user input on at least one portion of the graphical representation of the at least one second application displayed in the at least one background portion of the graphical representation of the first application. The method includes performing at least one action on the at least one second application based on the user input while accessing the first application.

Unlike methods of the related art, the proposed method can be used for accessibility, operations, and information sharing between program states of the application by intelligently using background of the applications. The proposed method can be used to provide transparency amongst the applications, transparency amongst the past program states of the applications, intelligent usage of the unused part (i.e., background portion) of the applications for simultaneous handling of the applications thus consuming less power and computation, quick and more convenient information passing between the applications, easy access to active/inactive applications from other application, easy handling of multiple applications via single input method by intelligently identifying the intended application corresponding to the user input.

Unlike methods of the related art, the proposed method can be used to provide the user with multiple options to: access the second application while working on the first application, conveniently select the recent "Past-App", view and access information from the first application simultaneously while working on the second application, make use of transparency property in the mobile applications and perform actions on the applications, transfer information from the first application to the second application and vice versa, make use of the transparency property in a time domain or a program state domain; and perform the actions on a "Past-State" of the "Past-App" as per complete cycle operation or partial cycle operation through the "Present-App", open a new application while working on another application, and access a list of applications while working on another application.

Referring now to the drawings, and more particularly to FIGS. 1 to 3, 4A to 4C, 5A to 5C, 6 to 9, 10A and 10B, 11, 12, 13A to 13D, 14A to 14D, 15 to 23, 24A to 24C, 25 to 29, 30A and 30B, and 31, where similar reference characters denote corresponding features consistently throughout the figures, there are shown preferred embodiments.

FIG. 1 is an example scenario in which a proposed method for managing applications of an electronic device is illustrated, according to an embodiment of the present disclosure.

Referring to FIG. 1, consider a scenario where a first application 200 is a short messaging service (SMS) application and a second application 300 is a Messenger application. Initially, the second application 300 is a past application (i.e., "Past-App") or a background application. The first application 200 is a present application (i.e., "Present-App") or a foreground application which is currently active. A graphical representation of the second application 300 is displayed in a background portion of the graphical representation of the first application 200 in a transparent manner as shown in FIG. 1.

Referring to FIG. 1, the graphical representation of the second application 300 includes an image of a graphical representation of the second application 300.

By using the background of the applications, the proposed method provides the user a perception that the applications (i.e., first application 200 and the second application 300) are transparent to each other. Further, in the proposed method, a two-level transparency is induced i.e., transparency property in the time domain or the program state domain is induced in mobile applications. The transparency amongst the applications is provided using the background portion of the application. Further, the proposed method can be used to enhance the interaction of the background in the mobile applications to perform actions on other applications.

Further, the proposed method provides a mechanism for the user to: perform the actions on the "Past-App" without actually switching to the "Past-App" and while simultaneously working on the "Present-App", view the information from the "Past-App" while simultaneously working on the "Present-App", easily view the information regarding what all applications are accessed while simultaneously working on the "Present-App", access the "Past-App" not necessarily in a sequential manner, remove the "Past-App" from the background portion of the "Present-App" in case of any distraction, pass the information from the "Present-App" to the "Past-App" and vice-versa, perform the actions such as operations or data sharing to the "Past-App" in the "Past-States" while working on another application, open a new application while working on the "Present-App", work on the "Present-App" even after opening the new application, browse through available applications in the App list while simultaneously working on the "Present-App", and swipe the App list directly thus minimizing the "Present-App", opening the App list, switching the App list, and restoring the "Present-App.

The proposed method provides a mechanism for the user to: simultaneously work with multiple applications in less time and with less effort, directly jump to the "Past-State" of the "Past-App" while simultaneously working on multiple applications in their past states, access the not recent "Past-App" in a single gesture (i.e., non-sequential access of the "Past-App"), and specify an opacity (or transparency) level of the background portion in the "Present-App". The user may not be distracted while switching the applications, performing the operation on the multiple applications, opening the new application, or the like. The proposed method can be used to reduce a number of clicks performed by the user while inter-application switching, performing the operation on the multiple applications, and opening the new application.

Figure 2:
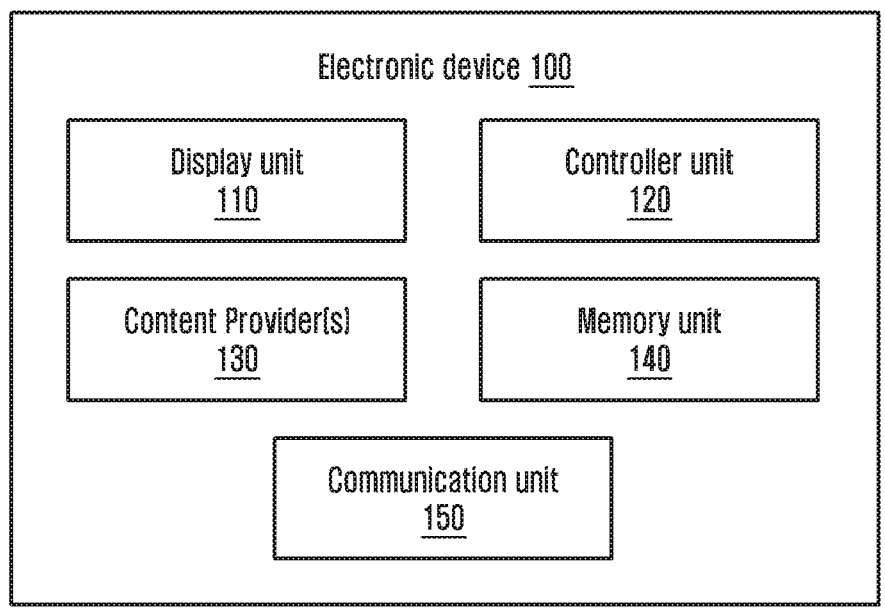
FIG. 2 is a block diagram of an electronic device for managing applications, according to an embodiment of the present disclosure.

FIG. 2 is a block diagram of an electronic device for managing the applications, according to an embodiment of the present disclosure.

Referring to FIG. 2, the electronic device 100 can be, for example, a laptop, a desktop computer, a mobile phone, a smart phone, personal digital assistants (PDAs), a tablet, a phablet, a consumer electronic device, a dual display device, a wearable device, or any other electronic device. The electronic device 100 includes a display unit 110, a controller unit (e.g., at least one processor) 120, a content provider(s) 130, a memory unit 140, and a communication unit 150.

The controller unit 120 can be configured to display the graphical representation of the second application 300 within the graphical representation of the first application 200 on the display unit 110 (i.e., screen) of the electronic device 100. The first application 200 and the second application 300 can be, for example, the SMS applications, the Messenger application, a Call application, a social networking site (SNS) application, a Calculator application, a Calendar application, or any other application available in the electronic device 100. The second application 300 may be a background application, a recently accessed application, a user defined application, or an application dynamically defined based on user activities, user behavior, user context, content of the first application 200, context of the first application 200, or combination of same.

The graphical representation of the second application 300 is displayed in the at least one background portion of the graphical representation of the first application 200 in the transparent manner. The graphical representation of the second application 300 may include the image of the graphical representation of the second application 300, and an image of at least one state of the second application 300. The controller unit 120 can be configured to detect the user input on at least one portion of the graphical representation of the second application 300 displayed in the at least one background portion of the graphical representation of the first application 200.

The controller unit 120 can be configured to detect an application interaction event based on the user input. The controller unit 120 can be configured to capture the graphical representation of the first application 200 displayed on the screen of the electronic device 100. The controller unit 120 can be configured to perform at least one action on the second application 300 based on the application interaction event. The controller unit 120 can be configured to display an updated graphical representation of the second application 300, where the updated graphical representation of the second application 300 displays the captured graphical representation of the first application 200 in at least one background portion of the updated graphical representation of the second application 300.

The controller unit 120 can also be configured to detect the application interaction event based on the user input. The controller unit 120 can be configured to perform the at least one action on the second application 300 based on the application interaction event. Further, the controller unit 120 can be configured to capture the updated graphical representation of the second application 300. The controller unit 120 can be configured to display the updated graphical representation of the first application 200, where the updated graphical representation of the first application 200 displays the updated representation of the second application 300 in the at least one background portion of the updated graphical representation of the first application 200. The action may include at least one of setting the second application 300 as a foreground application, sharing a data item from the first application 200 to the second application 300, sharing the data item from the second application 300 to the first application 200, invoking functionality on the second application 300, invoking the second application 300, invoking at least one state of the second application 300, resizing the graphical representation of the second application 300 displayed in the background of the first application 200, or displaying the graphical representation of the second application 300 in at least one portion and a graphical representation of a default background in other portions in the background of the first application 200. The user input may include a single input and a series of inputs performed while accessing the first application 200, where the user input is performed to facilitate the at least one action to be performed on the second application 300 while accessing the first application 200.

The controller unit 120 can also be configured to display the graphical representation of the second application 300 within the graphical representation of the first application 200 on the display unit 110. The controller unit 120 can be configured to detect a first user input on the at least one portion of the graphical representation of the second application 300. The controller unit 120 can be configured to display the graphical representation of the at least one state of the second application 300 within the graphical representation of the first application 200 based on the user input. The controller unit 120 can be configured to detect a second user input on the at least one portion of the graphical representation of the second application 300. The controller unit 120 can be configured to detect the application interaction event based on the second user input. The controller unit 120 can be configured to capture the graphical representation of the first application 200 displayed on the display unit 110 of the electronic device 100. The controller unit 120 can be configured to perform the at least one action on the at least one state of the second application 300 based on the application interaction event. The controller unit 120 can be configured to display the updated graphical representation of the at least one state of the second application 300, where the updated graphical representation of the at least one state of the second application 300 displays the captured graphical representation of the first application 200 in the at least one background portion of the updated graphical representation of the second application 300.

The controller unit 120 can also be configured to detect the application interaction event based on the second user input. The controller unit 120 can be configured to perform the at least one action on the at least one state of the second application 300 based on the application interaction event. The controller unit 120 can be configured to capture the updated graphical representation of the at least one state of the second application 300. The controller unit 120 can be configured to display the updated graphical representation of the first application 200, where the updated graphical representation of the first application 200 displays the updated representation of the at least one state of the second application 300 in the at least one background portion of the updated graphical representation of the first application 200.

The controller unit 120 controls inter-unit communication. The controller unit 120 makes use of the content provider 130 to transfer background image, data or information, user commands, or the like amongst the applications. The content provider 130 can be configured to supply content from the first application 200 to the second application 300 and vice versa. In an example, the graphical representation of the "Past-App" can be provided to the "Present-App" using the content provider 130 (at an android framework layer).

The memory unit 140 may include one or more computer-readable storage media. The memory unit 140 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory unit 140 may, in some examples, be considered a non-transitory storage medium. The term "non-transitory" may indicate that the storage medium is not embodied in a carrier wave or a propagated signal. However, the term "non-transitory" should not be interpreted that the memory unit 140 is non-movable. In some examples, the memory unit 140 can be configured to store larger amounts of information than the memory. In certain examples, a non-transitory storage medium may store data that can, over time, change (e.g., in random access memory (RAM) or cache). The communication unit 150 communicates internally with the units and externally with networks.

The proposed method can be used for performing the actions on the "Past-States" of the multiple applications i.e., inter-App accessibility, perform inter-App operations (complete cycle or partial cycle operation) as well as sharing the information between the applications as well as in the program state or the time domain by intelligently using the background of the applications.

FIG. 2 shows a limited overview of the electronic device 100, but it is to be understood that another embodiment is not limited thereto. The electronic device 100 may include different units communicating among each other along with other hardware or software components. By way of illustration, both an application running on the electronic device 100 and the electronic device 100 can be the component.

Figure 3:
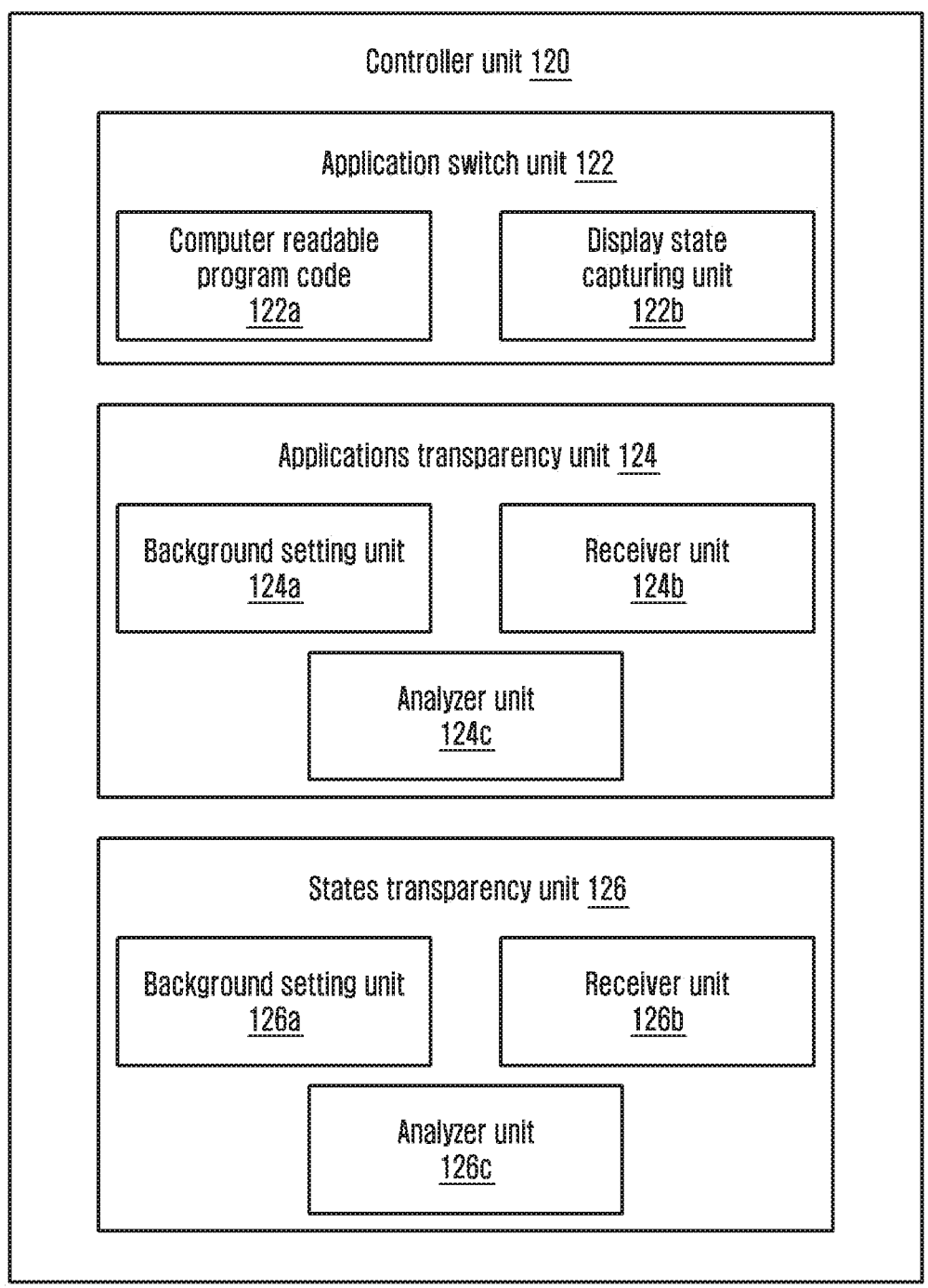
FIG. 3 illustrates a block diagram of a controller unit, according to an embodiment of the present disclosure.

FIG. 3 illustrates a block diagram of a controller unit, according to an embodiment of the present disclosure.

Referring to FIG. 3, the controller unit 120 includes an application switch unit 122, an applications transparency unit 124, and a states transparency unit 126. The application switch unit 122 can be configured to switch between the first application 200 and the second application 300 and vice versa. The application switch unit 122 includes a computer readable program code 122a and a display state capturing unit 122b. The computer readable program code 122a can be used to switch from the "Present-App" to the "Past-App" and vice versa. The display state capturing unit 122b captures display states of the applications (i.e., the first application 200 and the second application 300).

The applications transparency unit 124 induces the transparency amongst the applications by using a Background setting unit 124a, a receiver unit 124b, and an analyzer unit 124c. The Background setting unit 124a receives new background image and sets it as the background of the applications. This makes the use of view systems at an Android architecture level. The Background setting unit 124a is used in resizing, displaying the selected content of the graphical representation. The receiver unit 124b receives the user input. The analyzer unit 124c analyzes the user input and determines that the user input is meant for which application and for what type of operation (i.e., partial cycle operation, complete cycle operation, an application selection, or the like). This makes use of support application that continuously listens for the user input at the background of the application. Further, the analyzer unit 124c is used in resizing, displaying the selected content of the graphical representation. An example scenario is explained in conjunction with FIG. 28 and FIG. 29.

The applications transparency unit 124 includes a computer readable program code for inducing the transparency amongst the applications capable of:
  a. Providing a hint from the "Past-App" to the "Present-App" using the background portion
  b. Receiving the user input
  c. Determining whether the user input is corresponding to the "Past-App" or the "Present-App".
  d. Performing the complete cycle operation or the partial cycle operation on the "Past-App"

The states transparency unit 126 induces transparency amongst the past states of the applications by using the memory unit 140, a background setting unit 126a, a receiver unit 126b, and an analyzer unit 126c. The memory unit 140 dynamically stores and loads the past program states of the applications. The background setting unit 126a receives new background image and sets it as the background of the applications. This makes use of the View Systems at the Android architecture level. Further, the Background setting unit 126a is used in resizing, displaying the selected content of the graphical representation. The receiver unit 126b receives the user input. The analyzer unit 126c analyzes the user input and determines that the user input is meant for which application and for what type of operation. This makes use of a support of the application that continuously listens for the user input at the background of the applications. The analyzer unit 126c is used in resizing, displaying the selected content of the graphical representation. In an embodiment, the example scenario for the same is explained in conjunction with FIG. 28 and FIG. 29.

The states transparency unit 126 includes computer readable program code for inducing the transparency in the program state domain capable of:
  e. Providing a hint from the "Past-App" to the "Present-App"
  f. Providing a hint of the "Past-State" of the "Past-App" to the "Present-App"
  g. Receiving the user input
  h. Determining whether the user input is corresponding to the "Past-App" or the "Present-App"
  i. Performing the complete cycle operation or the partial cycle operation on the selected "Past-State" of the "Past-App".

At the Android operating system level, the background of the applications can be accessed and modified using the content provider 130 and the view system at the application framework layer. Changing the background of android mobile applications can be performed dynamically by making changes in the layout of the "Present-App". This can be performed using public methods provided by the Android framework: setbackground (drawable background) or set background Resource (int resid); where set background is the snapshot of the "Past-App". These are provided by the Android view system at the application framework layer. Thus, operations of setting and changing of the background of the applications in the proposed method acquire its position at the application framework layer of the Android architecture. The process is explained in conjunction with FIG. 6.

FIG. 3 shows a limited overview of the controller unit 120, but it is to be understood that other embodiments are not limited thereto. The controller unit 120 may include different units communicating among each other along with other hardware or software components. By way of illustration, both an application running on the controller unit 120 and the controller unit 120 can be the component.

Figure 4A:
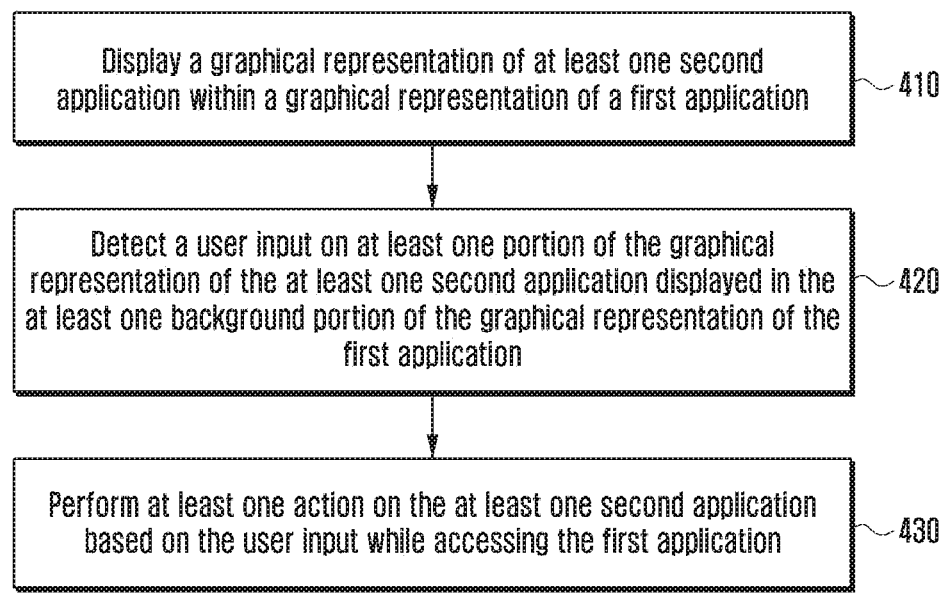
FIG. 4A is a flowchart illustrating a method for managing applications of an electronic device, according to an embodiment of the present disclosure.

FIG. 4A is a flowchart illustrating a method for managing the applications of an electronic device, according to an embodiment of the present disclosure.

Referring to FIG. 4A, at operation 410, the method includes displaying the graphical representation of the second application 300 within the graphical representation of the first application 200. The method allows the controller unit 120 to display the graphical representation of the second application 300 within the graphical representation of the first application 200. For example, the first application 200 and the second application 300 may be the SMS applications, the Messenger application, the Call application, the SNS application, the Calculator application, the Calendar application, or any other application available in the electronic device 100.

The second application 300 may be the background application, the recently accessed application, the user defined application, or the application dynamically defined based on the user activities, the user behavior, the user context, the content of the first application 200, the context of the first application 200, or combination of same. The graphical representation of the second application 300 may be displayed in the at least one background portion of the graphical representation of the first application 200 in the transparent manner. The graphical representation of the second application 300 may include the image of the graphical representation of the second application 300 and the image of the at least one state of the second application 300.

At operation 420, the user input is detected on the at least one portion of the graphical representation of the second application 300 displayed in the at least one background portion of the graphical representation of the first application 200. The method allows the controller unit 120 to detect the user input on the at least one portion of the graphical representation of the second application 300 displayed in the at least one background portion of the graphical representation of the first application 200. The user input may be a double tap with one or two fingers or a hold and pinch out gesture. The user input may be a double tap with one or two fingers and hold with one finger and rotate with other finger. At operation 430, the at least one action is performed on the second application 300 based on the user input while accessing the first application 200. The method allows the controller unit 120 to perform the at least one action on the second application 300 based on the user input while accessing the first application 200.

The action may include at least one of setting the second application 300 as the foreground application, sharing the data item from the first application 200 to the second application 300, sharing the data item from the second application 300 to the first application 200 and vice versa, invoking functionality on the second application 300, browsing the available applications, invoking the second application 300, invoking the at least one state of the second application 300, resizing the graphical representation of the second application 300 displayed in the background of the first application 200, or displaying the graphical representation of the second application 300 in the at least one portion and the graphical representation of the default background in other portions in the background of the first application 200. The user input may include the single input and the series of inputs performed while accessing the first application 200, where the user input is performed to facilitate the at least one action to be performed on the second application 300 while accessing the first application 200.

The various actions, acts, blocks, operations, or the like in the flowchart 400 may be performed in the order presented, in a different order or simultaneously. Further, some of the actions, acts, blocks, operations, or the like may be omitted, added, modified, skipped, or the like without departing from the scope of the disclosure.

Figure 4B:
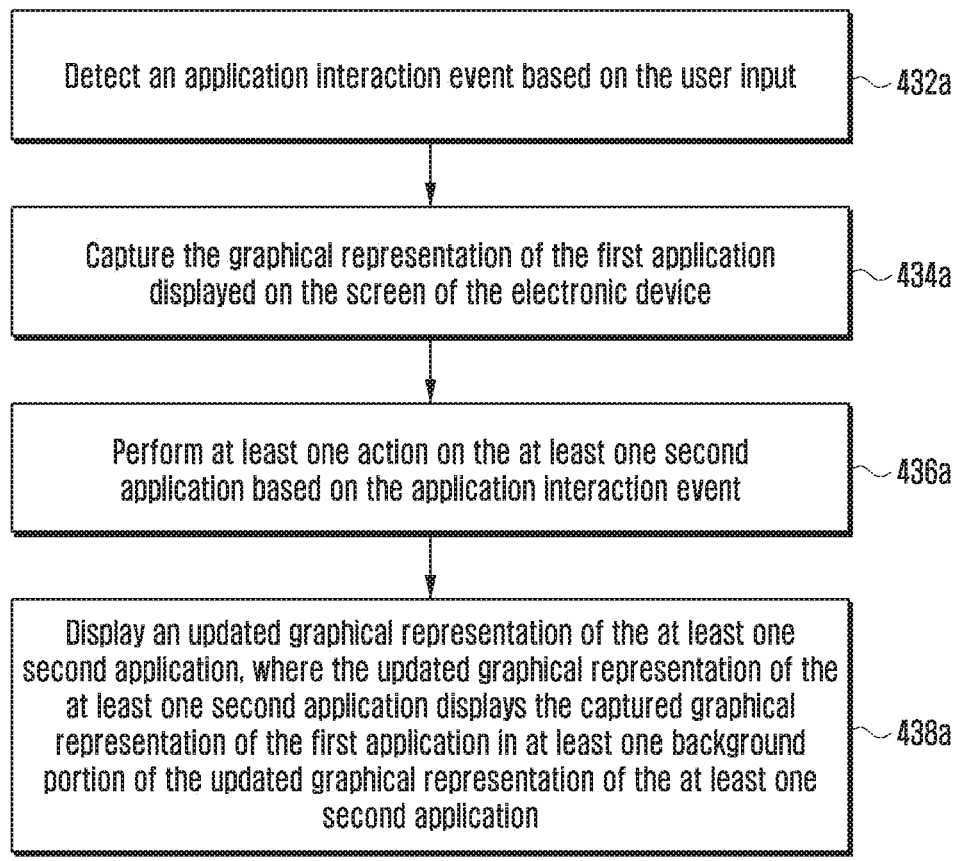
FIG. 4B is a flowchart illustrating a method for performing at least one action on a second application based on an application interaction event in a partial cycle of operation, according to an embodiment of the present disclosure.

FIG. 4B is a flowchart illustrating a method for performing the at least one action on a second application based on an application interaction event in a partial cycle operation, according to an embodiment of the present disclosure.

Referring to FIG. 4B, at operation 432a, the application interaction event is detected based on the user input. The method allows the controller unit 120 to detect the application interaction event based on the user input.

At operation 434a, the graphical representation of the first application 200 displayed on the screen (i.e., display unit 110) of the electronic device 100 is captured. The method allows the controller unit 120 to capture the graphical representation of the first application 200 displayed on the screen of the electronic device 100. At operation 436a, at least one action is performed on the second application 300 based on the application interaction event. The method allows the controller unit 120 to perform the at least one action on the second application 300 based on the application interaction event.

At operation 438a, the method includes displaying the updated graphical representation of the second application 300. The method allows the controller unit 120 to display the updated graphical representation of the second application 300. The updated graphical representation of the second application 300 displays the captured graphical representation of the first application 200 in the at least one background portion of the updated graphical representation of the second application 300.

The various actions, acts, blocks, operations, or the like in the method illustrated in FIG. 4B may be performed in the order presented, in a different order or simultaneously. Further, some of the actions, acts, blocks, operations, or the like may be omitted, added, modified, skipped, or the like without departing from the scope of the disclosure.

Figure 4C:
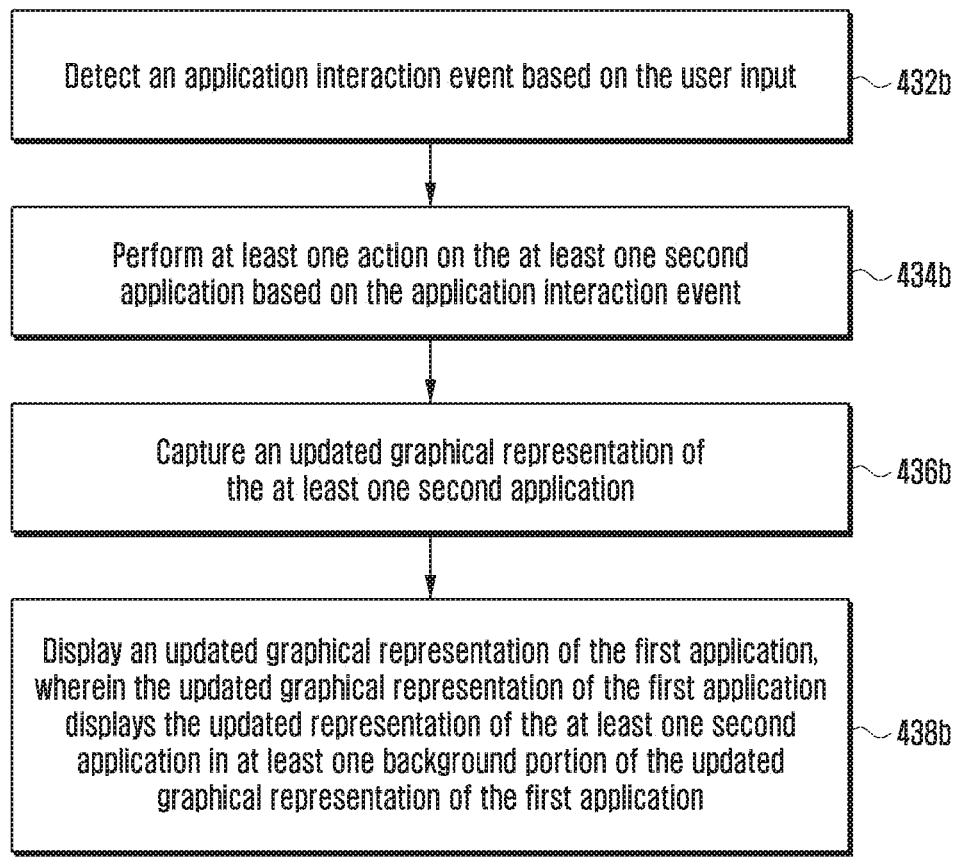
FIG. 4C is a flowchart illustrating a method for performing at least one action on a second application based on an application interaction event in a complete cycle of operation, according to an embodiment of the present disclosure.

FIG. 4C is a flowchart illustrating a method for performing at least one action on a second application based on an application interaction event in a complete cycle operation, according to an embodiment of the present disclosure.

Referring to FIG. 4C, at operation 432b, the application interaction event is detected based on the user input. The method allows the controller unit 120 to detect the application interaction event based on the user input. At operation 434b, the at least one action is performed on the second application 300 based on the application interaction event. The method allows the controller unit 120 to perform the at least one action on the second application 300 based on the application interaction event.

At operation 436b, the updated graphical representation of the second application 300 is captured. The method allows the controller unit 120 to capture the updated graphical representation of the second application 300. At operation 438b, the updated graphical representation of the first application 200 is displayed. The method allows the controller unit 120 to display the updated graphical representation of the first application 200. The updated graphical representation of the first application 200 displays the updated representation of the second application 300 in the at least one background portion of the updated graphical representation of the first application 200.

The various actions, acts, blocks, operations, or the like in the method illustrated in FIG. 4C may be performed in the order presented, in a different order or simultaneously. Further, some of the actions, acts, blocks, operations, or the like may be omitted, added, modified, skipped, or the like without departing from the scope of the disclosure.

Figure 5A:
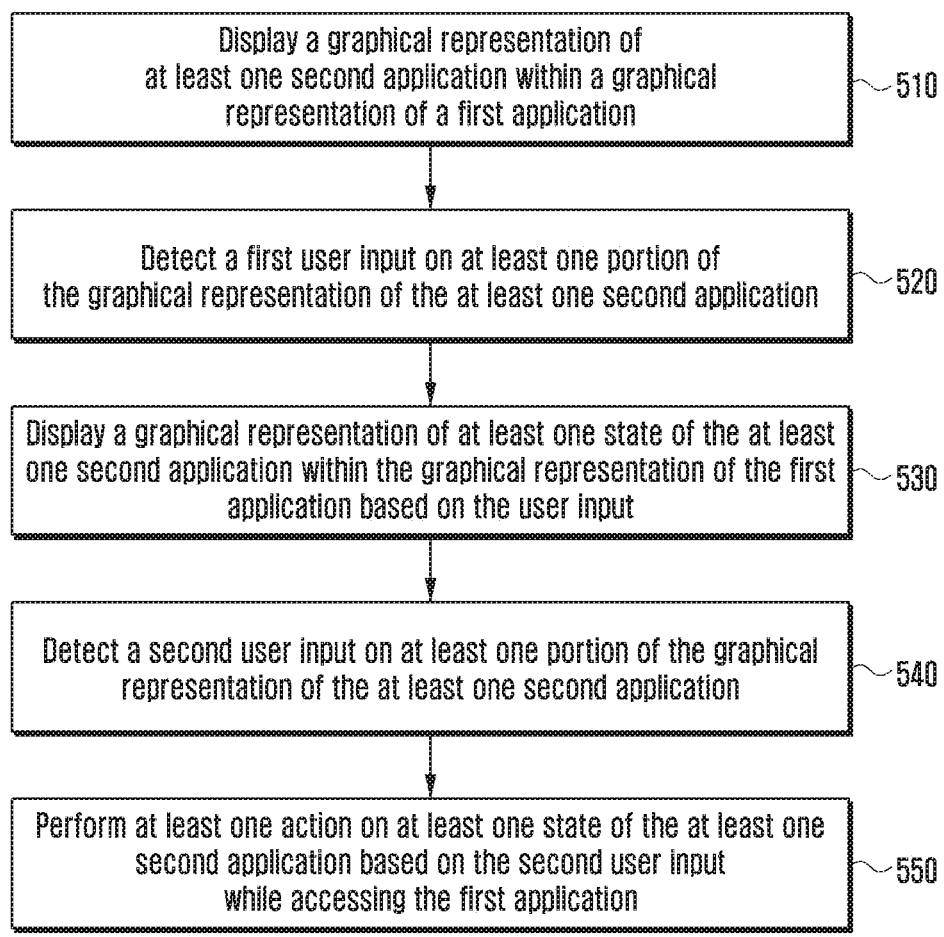
FIG. 5A is another flowchart illustrating a method for managing applications in an electronic device, according to an embodiment of the present disclosure.

FIG. 5A is a flowchart illustrating a method for managing applications in an electronic device, according to an embodiment of the present disclosure.

Referring to FIG. 5A, at operation 510, the graphical representation of the second application 300 is displayed within the graphical representation of the first application 200. The method allows the controller unit 120 to display the graphical representation of the second application 300 within the graphical representation of the first application 200. The first application 200 and the second application 300 may be SMS applications, a Messenger application, a Call application, a SNS application, a Calculator application, a Calendar application, or any other application available in the electronic device 100.

The graphical representation of the second application 300 may be displayed in the at least one background portion of the graphical representation of the first application 200, where the graphical representation of the second application 300 is displayed in the at least one background portion of the graphical representation of the first application 200 in the transparent manner. The graphical representation of the at least one state of the second application 300 may be displayed in the at least one background portion of the graphical representation of the first application 200, where the graphical representation of the at least one state of the second application 300 is displayed in the at least one background portion of the graphical representation of the first application 200 in the transparent manner. The second application 300 may one of a background application, a recently accessed application, a user defined application, or an application dynamically defined based on at least one of user activities, user behavior, user context, the content of the first application 200, or a context of the first application 200.

At operation 520, the first user input is detected on the at least one portion of the graphical representation of the second application 300. The method allows the controller unit 120 to detect the first user input on the at least one portion of the graphical representation of the second application 300. At operation 530, the graphical representation of the at least one state of the second application 300 is displayed within the graphical representation of the first application 200 based on the user input. The method allows the controller unit 120 to display the graphical representation of the at least one state of the second application 300 within the graphical representation of the first application 200 based on the user input.

At operation 540, the second user input is detected on the at least one portion of the graphical representation of the second application 300. The method allows the controller unit 120 to detect the second user input on the at least one portion of the graphical representation of the second application 300. At operation 550, the at least one action is performed on the at least one state of the second application 300 based on the second user input while accessing the first application 200. The method allows the controller unit 120 to perform the at least one action on the at least one state of the second application 300 based on the second user input while accessing the first application 200.

The action may include at least one of setting the second application 300 as the foreground application, sharing the data item from the first application 200 to the second application 300, sharing the data item from the second application 300 to the first application 200, invoking the functionality on the second application 300, browsing available applications, invoking the second application 300, invoking the at least one state of the second application 300, resizing the graphical representation of the second application 300 displayed in the background of the first application 200, or displaying the graphical representation of second application 300 in the at least one portion and the graphical representation of the default background in other portions in the background of the first application 200. The user input may include a single input or a series of inputs performed while accessing the first application 200, where the user input is performed to facilitate the at least one action to be performed on the second application 300 while accessing the first application 200.

The various actions, acts, blocks, operations, or the like in the method illustrated in FIG. 5A may be performed in the order presented, in a different order or simultaneously. Further, some of the actions, acts, blocks, operations, or the like may be omitted, added, modified, skipped, or the like without departing from the scope of the disclosure.

Figure 5B:
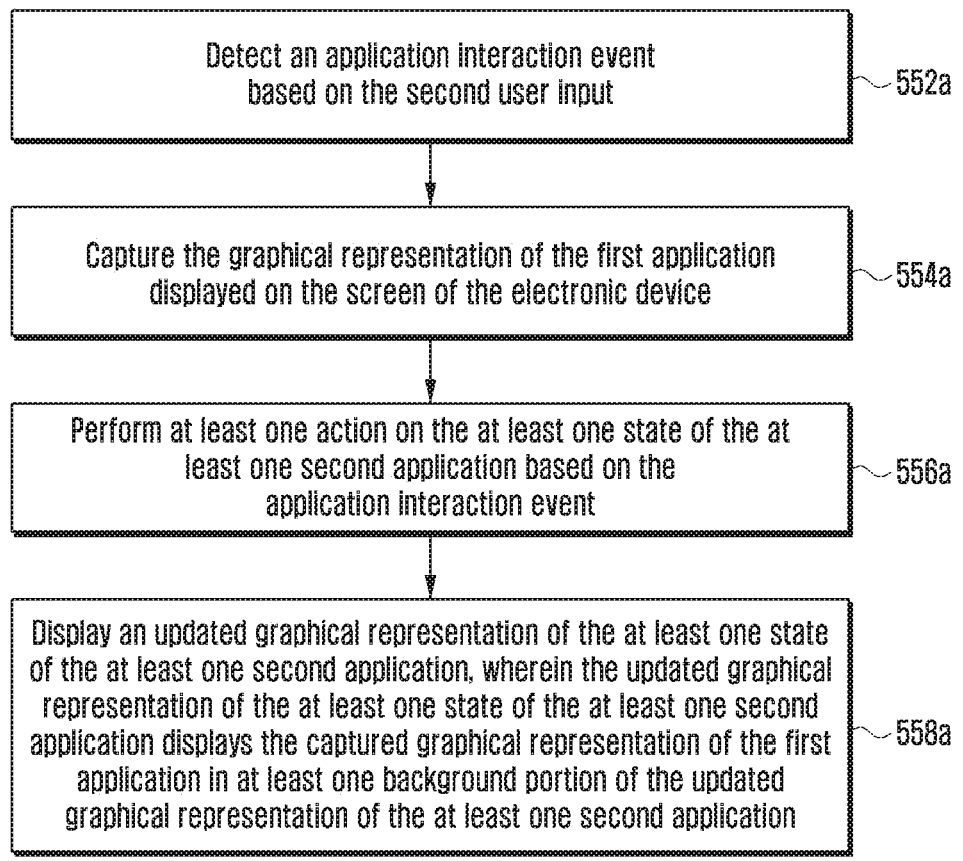
FIG. 5B is a flowchart illustrating a method for performing at least one action on at least one state of a second application based on a second user input while accessing a first application in a partial cycle of operation, according to an embodiment of the present disclosure.

FIG. 5B is a flowchart illustrating a method for performing at least one action on at least one state of a second application based on second user input while accessing a first application in a partial cycle operation, according to an embodiment of the present disclosure.

Referring to FIG. 5B, at operation 552a, the application interaction event is detected based on the second user input. The method allows the controller unit 120 to detect the application interaction event based on the second user input.

At operation 554a, the graphical representation of the first application 200 displayed on the screen of the electronic device 100 is captured. The method allows the controller unit 120 to capture the graphical representation of the first application 200 displayed on the screen of the electronic device 100. At operation 556a, the at least one action is performed on the at least one state of the second application 300 based on the application interaction event. The method allows the controller unit 120 to perform the at least one action on the at least one state of the second application 300 based on the application interaction event.

At operation 558a, the updated graphical representation of the at least one state of the second application 300 is displayed. The method allows the controller unit 120 to display the updated graphical representation of the at least one state of the second application 300. The updated graphical representation of the at least one state of the second application 300 displays the captured graphical representation of the first application 200 in at least one background portion of the updated graphical representation of the second application 300.

The various actions, acts, blocks, operations, or the like in the method illustrated in FIG. 5B may be performed in the order presented, in a different order or simultaneously. Further, some of the actions, acts, blocks, operations, or the like may be omitted, added, modified, skipped, or the like without departing from the scope of the disclosure.

Figure 5C:
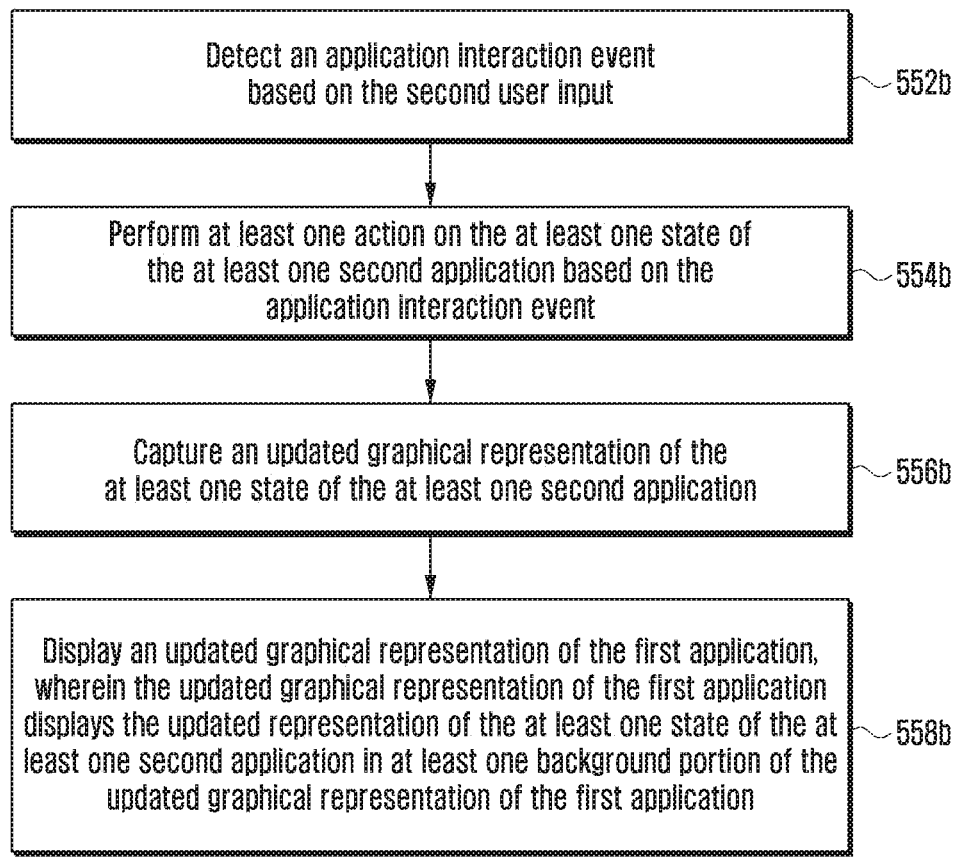
FIG. 5C is a flowchart illustrating a method for performing at least one action on at least one state of a second application based on a second user input while accessing a first application in a complete cycle of operation, according to an embodiment of the present disclosure.

FIG. 5C is a flowchart illustrating a method for performing at least one action on at least one state of a second application based on second user input while accessing a first application in a complete cycle operation, according to an embodiment of the present disclosure.

At operation 552b, the application interaction event is detected based on the second user input. The method allows the controller unit 120 to detect the application interaction event based on the second user input. At operation 554b, the at least one action is performed on the at least one state of the second application 300 based on the application interaction event. The method allows the controller unit 120 to perform the at least one action on the at least one state of the second application 300 based on the application interaction event.

At operation 556b, the updated graphical representation of the at least one state of the second application 300 is captured. The method allows the controller unit 120 to capture the updated graphical representation of the at least one state of the second application 300. At operation 558b, the updated graphical representation of the first application 200 is displayed. The method allows the controller unit 120 to display the updated graphical representation of the first application 200. The updated graphical representation of the first application 200 displays the updated representation of the at least one state of the second application 300 in at least one background portion of the updated graphical representation of the first application 200.

The various actions, acts, blocks, operations, or the like in the method illustrated in FIG. 5C may be performed in the order presented, in a different order or simultaneously. Further, some of the actions, acts, blocks, operations, or the like may be omitted, added, modified, skipped, or the like without departing from the scope of the disclosure.

Figure 6:
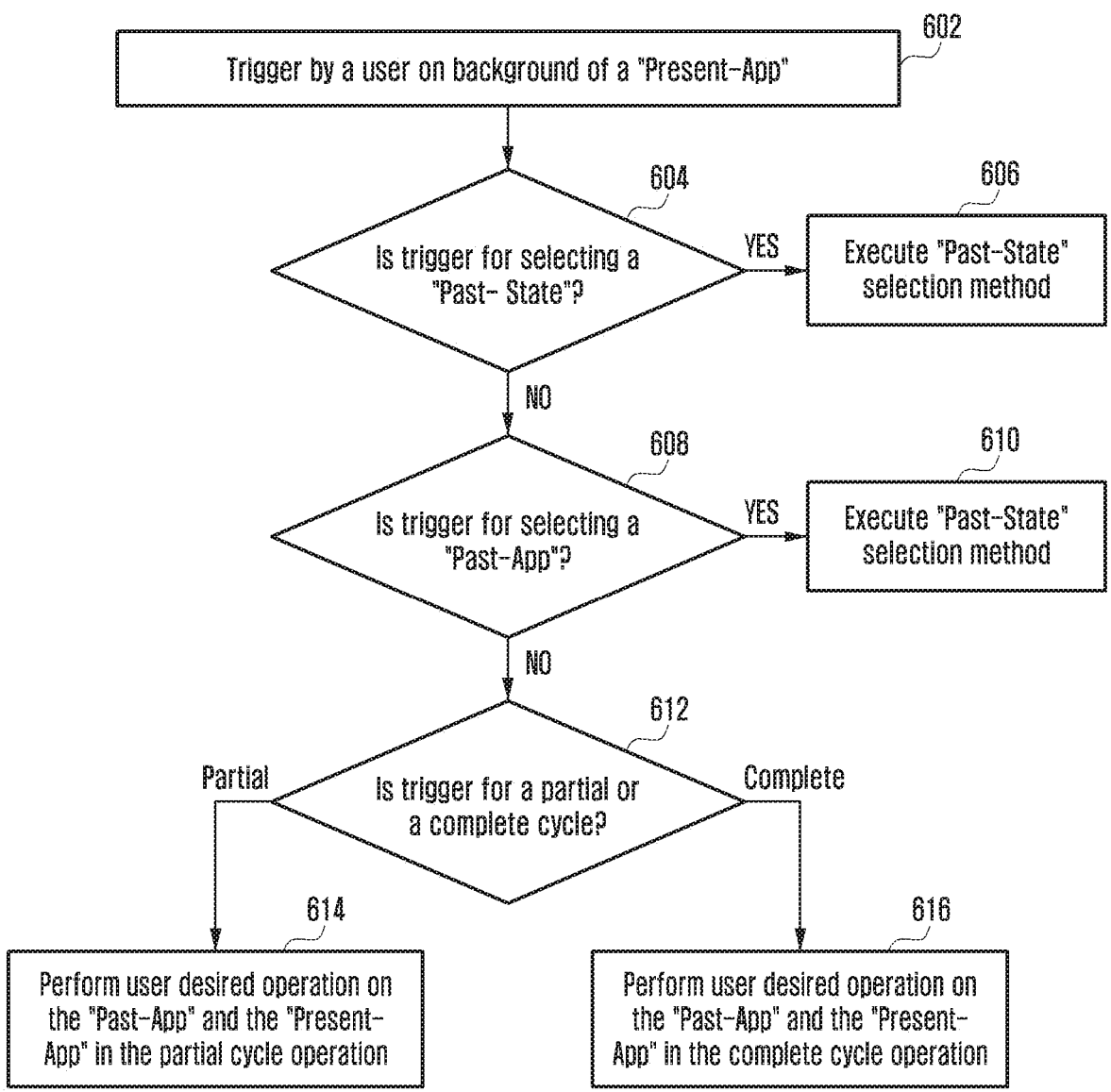
FIG. 6 is a flowchart for managing applications in an electronic device, according to an embodiment of the present disclosure.

FIG. 6 is a flowchart for managing applications in an electronic device, according to an embodiment of the present disclosure.

Referring to FIG. 6, the complete process is explained by taking an instance in which the user is working with the at least one "Past-APP" and the at least one "Present-App". The overall process is explained in conjunction with the FIG. 6.

At operation 602, the user triggers the background of the "Present-App". For example, the user gesture of double click on the background of the "Present-App" may initiate the method. At operation 604, if it is determined that the user triggered for selecting the "Past-State" then, at operation 606, the "Past-State" selection method is executed. At operation 604, if it is determined that the user does not trigger selecting the "Past-State", then at operation 608, it is determined whether the user triggered selecting the "Past-App".

At operation 608, if it is determined that the user triggered for selecting the "Past-App", then at operation 610, the "Past-App" selection method is executed. At operation 608, if it is determined that the user does not trigger selecting the "Past-App", then at operation 612, it is determined whether the partial cycle operation or the complete cycle operation is triggered. At operation 612, if it is determined that the partial cycle operation is triggered, then at operation 614, the user desired operation is performed on the "Past-App" and the "Present-App" in the partial cycle operation. The partial cycle operation may involve operation on the first application 200, switching from the first application 200 to the second application 300, and operation on the second application 300.

At operation 612, if it is determined that the complete cycle operation is triggered, then at operation 616, the user desired operation is performed on the "Past-App" and the "Present-App" in the complete cycle operation. The complete cycle operation may involve the operation on the first application 200, switching from the first application 200 to the second application 300, operation on the second application 300, and switching from the second application 300 to the first application 200. Thus, the complete cycle operation completes the loop between the "Past-App" and the "Present-App" unlike the partial cycle operation which completes only a half loop.

The "Past-State" selection method allows the user to travel back in the program state domain of the "Past-App". The controller unit 120 keeps track of the recent past program states of the "Past-App" and stores them in the memory unit 140. Upon triggering for loading the "Past-State" of the "Past-App", the program state of the "Past-App" stored in the memory unit 140 is loaded. Correspondingly, the background of the "Present-App" also changes. The "Past-State" selection is the operation when the user requires to change the "Past-State" of the "Past-App" and hence the background of the "Present-App". The "Past-State" selection method involves following operations which are described below:

a. Step-1: Access the "Past-State" list corresponding to the "Past-App" and display all the "Past-States" of the "Past-App"
b. Step-2: Receive the user input for the selected "Past-State" of the "Past-App"
c. Step-3: Load the program state of the "Past-App" corresponding to the user input in operation-2
d. Step-4: Upon triggering for completion of the "Past-State" selection
   i. If the user triggered for the partial cycle operation, the partial cycle operation is performed on the selected "Past-State" of the "Past-App"
   ii. If the user triggered for the complete cycle operation, the complete cycle operation is performed on the selected "Past-State" of the "Past-App".

In another embodiment, the "Past-App" selection is the operation when the user requires to change the "Past-App" and hence the background of the present app.

"Past-App" Selection Method:

In the proposed method, the "Past-App" is provided to the user by displaying the snapshot of the "Past-App" as the background of the "Present-App", thus allowing the user to simultaneously handle the "Present-App" and the "Past-App". Often, the user may need to work simultaneously with some other "Past-App" other than the recent "Past-App" (which is currently made as the background of the "Present-App"). The below described method allows the user to change the background of the "Present-App" i.e., "Past-App":

a. Access the "Opened App list" and display all the "Past-App" in, for example but not limited to, the circular UI
b. Receive the user input for the selected "Past-App"
c. Upon triggering for completion of the "Past-App" selection
   i. If the user triggered for the partial cycle of operation, the partial cycle operation is performed on the selected "Past-App"
   ii. If the user triggered for the complete cycle of operation, the complete cycle operation is performed on the selected "Past-App"

Figure 7:
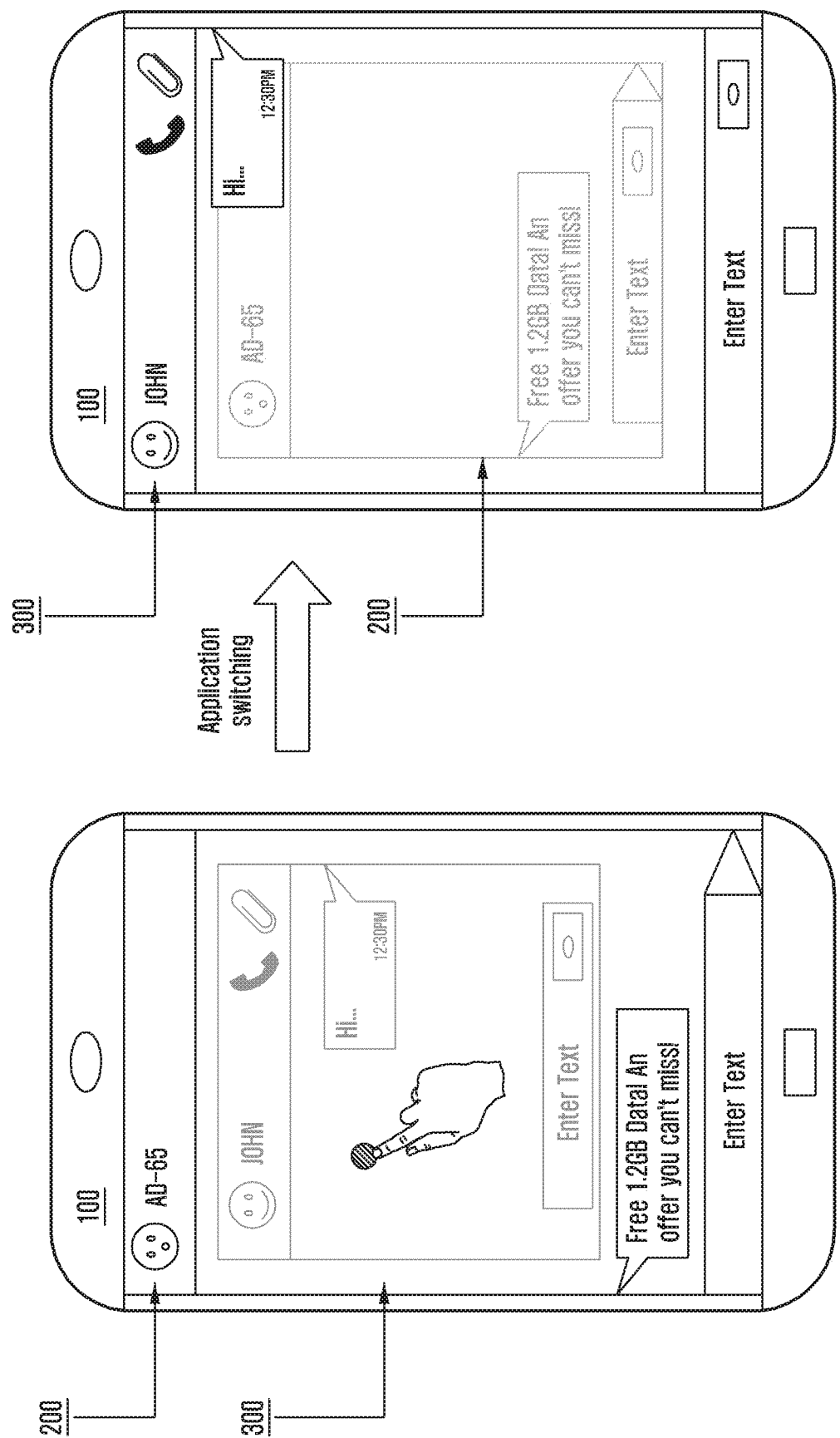
FIG. 7 is an example scenario in which a proposed method for managing applications of an electronic device is illustrated, according to an embodiment of the present disclosure.

FIG. 7 is an example scenario in which a proposed method for managing the applications of an electronic device is illustrated, according to an embodiment of the present disclosure.

Referring to FIG. 7, consider the first application 200 is the SMS application and the second application 300 is the Messenger application. Initially, the first application 200 is the "Present-App" or the foreground application which is active and the second application 300 is the "Past-App" or the background application. A graphical representation of the second application 300 is displayed within the graphical representation of the first application 200 on the screen of the electronic device 100 as shown in the FIG. 7.

In this scenario, if the user needs to switch from the first application 200 to the second application 300 then, the proposed method provides a simple and robust mechanism to perform the inter-application switching. In order to perform the inter-application switching, the user performs the gesture (i.e., user input) on the portion (i.e., Non "Present-App" area) of the second application 300 displayed in the background portion of the graphical representation of the first application 200, thus making the first application 200 as the "Past-App" and the Second application 300 as the "Present-App" as shown in the FIG. 7.

Figure 8:
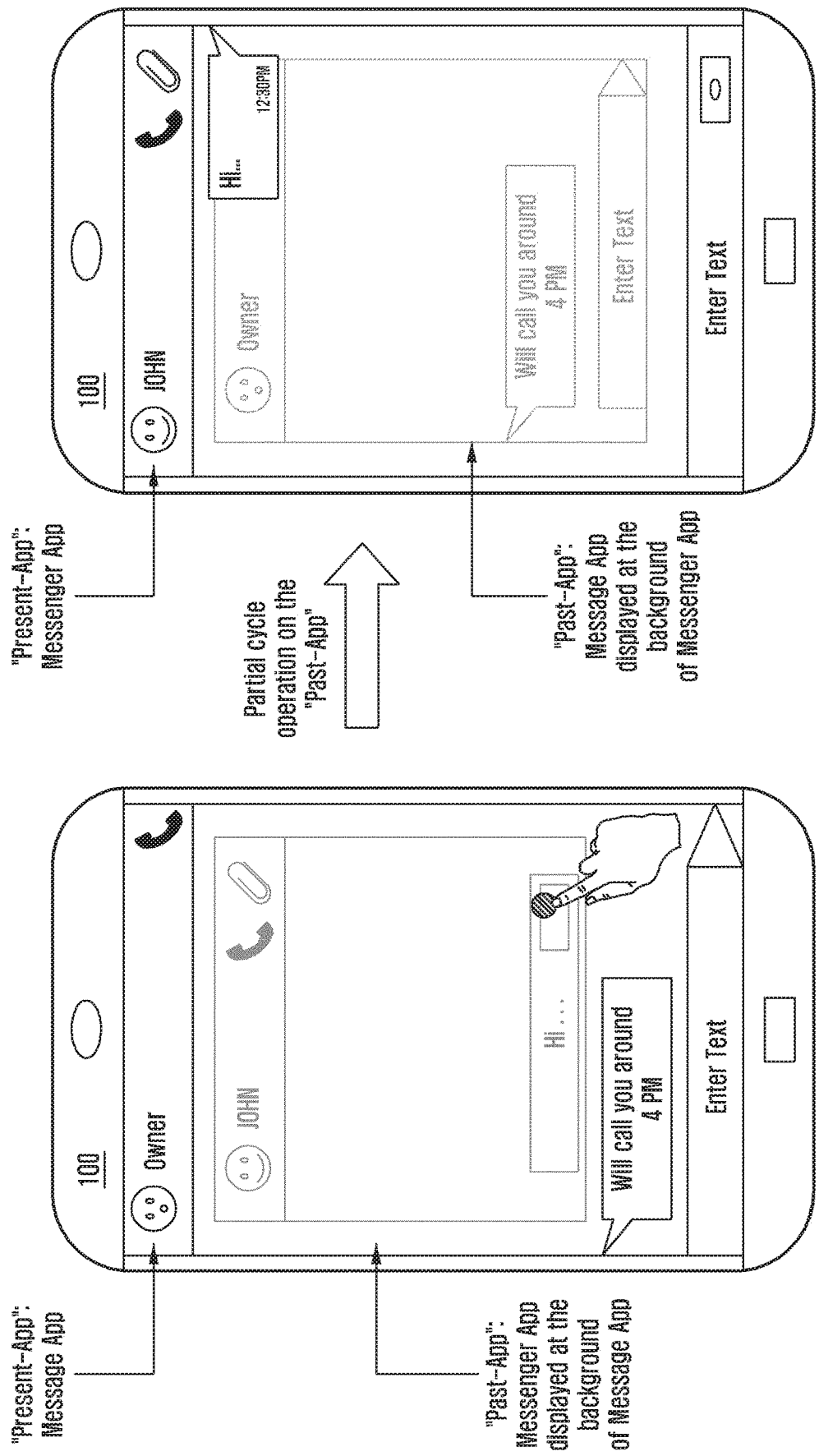
FIG. 8 is an example scenario in which a partial cycle operation is performed on a second application, according to an embodiment of the present disclosure.

FIG. 8 is an example scenario in which a partial cycle operation is performed on a "Past-App" (i.e., a second application 300), according to an embodiment of the present disclosure.

Referring to FIG. 8, consider a scenario where the first application 200 is the SMS application and the second application 300 is the Messenger application (App) as shown in FIG. 8. Initially, the first application 200 is the "Present-App" which is active and the second application 300 is the "Past-App". The graphical representation of the second application 300 is displayed within the graphical representation of the first application 200.

The controller unit 120 detects the user input (i.e., user gesture such as the double tap with the finger) on the portion (i.e., non-"Present-App" area) of the graphical representation of the second application 300 displayed in the background portion of the graphical representation of the first application 200. The controller unit 120 detects the application interaction event based on the user input and captures the graphical representation of the first application 200 (i.e., capturing a screenshot of the "Present-App") displayed on the screen of the electronic device 100. For instance, as shown in FIG. 8, the user provides a touch input on the "Send Button" to perform "Send" operation. The controller unit 120 in communication with the communication unit 150 provides the same input to the "Past-App" (i.e., on the same area of the Messenger App). The Messenger App accordingly performs the operation of sending the message. The operation may be performed after performing a unique user gesture (example: the double tap and hold with one finger) while providing the user input for the "Past-App".

After capturing the graphical representation of the first application 200, the second application 300 is set as the foreground application (i.e., activating the "Past-App" as the "Present-App") along with a support application (e.g. OnClickListener( )) which looks for the user input on the background. The first application 200 (Previous "Present-App") is set as the "Past-App". The controller unit 120 displays the updated graphical representation of the second application 300. The updated graphical representation of the second application 300 displays the captured graphical representation of the first application 200 in the background portion of the updated graphical representation of the second application 300.

Referring to FIG. 8, the screenshot of the first application 200 captured is set as the background for the second application 300 by specifying change of the background dynamically with a certain opacity (or transparency) level. The opacity level may be user defined. If the user has specified the opacity level then, the background image for the desired opacity level is pre-processed. A suitable action is performed on the second application 300 corresponding to the user gesture on the background of the first application 200 by executing corresponding handler method of the second application 300.

Actions (or Operations) on the Second Application 300:

Unlike methods of the related art, the proposed method allows the user to perform the actions on the "Past-App" by providing the user input on the background portion of the "Present-App". The specified area of the background portion on which the user specifies the input determines on what area of the "Past-App", the action is to be performed. Correspondingly, in the "Past-App", the handler method associated with the functionality is executed to complete the operation.

Figure 9:
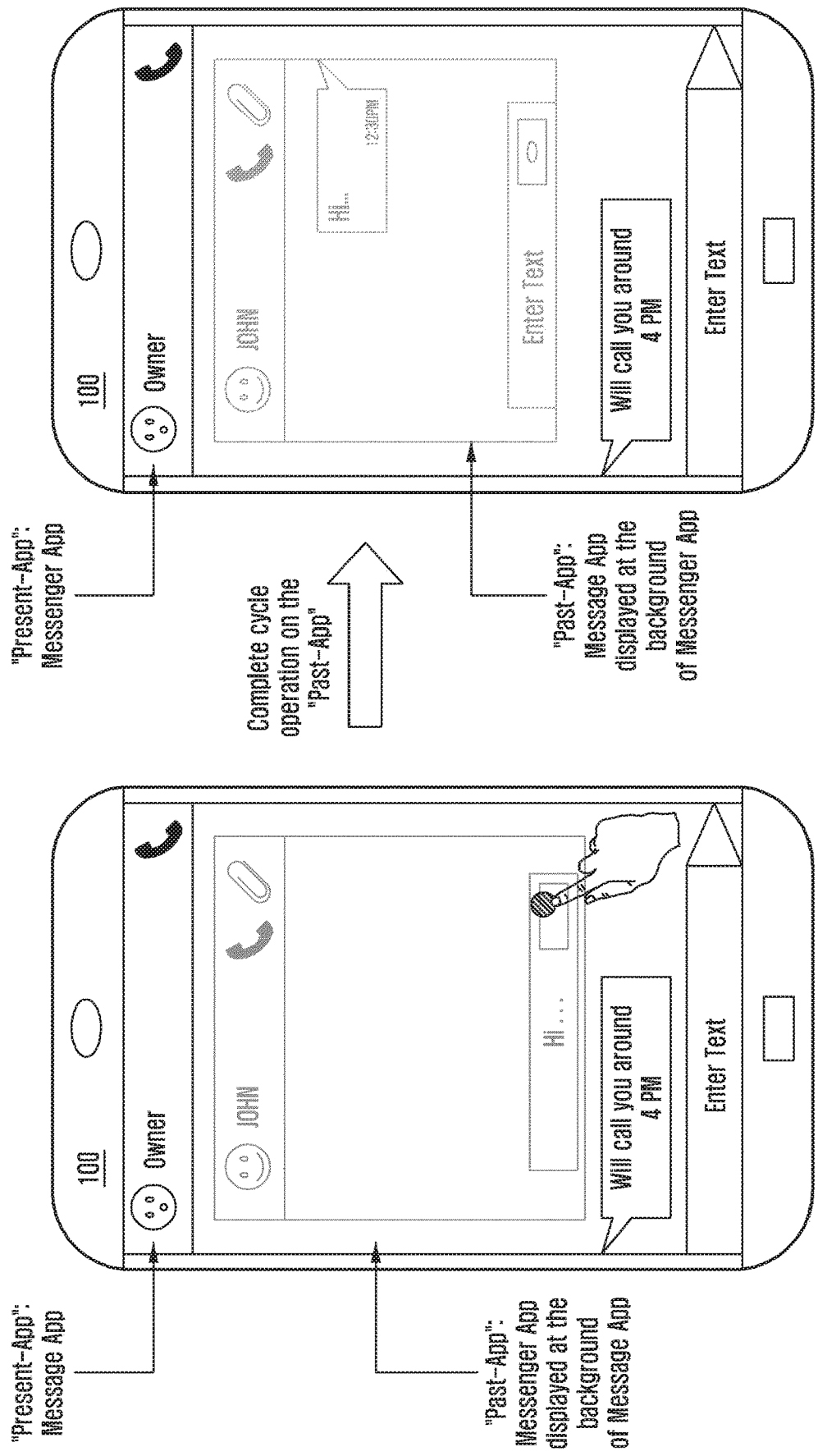
FIG. 9 is an example scenario in which a complete cycle operation is performed on a second application, according to an embodiment as disclosed herein of the present disclosure.

FIG. 9 is an example scenario in which a complete cycle operation is performed on a second application, according to an embodiment of the present disclosure.

Referring to FIG. 9, consider a scenario where the first application 200 is the SMS application and the second application 300 is the Messenger application as shown in the FIG. 9. Initially, the second application 300 is the "Past-App" and the first application 200 is the "Present-App" which is active. The graphical representation of the second application 300 is displayed within the graphical representation of the first application 200.

The controller unit 120 detects the user input (i.e., the user gesture such as the double tap with two fingers) on the portion (i.e., non "Present-App" area) of the graphical representation of the second application 300 displayed in the background portion of the graphical representation of the first application 200. The controller unit 120 detects the application interaction event based on the user input.

As shown in the FIG. 9, the user provides the touch input on the "Send Button" to perform "Send" operation. The controller unit 120 in communication with the communication unit 150 provides the same input to the "Past-App" i.e., on the same area of the Messenger App. The Messenger App accordingly performs the operation of sending the message.

The controller unit 120 performs the action on the second application 300 corresponding to the user input on the background of the first application 200 by executing the corresponding handler method. The updated graphical representation of the second application 300 is captured.

After capturing the updated graphical representation of the second application 300, the second application 300 is set as the background application and the first application 200 is set as the foreground application 200. The updated graphical representation of the first application 200 is displayed. The updated graphical representation of the first application 200 displays the updated representation of the second application 300 in the background portion of the updated graphical representation of the first application 200. Referring to FIG. 9, the captured screenshot of the second application 300 is set as the background for the first application 200 by specifying change of the background dynamically with the certain opacity (or transparency) level. If the user has specified the opacity level then, the background image for the desired opacity level is pre-processed.

Figure 10A:
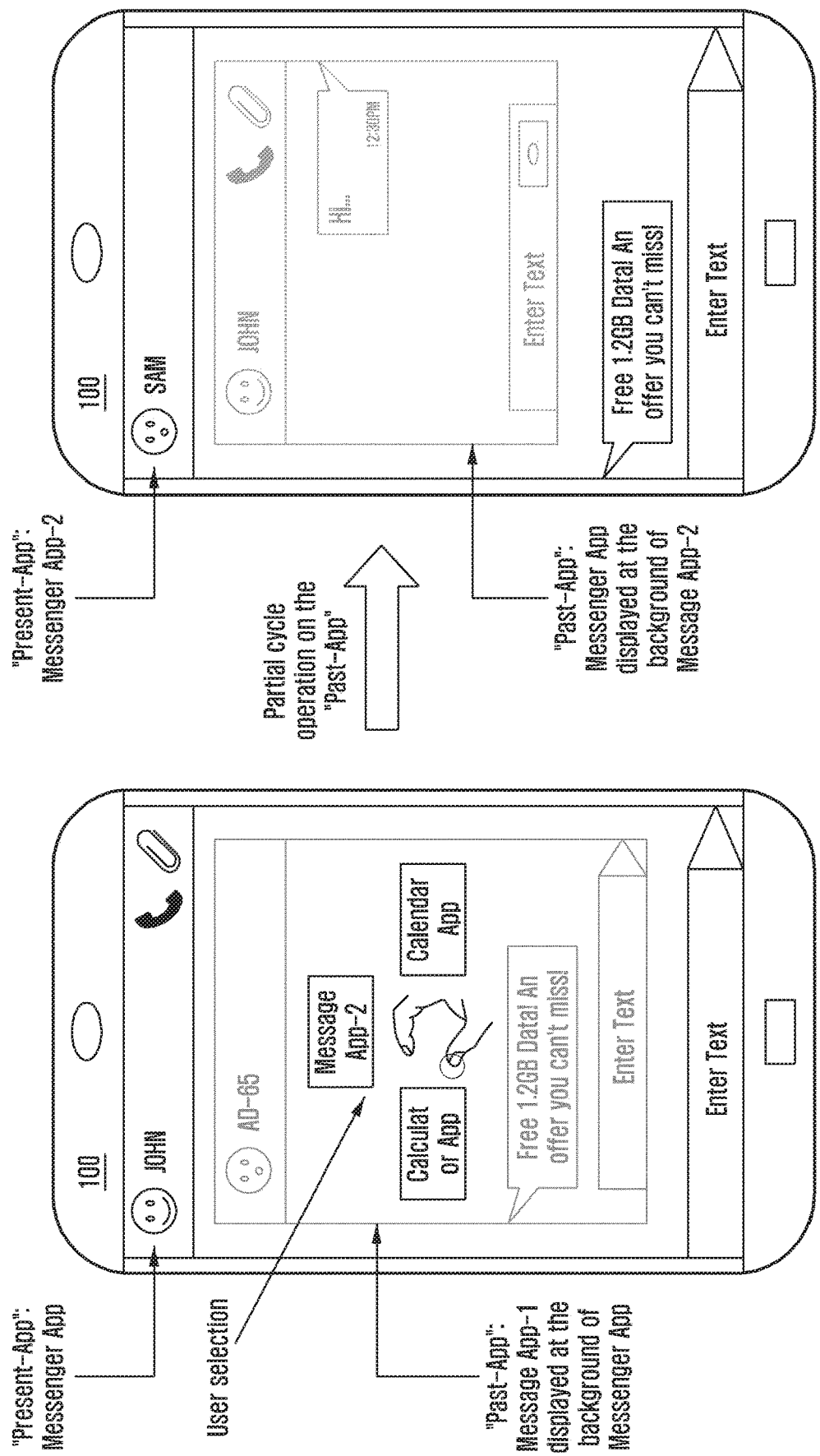
FIG. 10A is an example scenario in which a partial cycle operation is performed for selecting a "Past-App", according to an embodiment of the present disclosure.

FIG. 10A is an example scenario in which a partial cycle operation is performed for selecting a "Past-App", according to an embodiment of the present disclosure.

Referring to FIG. 10A, consider the first application 200 is the Messenger application and the second application 300 is the Message-1 application as shown in FIG. 10A. Initially, the first application 200 is the "Present-App" which is active and the second application 300 is the "Past-App". The graphical representation of the second application 300 is displayed within the graphical representation of the first application 200.

Selecting the Second Application 300 (i.e., "Past-App"):

Unlike methods of the related art, the user is provided with the second application 300 by making the snapshot (i.e., graphical representation) of the second application 300 as the background of the first application 200 (i.e., "Present-App"). Thus, allowing the user to simultaneously handle the first application 200 and the second application 300. Often, the user may require to access simultaneously with some other "Past-App" other than the recent "Past-App" (which is currently made as the background of the "Present-App" as shown in FIG. 10A). The below described method allows the user to change the background of the first application 200 i.e., the "Past-App".

Initially, referring to FIG. 10A, the user accesses the "Opened App list". All the "Past-App" is displayed in, for example but not limited to, a circular user interface (UI). The controller unit 120 detects the user input on the portion of the graphical representation of the second application 300 displayed in the background portion of the graphical representation of the first application 200. The user input (i.e., double tap on the background and rotate on the background) is performed to select the "Past-App" from the "Opened App list". After selection of the "Past-App", it is determined whether the user trigger was for the partial cycle operation and thus the partial cycle operation can be performed as described in conjunction with the FIG. 8.

FIG. 10B is an example scenario in which a complete cycle operation is performed for selecting a "Past-App", according to an embodiment of the present disclosure.

Referring to FIG. 10B, consider the first application 200 is the Messenger application and the second application 300 is the SMS application as shown in the FIG. 10B. Initially, the second application 300 is the "Past-App" and the first application 200 is the "Present-App" which is active. The graphical representation of the second application 300 is displayed within the graphical representation of the first application 200.

Initially, referring to FIG. 10B, the user accesses the "Opened App list". All the "Past-App" is displayed in, for example but not limited to, the circular UI. The controller unit 120 detects the user input on the portion of the graphical representation of the second application 300 displayed in the background portion of the graphical representation of the first application 200. The user input (i.e., double tap on the background with two fingers and rotate gesture on the background) is performed to select the "Past-App" (i.e., Calculator App) from the "Opened App list". The controller unit 120 detects the graphical representation of the Calculator application.

The Calculator application is set as the background application and the Messenger application is set as the foreground application. The updated graphical representation of the Messenger application is displayed. The updated graphical representation of the Messenger application displays the updated representation of the Calculator application in the background portion of the updated graphical representation of the Messenger application.

Referring to FIG. 10B, the captured screenshot of the Calculator application is set as the background for the Messenger application by specifying change of the background dynamically with the certain opacity (or transparency) level. If the user has specified the opacity level then, the background image for the desired opacity level is pre-processed.

Figure 11:
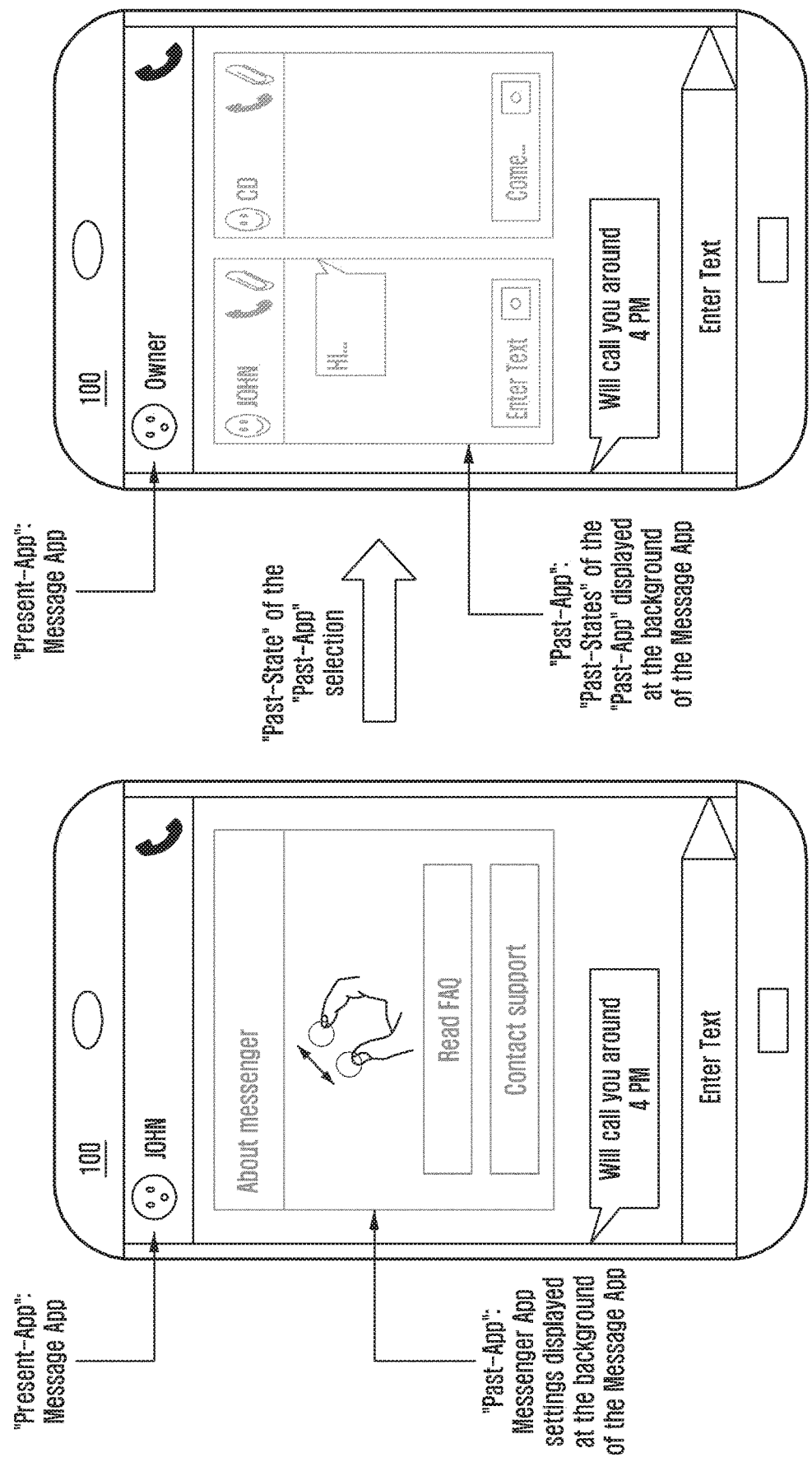
FIG. 11 is an example scenario in which a "Past-State" of the "Past-App" is accessed by a user, according to an embodiment of the present disclosure.

FIG. 11 is an example scenario in which a "Past-State" of a "Past-App" is accessed by a user, according to an embodiment of the present disclosure.

Referring to FIG. 11, consider the first application 200 is the SMS application, the second application 300 is the Messenger application, and the "Past-State" of the second application 300 is Messenger settings as shown in the FIG. 11. Initially, the first application 200 is the "Present-App" which is active and the second application 300 is the "Past-App". The graphical representation of the second application 300 is displayed within the graphical representation of the first application 200.

Selecting the "Past-State" of the "Past-App":

The proposed method allows the user to navigate to the program state domain of the "Past-App". The controller unit 120 continuously tracks the recent past program states of the "Past-App" and stores the same in the memory unit 140. After receiving the user input (i.e., double tap with finger(s) and pinch out) for loading the "Past-State" of the "Past-App" as shown in the FIG. 11, the program state of the "Past-App" stored in the memory unit 140 is loaded. Further, the background of the "Present-App" is changed.

The controller unit 120 detects the application interaction event based on the user input and invokes the "Past-State" of the "Past-App". The user accesses the "Past-State" list corresponding to the "Past-App" as shown in the FIG. 11. The controller unit 120 detects the user input for selecting the "Past-State" of the "Past-App". After selecting the "Past-State", the program state of the "Past-App" stored in the memory unit 140 is loaded. If the user triggers the partial cycle operation, then the partial cycle operation may be performed on the selected "Past-State" of the "Past-App" as described above. If the user triggers the complete cycle operation, then the complete cycle operation may be performed on the selected "Past-State" of the "Past-App" as described above.

Figure 12:
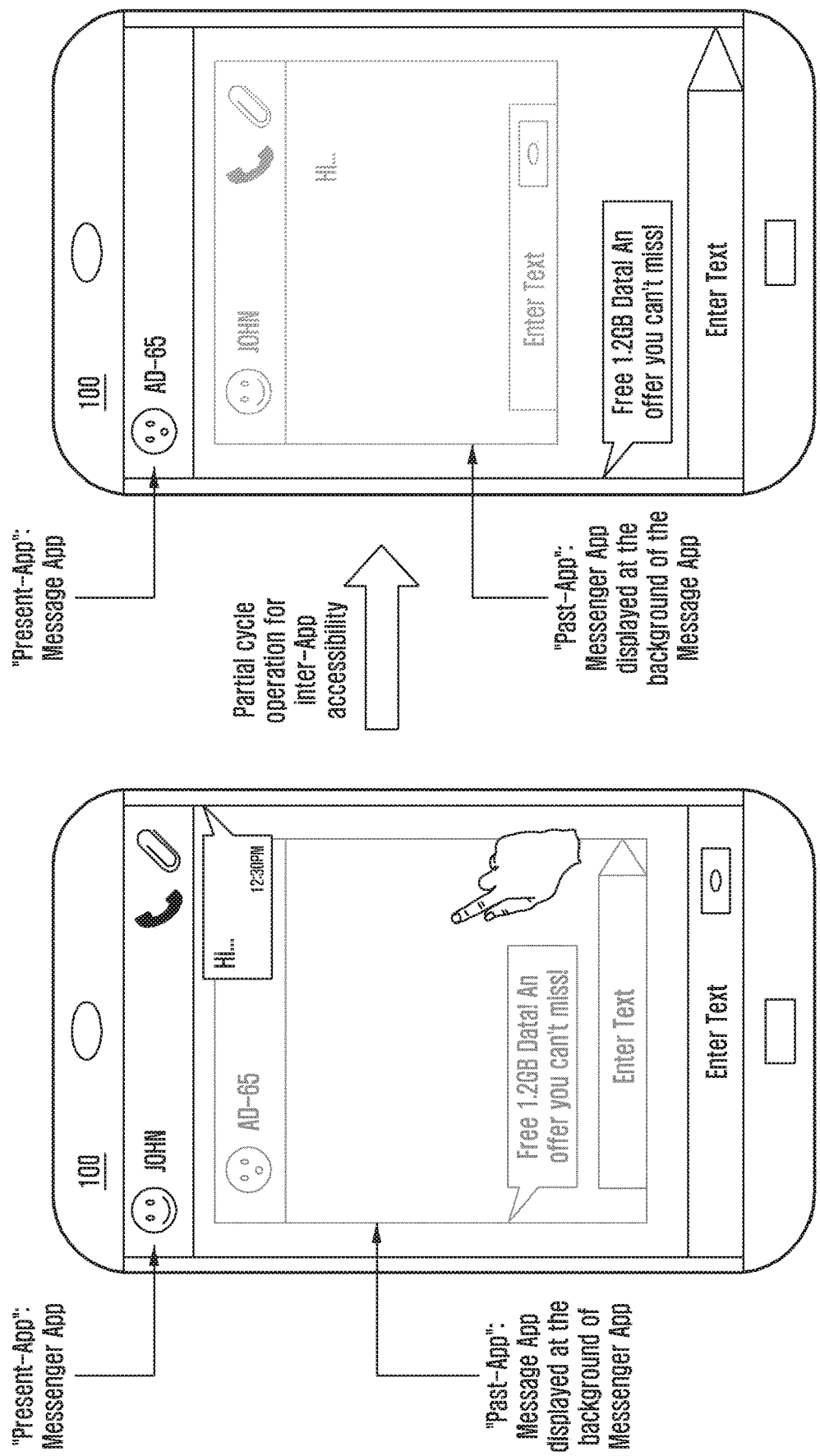
FIG. 12 is an example scenario in which a partial cycle operation is performed for inter-application accessibility, according to an embodiment of the present disclosure.

FIG. 12 is an example scenario in which a partial cycle operation is performed for inter-application accessibility, according to an embodiment of the present disclosure.

Referring to FIG. 12, the first application 200 is the "Present-App" which is currently active and the second application 300 is the "Past-App". The graphical representation of the second application 300 is displayed within the graphical representation of the first application 200.

Inter-Application Accessibility:

The proposed method enables the user to conveniently and quickly access the second application 300 from the first application 200 by performing the gesture (i.e., user input) on the background portion of the graphical representation of the first application 200. Referring to FIG. 12, the user performs the gesture (i.e., double tap) on the background portion of the "Present-App". The controller unit 120 detects the application interaction event based on the user input and captures the graphical representation of the first application 200 displayed on the screen of the electronic device 100.

After capturing the graphical representation of the first application 200, the second application 300 is set as the foreground application and the first application 200 as the background application. The updated graphical representation of the second application 300 is displayed, where the updated graphical representation of the second application 300 displays the captured graphical representation of the first application 200 in the background portion of the updated graphical representation of the second application 300.

FIGS. 13A to 13D are example scenarios in which a "Past-State" of a "Past-App" is selected and a partial cycle operation is performed on the "Past-App", according to an embodiment of the present disclosure.

Figure 13A:
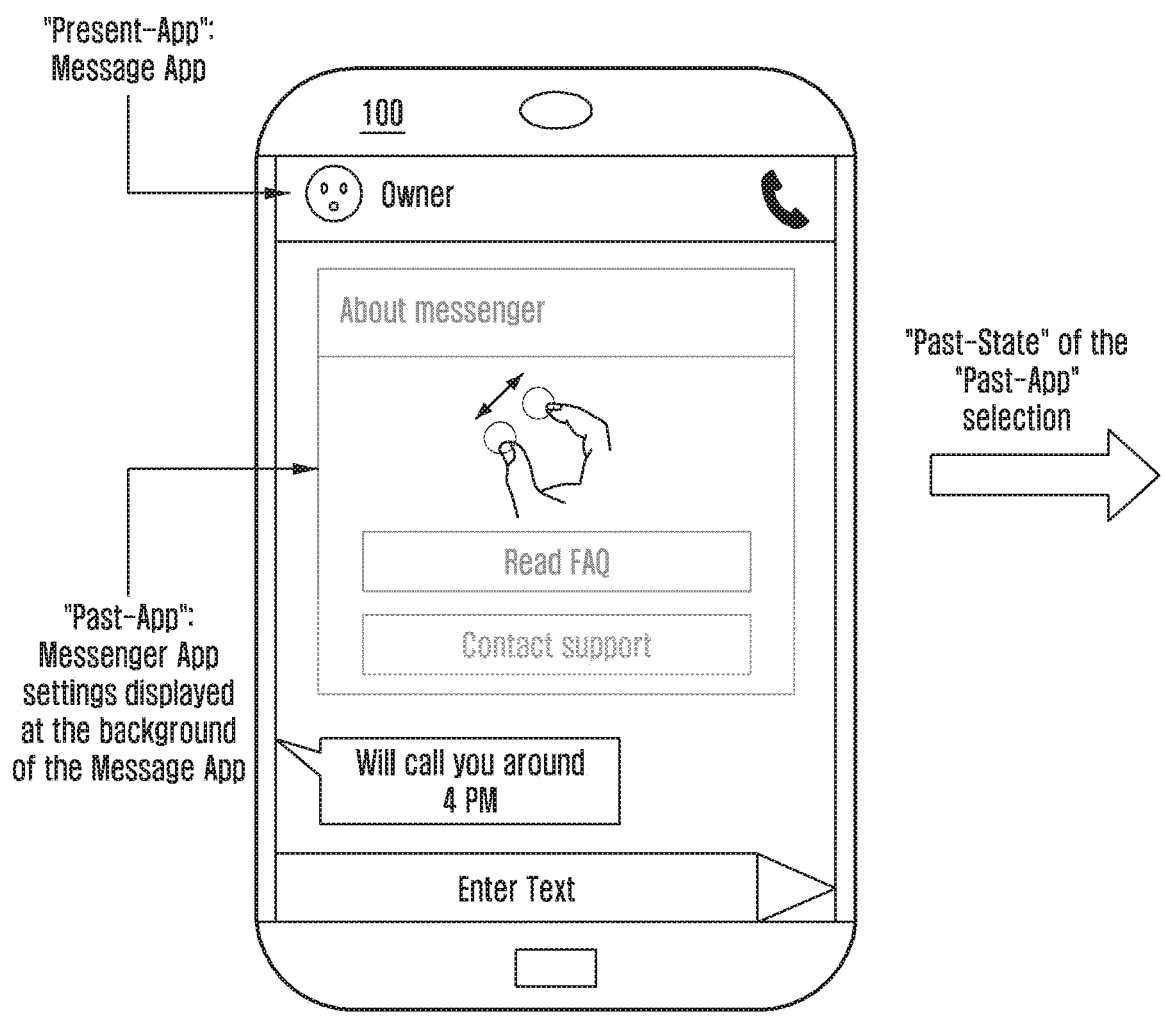
FIGS. 13A, 13B, 13C, and 13D are example scenarios in which a "Past-State" of a "Past-App" is selected and a partial cycle operation is performed on the "Past-App", according to an embodiment of the present disclosure.

Referring to FIGS. 13A to 13D, consider the first application 200 is the SMS application, the second application 300 is the Messenger application, the "Past-States" of the second application 300 is Messenger settings as shown in the FIG. 13A. Initially, the first application 200 is the "Present-App" which is active and the second application 300 is the "Past-App". The graphical representation of the second application 300 is displayed within the graphical representation of the first application 200.

Figure 13B:
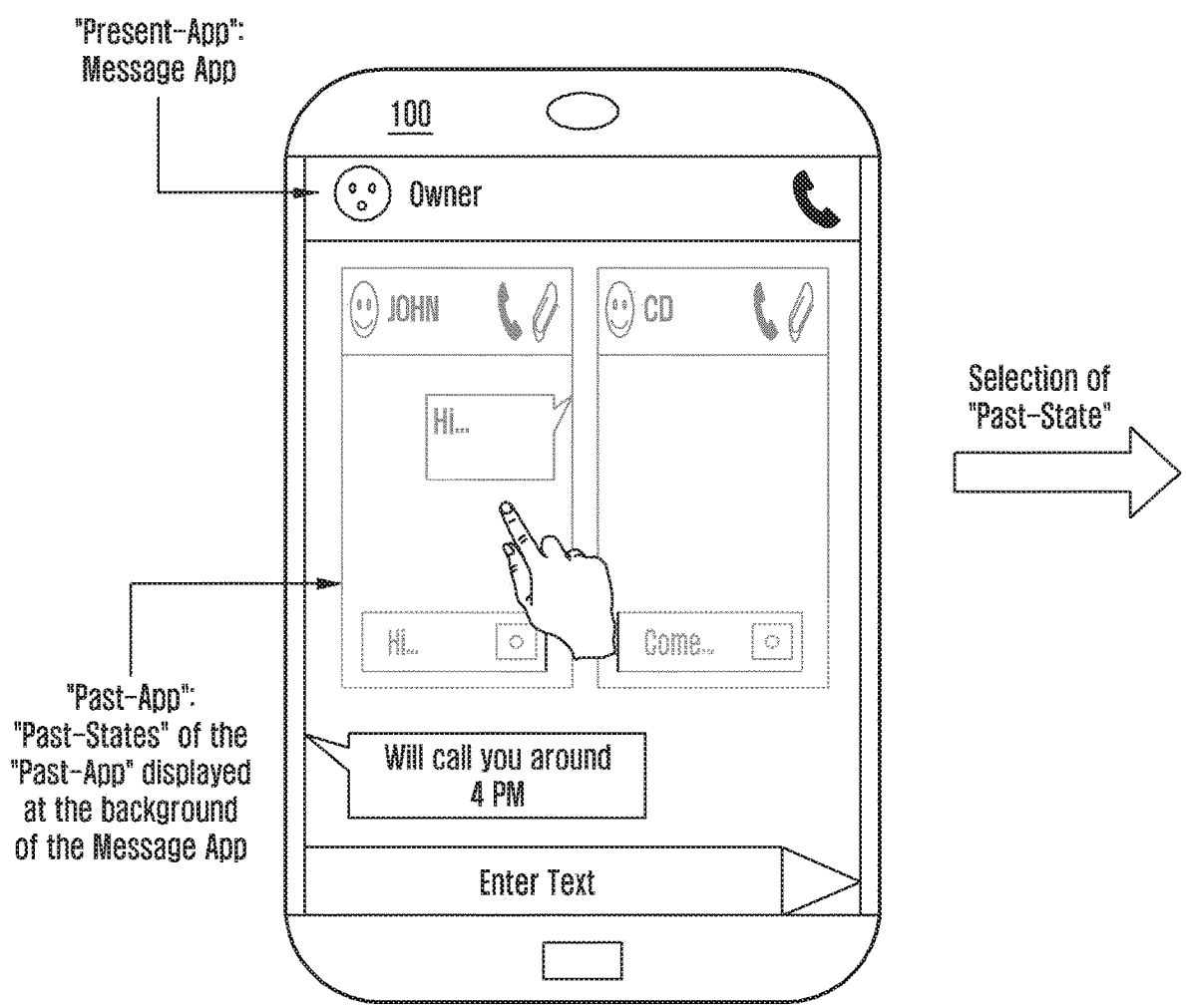
Figure 13C:
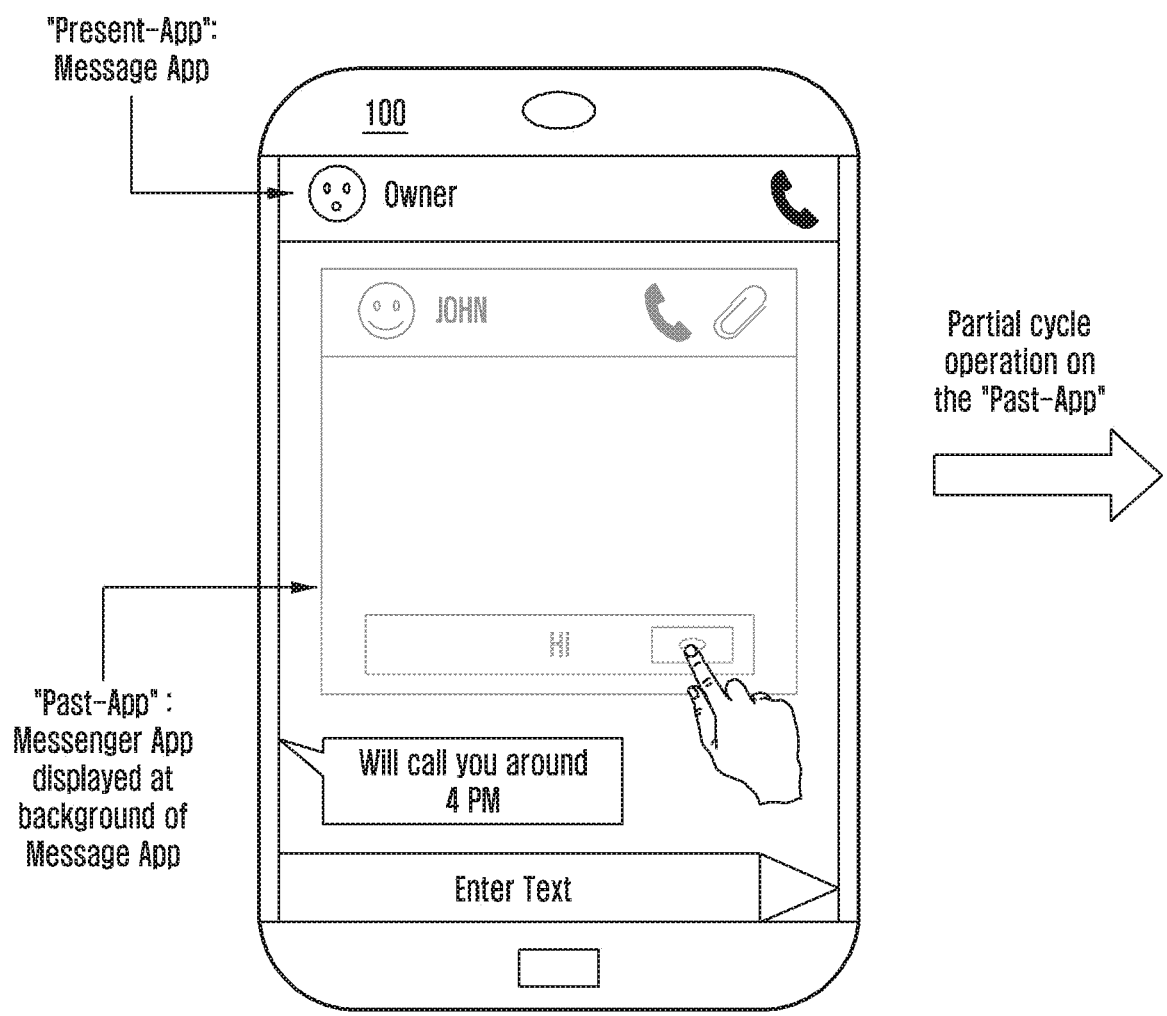
Figure 13D:
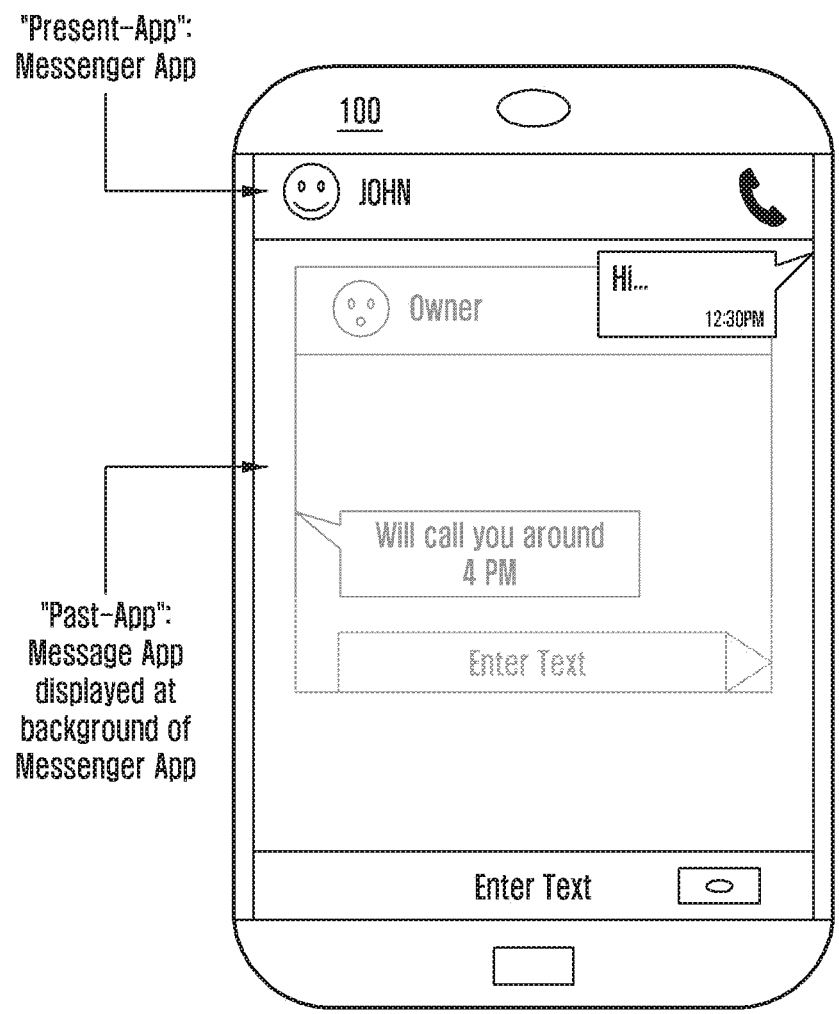

The controller unit 120 detects the user input (i.e., double tap with two fingers and pinch out) for loading the "Past-State" of the "Past-App" as shown in FIG. 13A. The program state of the "Past-App" stored in the memory unit 140 is loaded. The background of the "Present-App" is changed. The controller unit 120 detects the application interaction event based on the user input and invokes the "Past-State" of the "Past-App". The user accesses the "Past-State" list corresponding to the "Past-App" as shown in FIG. 13B. The controller unit 120 detects the user input for selecting the "Past-State" of the "Past-App" as shown in the FIG. 13B. After selecting the "Past-State", the program state of the "Past-App" stored in the memory unit 140 is loaded as shown in FIG. 13C. The graphical representation of the "Past-State" of the "Past-App" is displayed within the graphical representation of the "Present-App".

Referring to FIG. 13C, the user provides the touch input for operation of "Send" on the area where the "Send Button" is displayed on the background portion of the "Present-App" i.e., Message application. The controller unit 120 in communication with the communication unit 150 provides the same input to the "Past-App" i.e., on the same area of the Messenger application. The Messenger application accordingly performs the operation of sending the message. After sending the message, the controller unit 120 captures the graphical representation of the first application 200 (i.e., capturing a screenshot of the "Present-App") displayed on the screen of the electronic device 100. After capturing the graphical representation of the first application 200, the second application 300 is set as the foreground application. The first application 200 (Previous "Present-App") is set as the "Past-App". Further, the controller unit 120 displays the updated graphical representation of the second application 300. The updated graphical representation of the second application 300 displays the captured graphical representation of the first application 200 in the background portion of the updated graphical representation of the second application 300 as shown in the FIG. 13D.

FIGS. 14A to 14D are example scenarios in which a "Past-State" of a "Past-App" is selected and a complete cycle operation is performed on the "Past-App", according to an embodiment of the present disclosure.

Figure 14A:
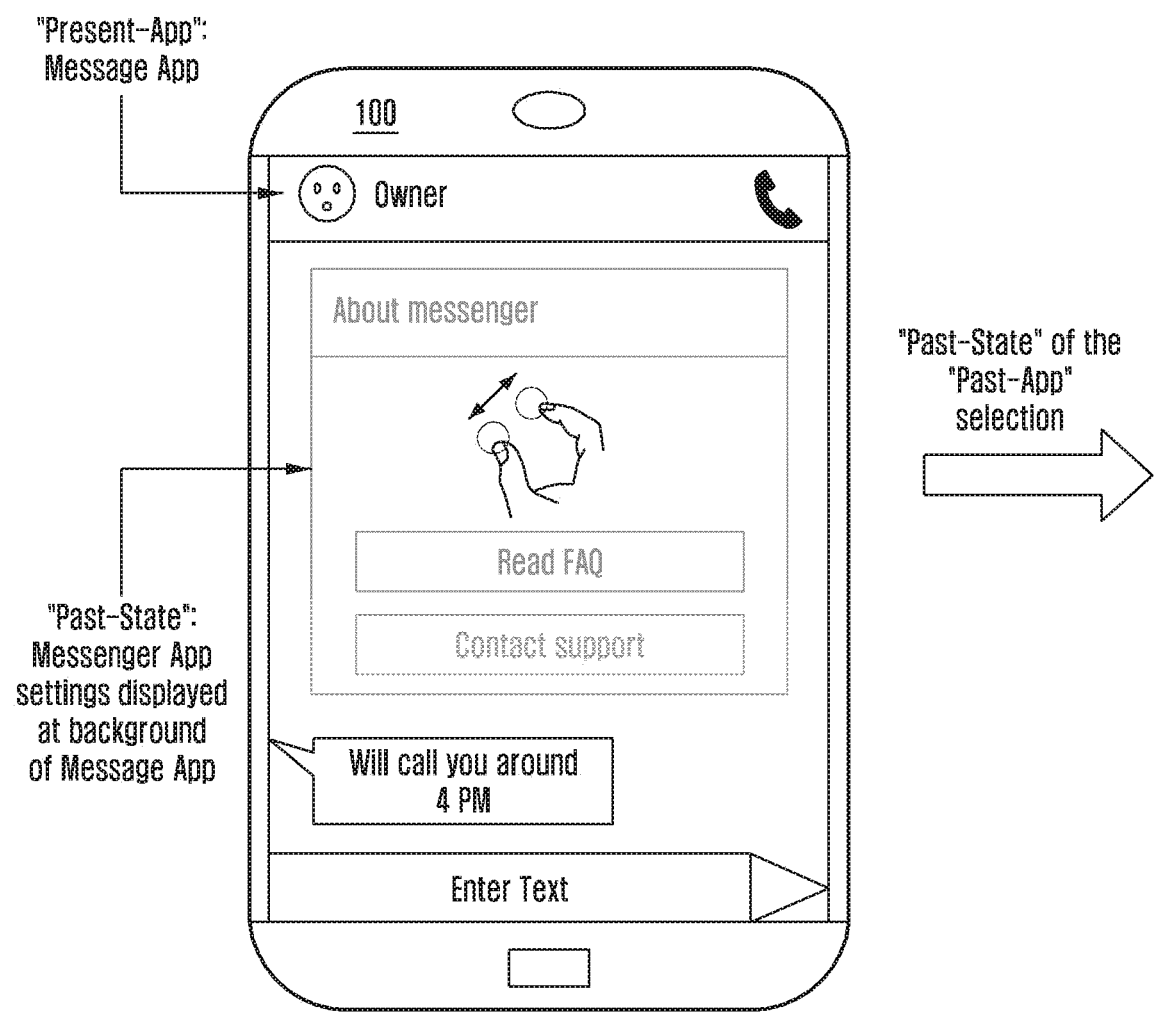
FIGS. 14A, 14B, 14C, and 14D are example scenarios in which a "Past-State" of a "Past-App" is selected and a complete cycle operation is performed on the "Past-App", according to an embodiment of the present disclosure.

Referring to FIGS. 14A to 14D, consider the first application 200 is the SMS application, the second application 300 is the Messenger application, and the "Past-State" of the second application 300 is the Messenger settings as shown in the FIG. 14A. Initially, the first application 200 is the "Present-App" which is active and the second application 300 is the "Past-App". The graphical representation of the second application 300 is displayed within the graphical representation of the first application 200.

Figure 14B:
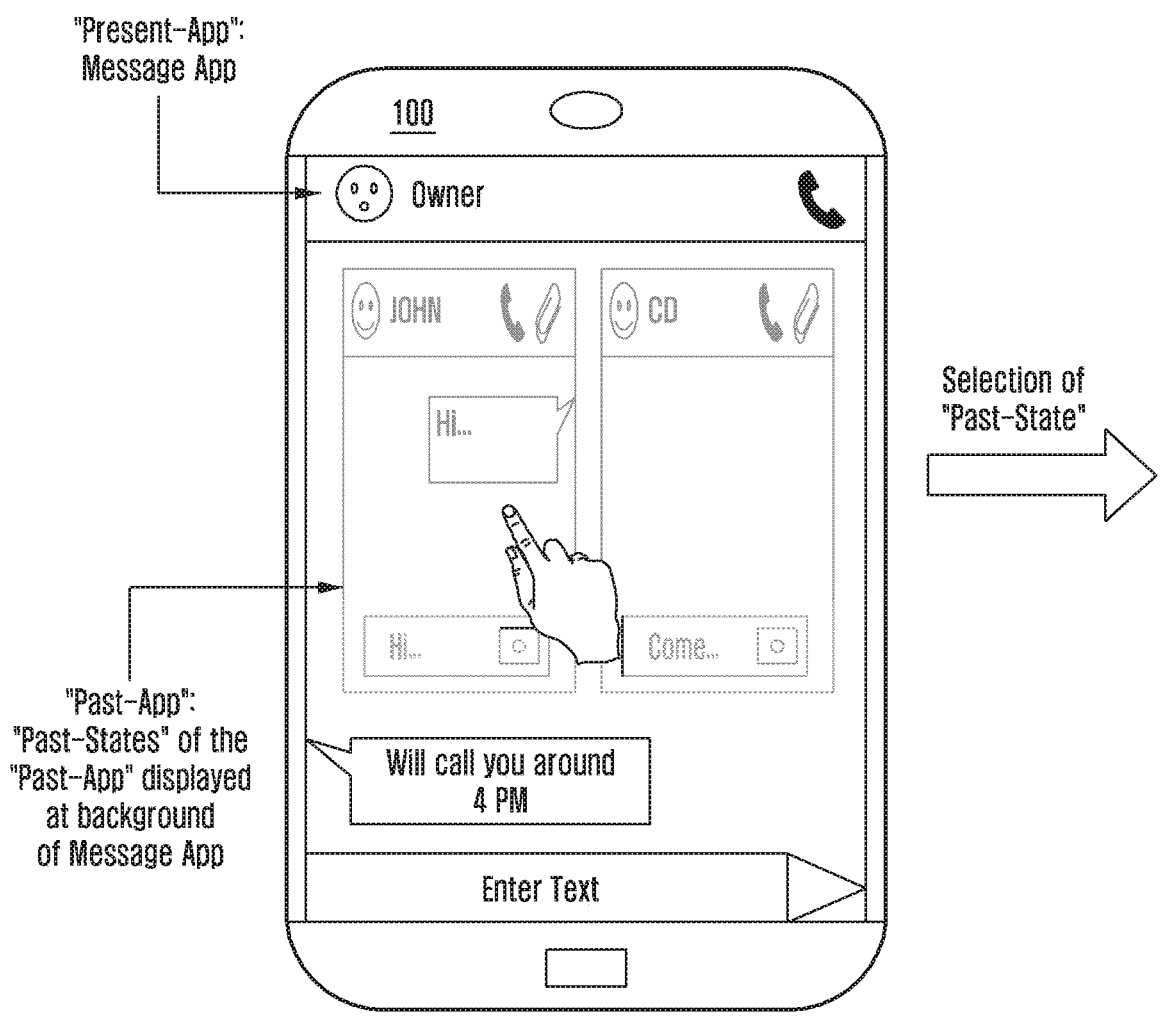

The controller unit 120 detects the user input (i.e., double tap with two fingers and pinch out) on the at least one portion of the graphical representation of the second application 300. The user input is performed for loading the "Past-State" of the "Past-App" as shown in FIG. 14A. The program state of the "Past-App" stored in the memory unit 140 is loaded. Further, the controller unit 120 displays the graphical representation of the at least one state of the second application 300 within the graphical representation of the first application 200 based on the user input as shown in FIG. 14B. Further, the background of the "Present-App" is changed.

Figure 14C:
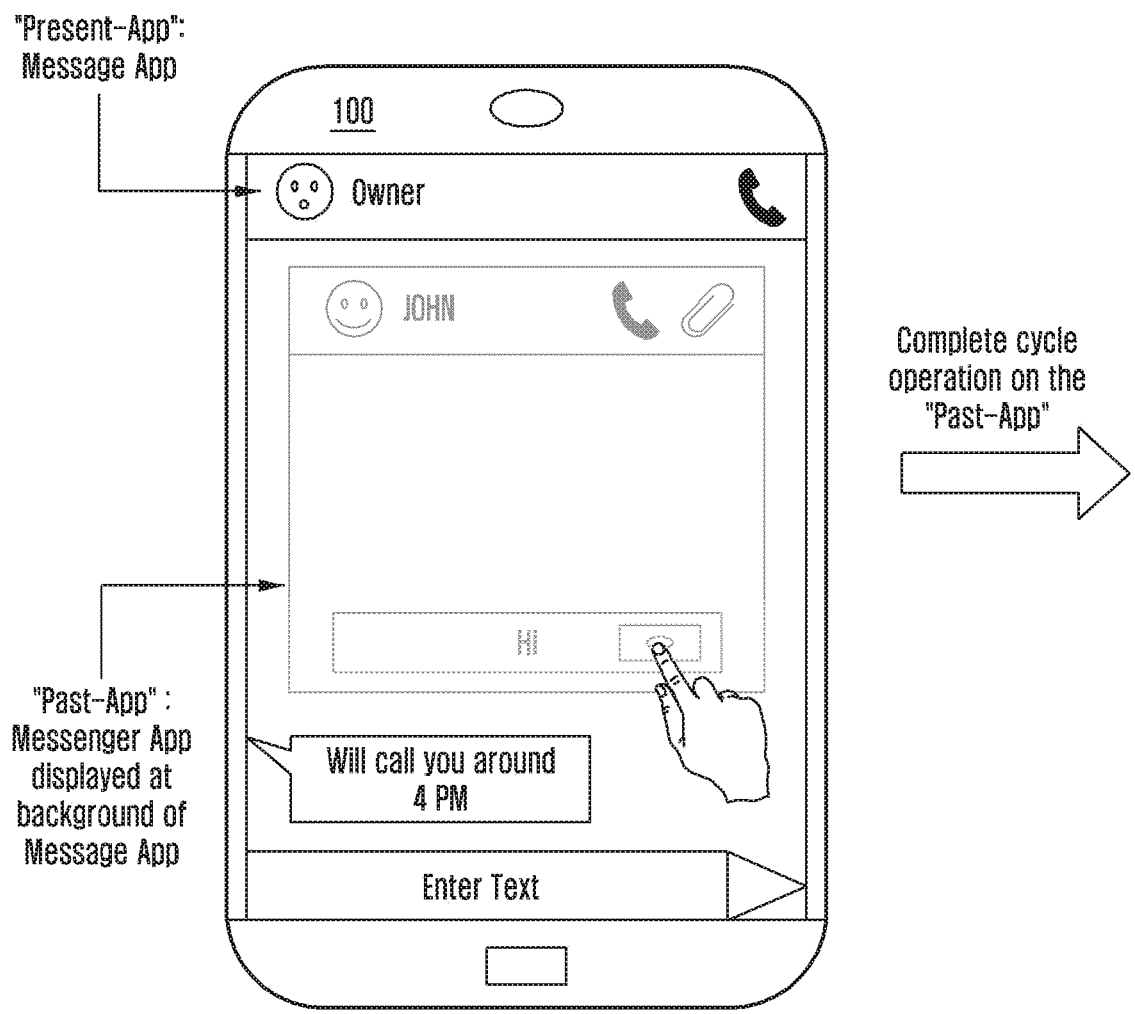

The user accesses the "Past-State" list corresponding to the "Past-App" as shown in FIG. 14B. The controller unit 120 detects the user input on the portion of the graphical representation of the second application 300. The controller unit 120 detects the user input for selecting the "Past-State" of the "Past-App" as shown in FIG. 14B. After selecting the "Past-State", the program state of the "Past-App" stored in the memory unit 140 is loaded as shown in FIG. 14C. The graphical representation of the "Past-State" of the "Past-App" is displayed within the graphical representation of the "Present-App".

Figure 14D:
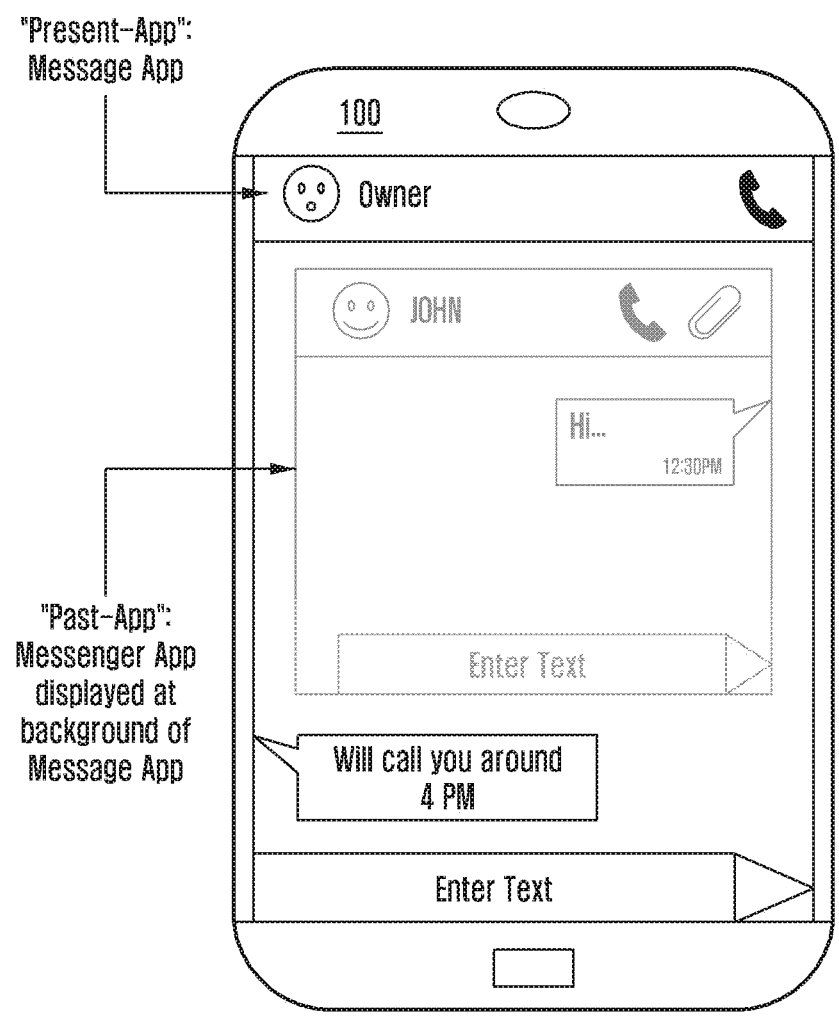

Referring to FIG. 14C, the user provides the touch input on the "Send Button" displayed at the background portion of the "Present-App" i.e., Message application to perform "Send" operation. The controller unit 120 in communication with the communication unit 150 provides the same input to the "Past-App" i.e., on the same area of the Messenger application. The Messenger application accordingly performs the operation of sending the message based on the application interaction event. The updated graphical representation of the "Past-State" of the second application 300 is captured. The controller unit 120 displays the upgraded graphical representation of the first application 200 as shown in FIG. 14D. The updated graphical representation of the first application 200 displays the updated representation of the "Past-State" of the second application 300 in the background portion of the updated graphical representation of the first application 200.

Figure 15:
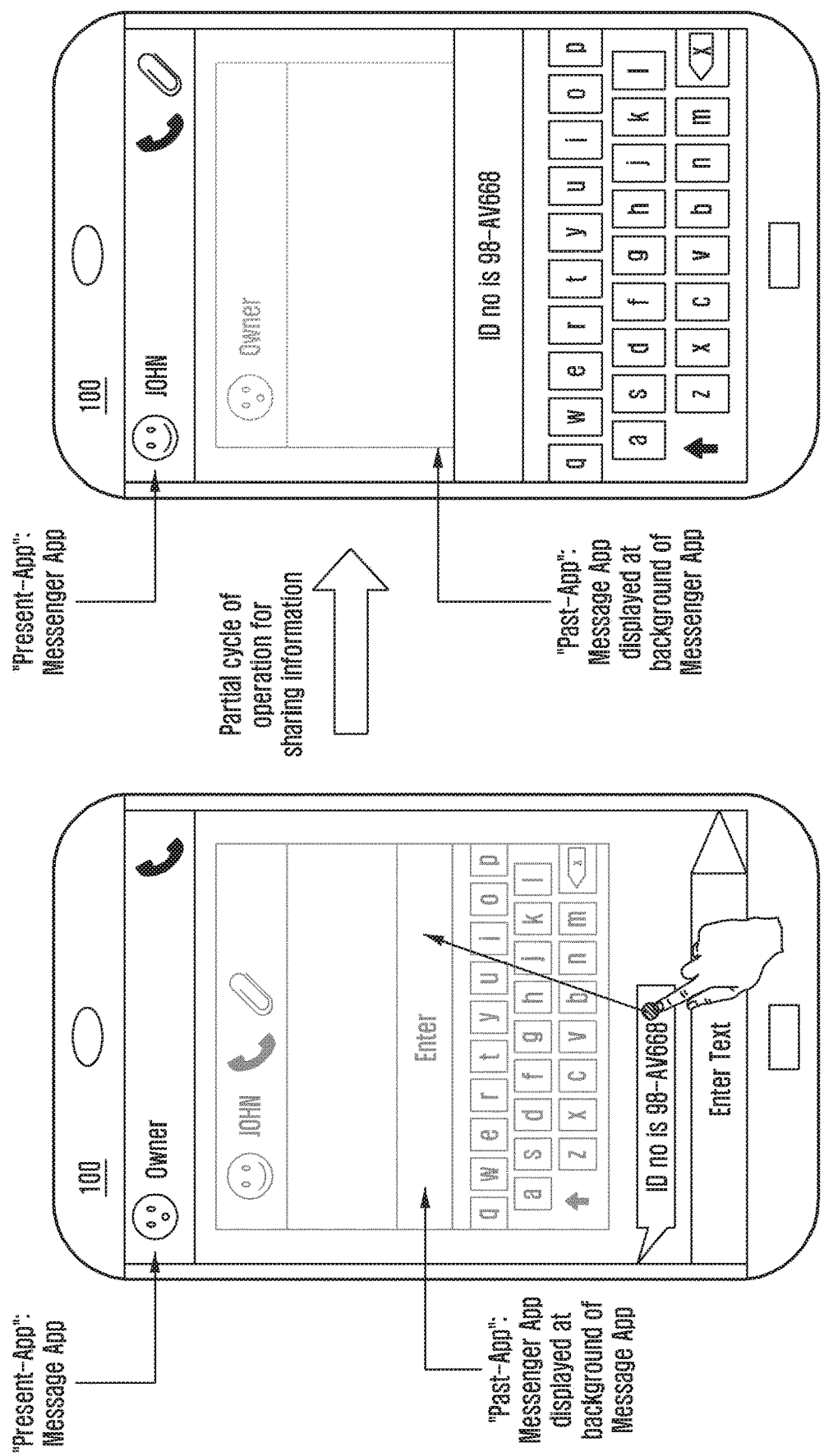
FIG. 15 is an example scenario in which a partial cycle operation is performed to share information from a "Present-App" to a "Past-App", according to an embodiment of the present disclosure.

FIG. 15 is an example scenario in which a partial cycle operation is performed to share information from a "Present-App" to a "Past-App", according to an embodiment of the present disclosure.

Referring to FIG. 15, consider the first application 200 is the SMS application and the second application 300 is the Messenger application as shown in the FIG. 15. Initially, the second application 300 is the "Past-App" and the first application 200 is the "Present-App" which is active. The graphical representation of the second application 300 is displayed within the graphical representation of the first application 200.

The user may want to not only view the information on the "Present-App" but also share the information to the "Past-App". The proposed method allows the user to share the information from the "Present-App" to the "Past-App" simultaneously in the partial cycle operation.

Sharing the Information from the "Present-App" to the "Past-App":

The controller unit 120 detect the user input (i.e., drag and drop gesture) on the portion of the graphical representation of the "Present-App". The user performs the user input for share the information from the "Present-App" to the "Past-App". The controller unit 120 detects the application interaction event based on the user input. The controller unit 120 in communication with the communication unit 150 shares the information from the "Present-App" to the "Past-App". The graphical representation of the "Present-App" displayed on the screen of the electronic device 100 is captured. In this scenario, the user can drag and drop the required information from the "Present-App" to the area on the background portion as shown in FIG. 15. The information is copied and pasted or shared on the area of the "Past-App" corresponding to the specific area of the background portion where the information is dropped as shown in FIG. 15. After sharing the information, the updated graphical representation of the second application 300 is displayed. The updated graphical representation of the second application 300 displays the captured graphical representation of the first application 200 in the background portion of the updated graphical representation of the second application 300.

The Android framework provides a powerful clipboard-based framework to perform copy operation and past operation. The Android framework supports both simple and complex data types, including text strings, complex data structures, text and binary stream data, and even application assets. Simple text data is stored directly in the clipboard, while complex data is stored as a reference that the pasting application resolves with the content provider 130. The content provider 130 supplies the content from one application to another on request in android. Copying and pasting works both within the application and between the applications that implement the android framework.

Figure 16:
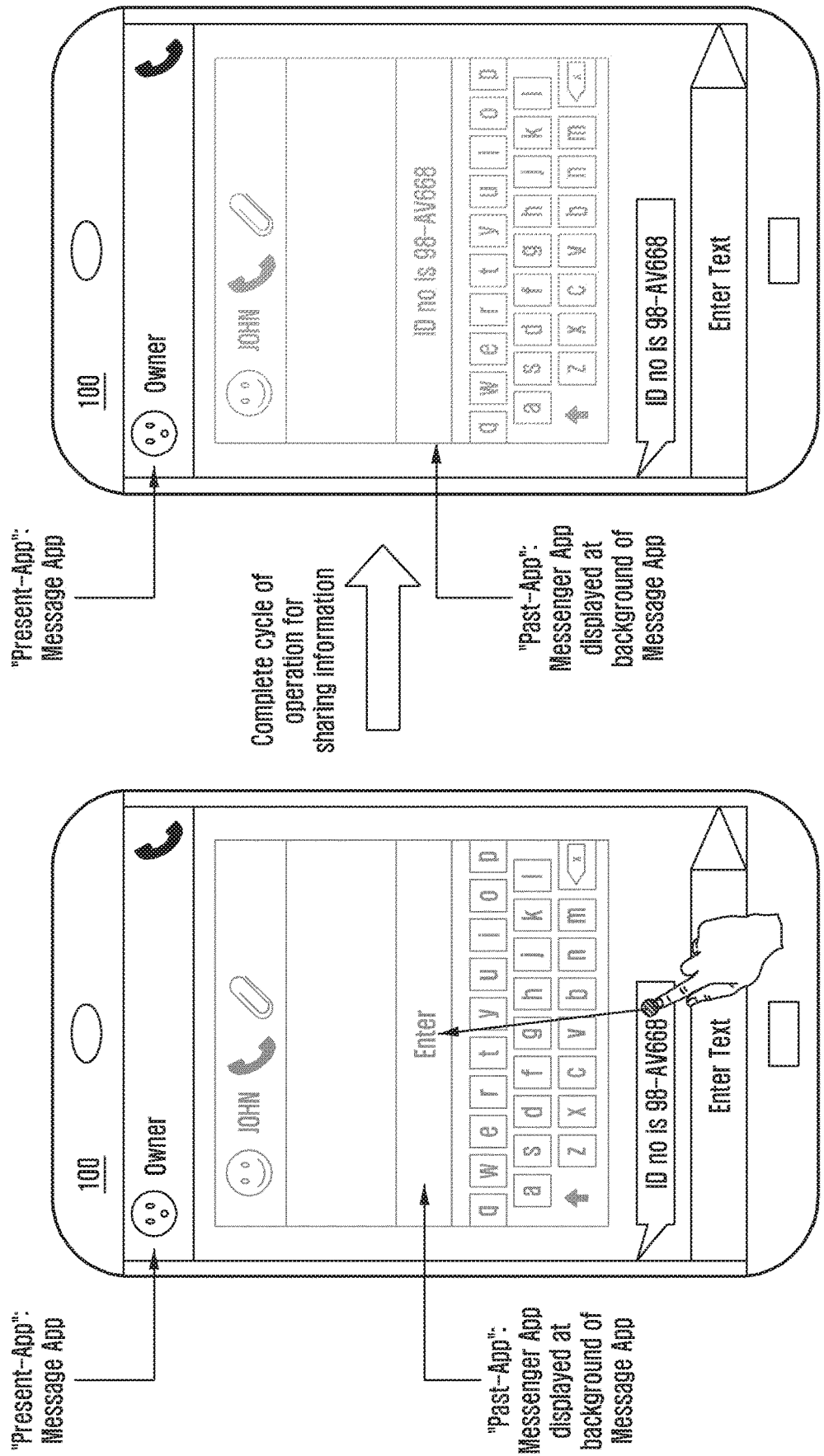
FIG. 16 is an example scenario in which a complete cycle operation is performed to share information from a "Present-App" to a "Past-App", according to an embodiment as disclosed herein of the present disclosure.

FIG. 16 is an example scenario in which a complete cycle operation is performed to share information from a "Present-App" to a "Past-App", according to an embodiment of the present disclosure.

Referring to FIG. 16, the controller unit 120 detects the user input (i.e., drag and drop gesture) on the portion of the graphical representation of the "Present-App". The user performs the user input for triggering the information sharing from the "Present-App" to the "Past-App". The controller unit 120 detects the application interaction event based on the user input. In this scenario, the user can drag and drop the required information from the "Present-App" to the area on the background portion as shown in the FIG. 16.

The information is copied and pasted/shared on the area of the "Past-App" corresponding to the specified area of the background portion where the information is dropped as shown in the FIG. 16. After sharing the information, the updated graphical representation of the second application 300 is captured. The updated graphical representation of the first application 200 is displayed. The updated graphical representation of the first application 200 displays the updated representation of the second application 300 in the background portion of the updated graphical representation of the first application 200 as shown in FIG. 16.

Figure 17:
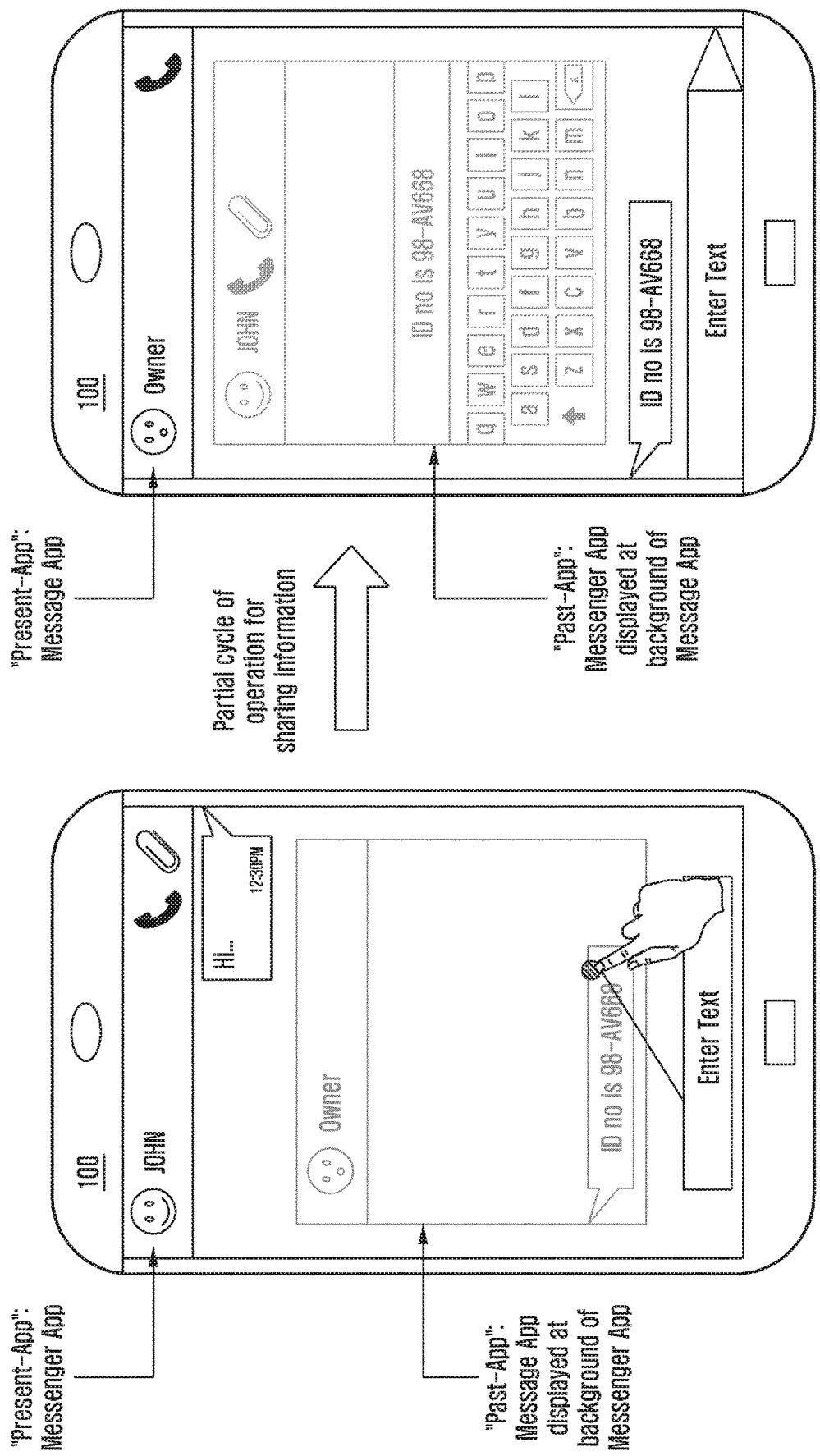
FIG. 17 is an example scenario in which a partial cycle operation is performed to share information from a "Past-App" to a "Present-App", according to an embodiment of the present disclosure.

FIG. 17 is an example scenario in which a partial cycle operation is performed to share information from a "Past-App" to a "Present-App", according to an embodiment of the present disclosure.

Sharing the Information from the "Past-App" to the "Present-App":

Referring to FIG. 17, the controller unit 120 detects the user input (i.e., drag and drop gesture) on the portion of the graphical representation of the "Past-App". The user performs the user input for triggering the information sharing from the "Past-App" to the "Present-App". The controller unit 120 detects the application interaction event based on the user input. The controller unit 120 in communication with the communication unit 150 shares the information from the "Past-App" to the "Present-App". The graphical representation of the "Past-App" displayed on the screen of the electronic device 100 is captured. In this scenario, the user can perform drag and drop gesture on the required information from the "Past-App" to the area on the foreground portion as shown in FIG. 17. The information is copied and pasted or shared on the area of the "Present-App" corresponding to the specific area of the foreground portion where the information is dropped as shown in the FIG. 17. After sharing the information, the updated graphical representation of the second application 300 is displayed. The updated graphical representation of the second application 300 displays the captured graphical representation of the first application 200 in the background portion of the updated graphical representation of the second application 300.

Figure 18:
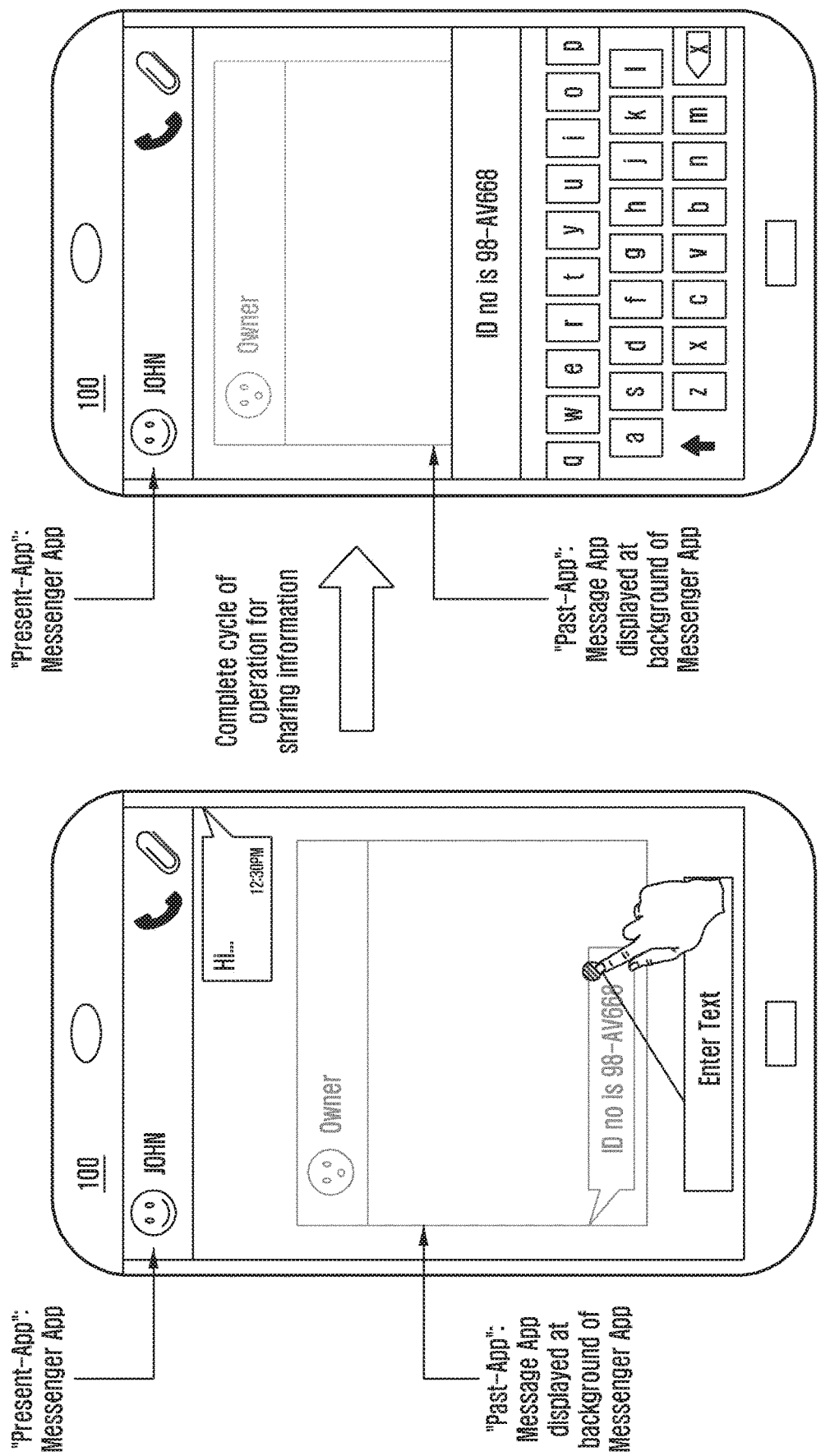
FIG. 18 is an example scenario in which a complete cycle operation is performed to share information from a "Past-App" to a "Present-App", according to an embodiment of the present disclosure.

FIG. 18 is an example scenario in which a complete cycle operation is performed to share information from a "Past-App" to a "Present-App", according to an embodiment of the present disclosure.

Referring to FIG. 18, the controller unit 120 detects the user input (i.e., drag and drop gesture) on the portion of the graphical representation of the "Past-App". The user performs the user input for triggering the information sharing from the "Past-App" to the "Present-App". The controller unit 120 detects the application interaction event based on the user input. In this scenario, the user can drag and drop the required information from the "Past-App" to the area on the foreground portion as shown in the FIG. 18.

The information is copied and pasted/shared on the area of the "Present-App" corresponding to the specified area of the foreground portion where the information is dropped as shown in FIG. 18. After sharing the information, the updated graphical representation of the second application 300 is captured. The updated graphical representation of the first application 200 is displayed. The updated graphical representation of the first application 200 displays the updated representation of the second application 300 in the background portion of the updated graphical representation of the first application 200 as shown in FIG. 18.

The information may be copied from the "Past-App" either by using system calls of the operating system or by applying Optical Character Recognition (OCR) techniques (in case of text) known in the prior arts on the specified area of the background. In another embodiment, the sharing of information from the "Present-App" to one of the "Past-state" of the "Past-App" is described below:

The user first selects the "Past-State" of the "Past-App" and then performs the operation on the "Past-State" of the "Past-App" in similar manner as described in above example scenarios.

Similarly, for sharing the information from one of the "Past-State" of the "Past-App" to the "Present-App", the below description is provided:

The user first selects the "Past-State" of the "Past-App" and then performs the operation on the "Past-State" of the "Past-App" in similar manner as discussed above.

Figure 19:
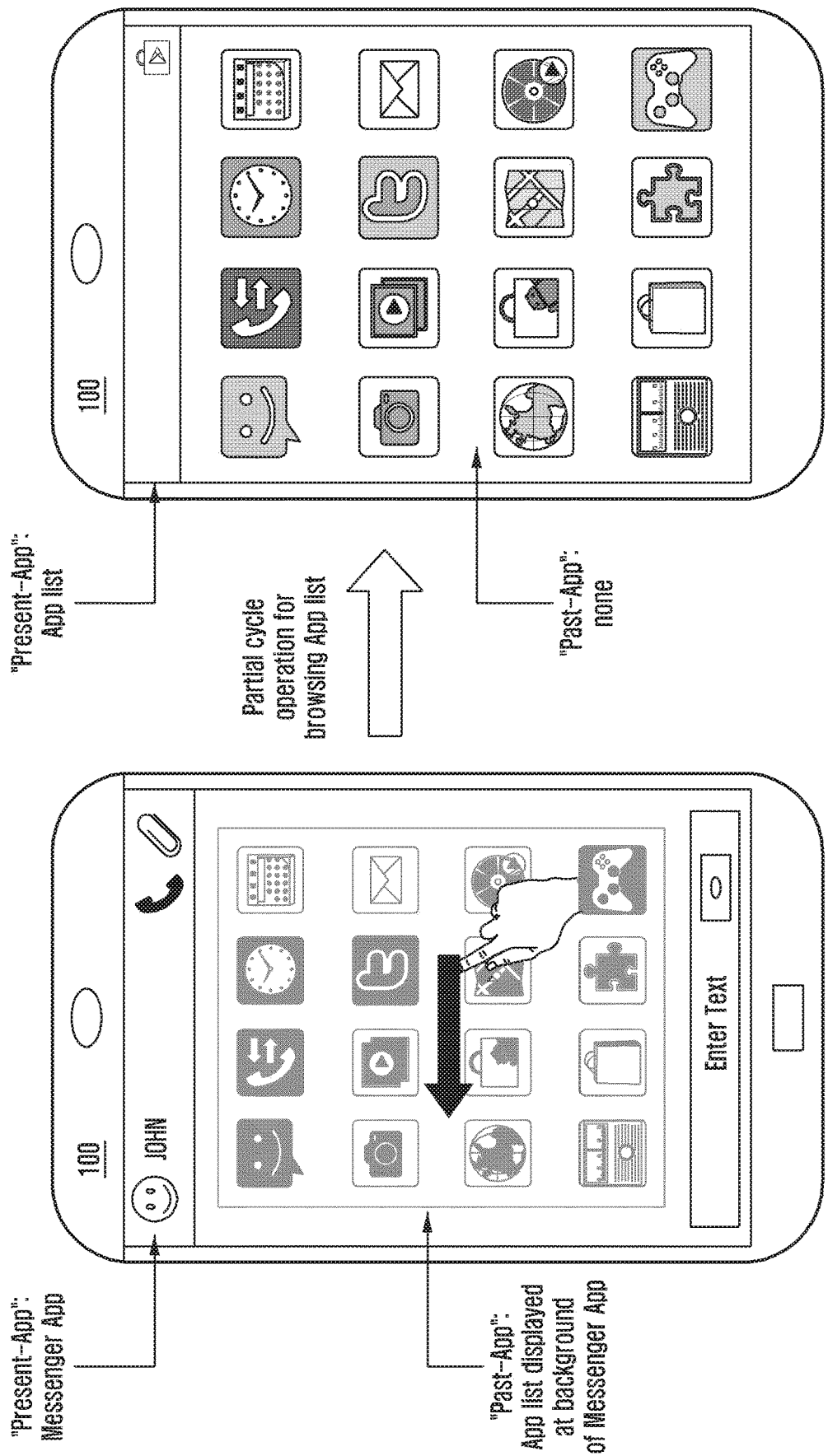
FIG. 19 is an example scenario in which a partial cycle operation is performed to access application list, according to an embodiment of the present disclosure.

FIG. 19 is an example scenario in which a partial cycle operation is performed to access an application list, according to an embodiment of the present disclosure. Consider the first application 200 is the Messenger application and the second application 300 is the App list available in the electronic device 100 as shown in FIG. 19. The first application 200 is the "Present-App" which is active and the second application 300 is the "Past-App". The graphical representation of the second application 300 is displayed within the graphical representation of the first application 200.

The controller unit 120 detects the user input on the portion of the graphical representation of the second application 300 displayed in the background portion of the graphical representation of the first application 200. The controller unit 120 detects the application interaction event based on the user input. The graphical representation of the first application 200 displayed on the screen of the electronic device 100 is displayed. The user can browse available applications by performing the unique gesture (double tap with one finger and hold with at least one finger) while providing user input gesture for swiping the App list.

FIG. 20 is an example scenario in which a complete cycle operation is performed to access an application list, according to an embodiment of the present disclosure.

Referring to FIG. 20, consider the first application 200 is the Messenger application and the second application 300 is the App list available in the electronic device 100 as shown in the FIG. 19. The first application 200 is the "Present-App" which is active and the second application 300 is the "Past-App". The graphical representation of the second application 300 is displayed within the graphical representation of the first application 200.

The controller unit 120 detects the user input on the portion of the graphical representation of the second application 300 displayed in the background portion of the graphical representation of the first application 200. The controller unit 120 detects the application interaction event based on the user input. The user can browse available applications by performing the unique gesture (i.e., double tap with two fingers and hold with the at least one finger) while providing user input gesture for swiping the App list. The updated graphical representation of the second application 300 is captured and the updated graphical representation of the first application 200 is displayed. The updated graphical representation of the first application 200 displays the updated representation of the second application 300 in the background portion of the updated graphical representation of the first application 200.

Figure 21:
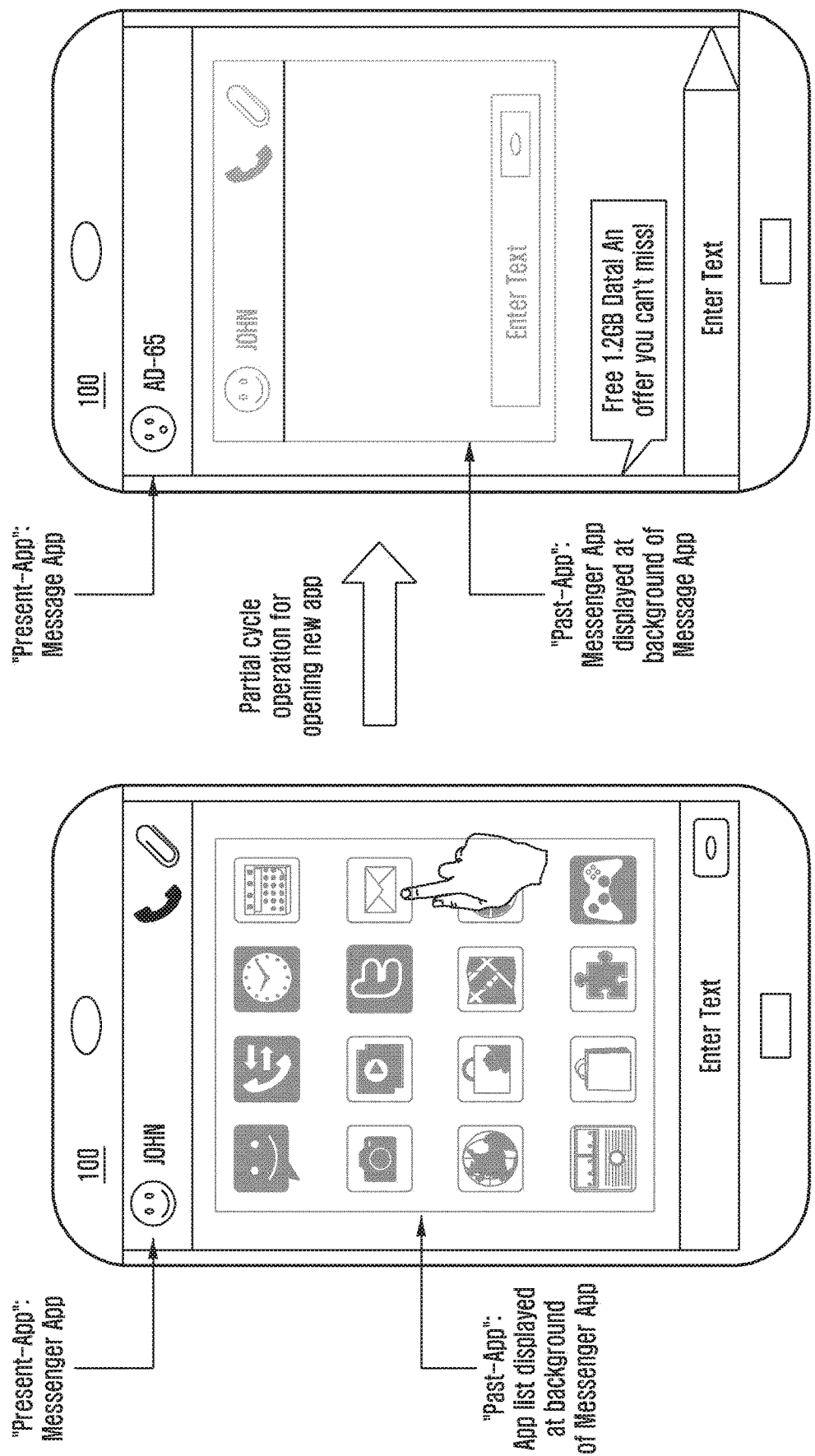
FIG. 21 is an example scenario in which a partial cycle operation is performed to open a new application, according to an embodiment of the present disclosure.

FIG. 21 is an example scenario in which a partial cycle operation is performed to open a new application, according to an embodiment of the present disclosure.

Referring to FIG. 21, consider the first application 200 is the Messenger application and the second application 300 is the App list available in the electronic device 100 as shown in FIG. 21. The first application 200 is the "Present-App" which is active and the second application 300 is the "Past-App". The graphical representation of the second application 300 is displayed within the graphical representation of the first application 200.

The controller unit 120 detects the user input on the portion of the graphical representation of the second application 300 displayed in the background portion of the graphical representation of the first application 200. The controller unit 120 detects the application interaction event based on the user input. The graphical representation of the first application 200 displayed on the screen of the electronic device 100 is captured. The user performs a unique gesture (i.e., double tap (one finger) and hold with the at least one finger) while providing the user input gesture for opening the new application (i.e., double tap with the finger on the icon). The second application 300 changes to the Message application and the second application 300 is removed from the App list. The updated graphical representation of the second application 300 is displayed. The updated graphical representation of the second application 300 displays the captured graphical representation of the first application 200 in the background portion of the updated graphical representation of the second application 300.

Figure 22:
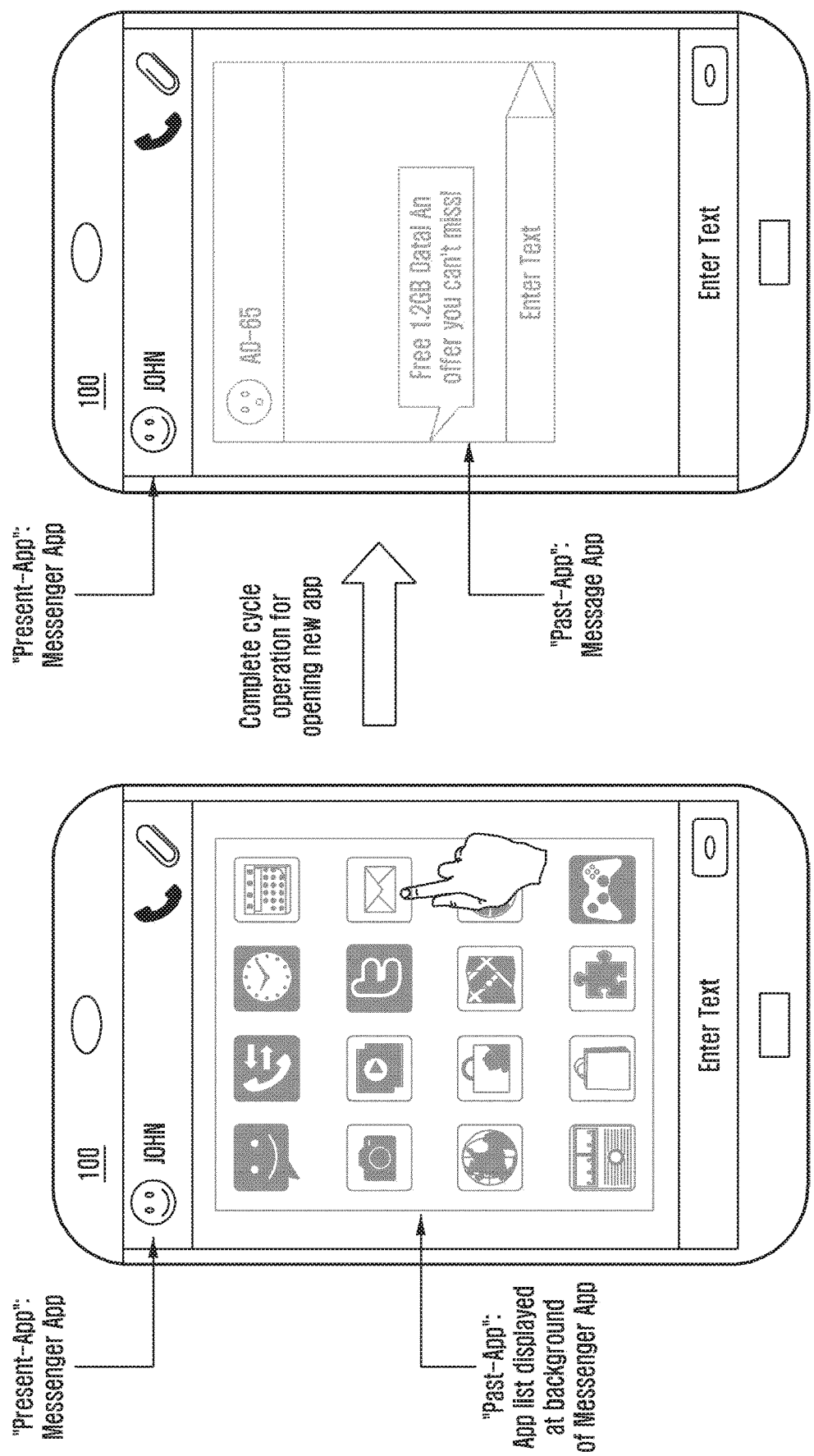
FIG. 22 is example scenario in which a complete cycle operation is performed to open a new application, according to an embodiment of the present disclosure.

FIG. 22 is an example scenario in which a complete cycle operation is performed to open a new application, according to an embodiment of the present disclosure.

Referring to FIG. 22, consider the first application 200 is the Messenger application and the second application 300 is the App list available in the electronic device 100 as shown in the FIG. 21. The first application 200 is the "Present-App" which is active and the second application 300 is the "Past-App". The graphical representation of the second application 300 is displayed within the graphical representation of the first application 200.

The controller unit 120 detects the user input on the portion of the graphical representation of the second application 300 displayed in the background portion of the graphical representation of the first application 200. The controller unit 120 detects the application interaction event based on the user input. The user performs the unique gesture (i.e., double tap (two finger) and hold with the at least one finger) while providing the user input gesture for opening the new application (double tap with the finger on the icon). The updated graphical representation of the second application 300 is captured and the updated graphical representation of the first application 200 is displayed. In response, the second application 300 is changed to the Message App. The updated graphical representation of the first application 200 displays the updated representation of the second application 300 in the background portion of the updated graphical representation of the first application 200.

Figure 23:
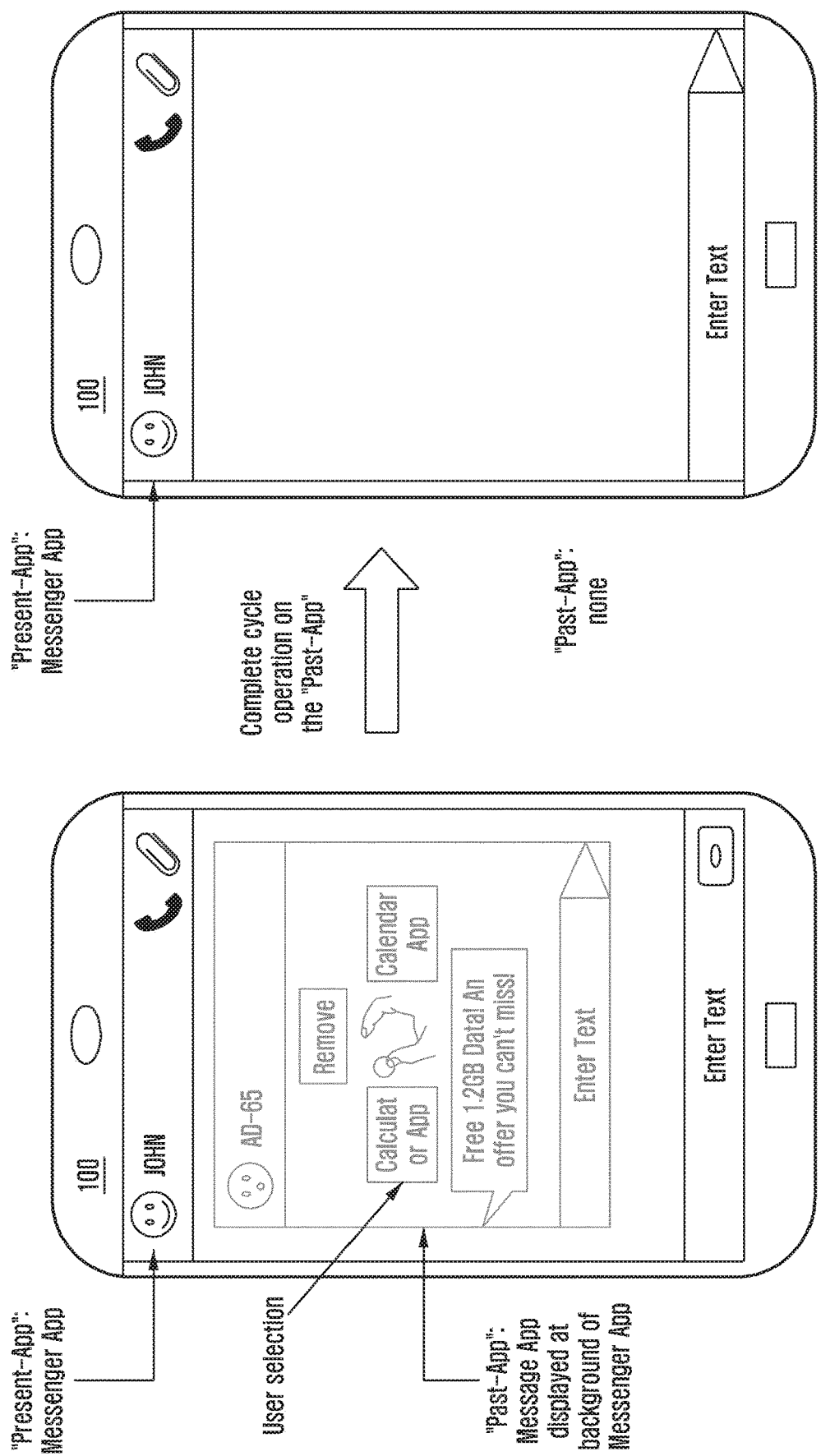
FIG. 23 is an example scenario in which a complete cycle operation is performed to remove a "Past-App", according to an embodiment of the present disclosure.

FIG. 23 is an example scenario in which a complete cycle operation is performed to remove a "Past-App", according to an embodiment of the present disclosure.

Referring to FIG. 23, the proposed method allows the user to remove the "Past-App" from the background of the "Present-app" if the user no longer requires transparency effect.

Figure 24A:
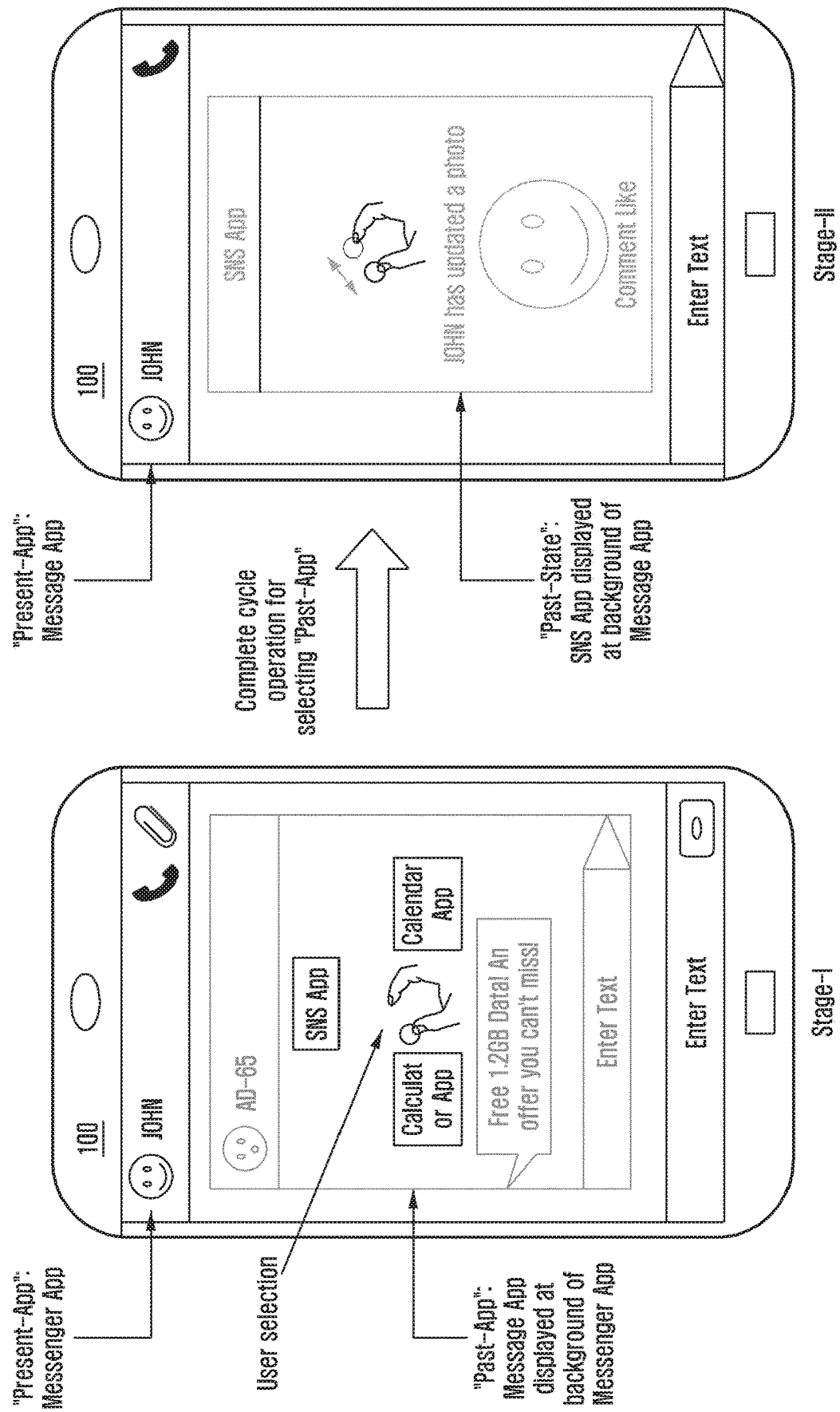
FIGS. 24A, 24B, and 24C are example scenarios in which a complete cycle operation is performed to share information from a "Past-State" of a "Past-App" to the "Present-App", according to an embodiment of the present disclosure.
Figure 24B:
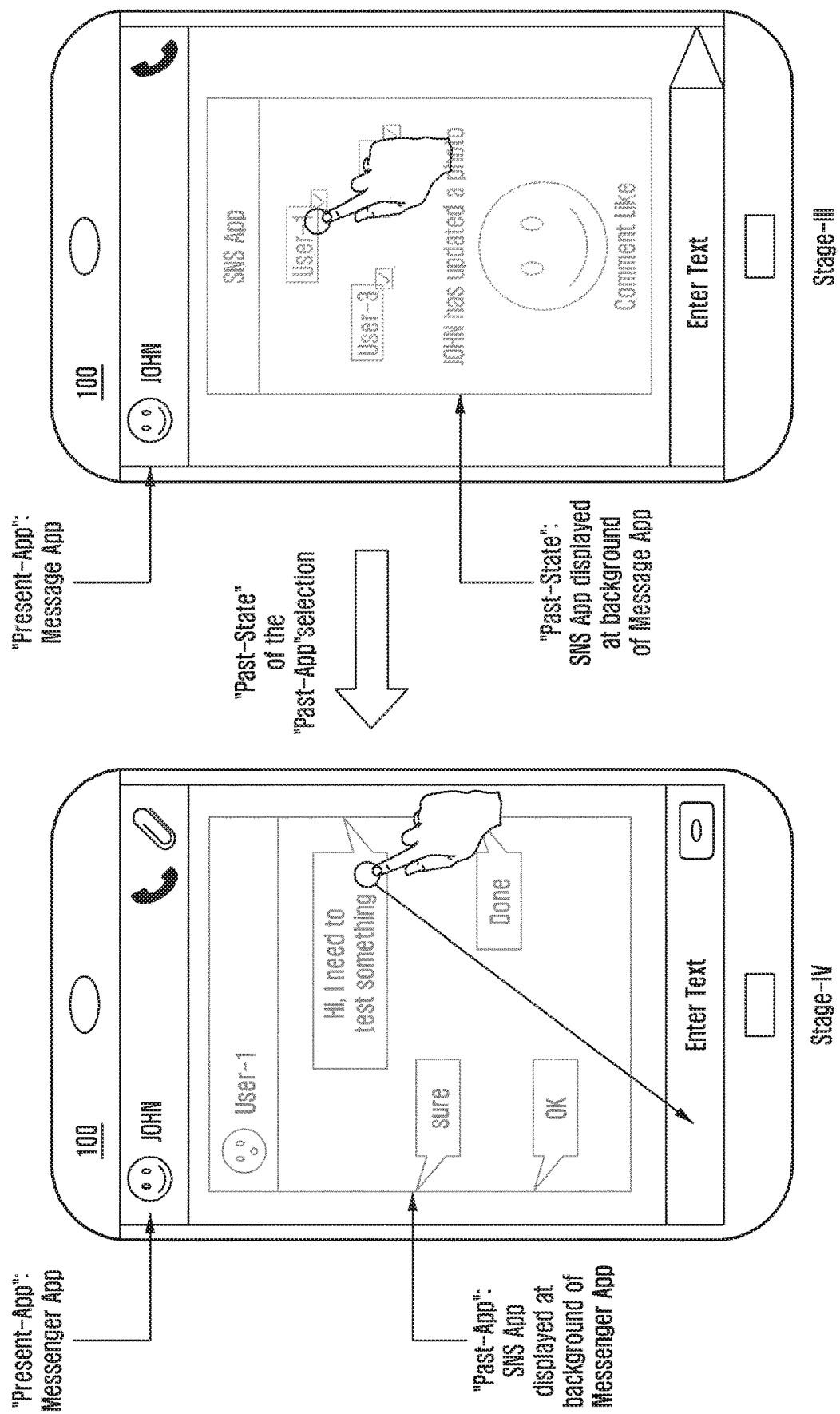
Figure 24C:
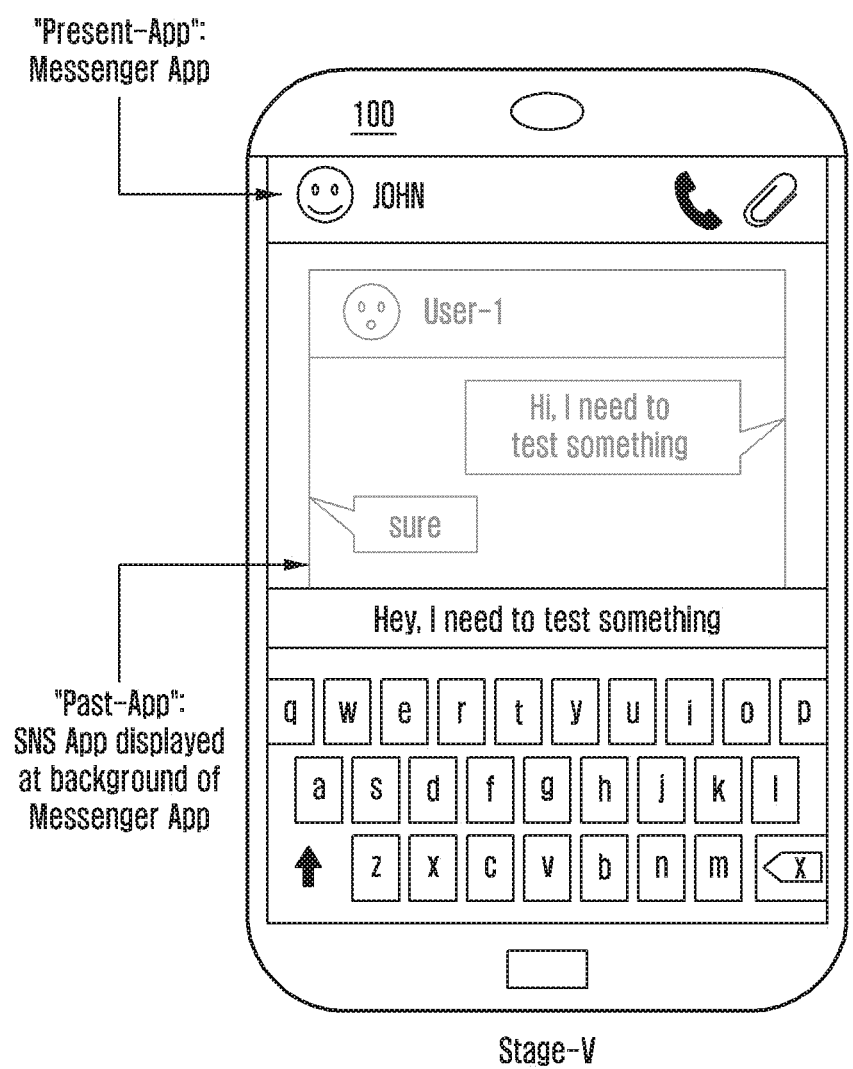

FIGS. 24A to 24C are example scenarios in which a complete cycle operation is performed to share information from a "Past-State" of a "Past-App" to a "Present-App", according to an embodiment of the present disclosure.

Referring to FIGS. 24A to 24C, in Stage-I: the "Present-App" is the Messenger application and the "Past-App" is "Messages" application. The user triggers for the "Past-App" selection and selects the "SNS" application as the "Past-App" in the complete cycle operation.

Stage-II: The "Present-App" is the Messenger application and the "Past-App" is "SNS" application. The user triggers for the "Past-State" access in the complete cycle operation.

Stage-III: The "Present-App" is Messenger application and the "Past-App" is "SNS" application. The user triggers the "Past-State" selection. The selected "Past-State" of "Past-App" is opened in the complete cycle operation (as described in Stage-II).

Stage-IV: The "Present-App" is the Messenger application and the "Past-App" is the "SNS" application. The user triggers information sharing from the "Past-App" to the "Present-App" in the complete cycle operation.

Stage-V: The "Present-App" is the Messenger application and the "Past-App" is the "SNS" application. The information sharing from the "Past-App" to the "Present-App" is completed.

Figure 25:
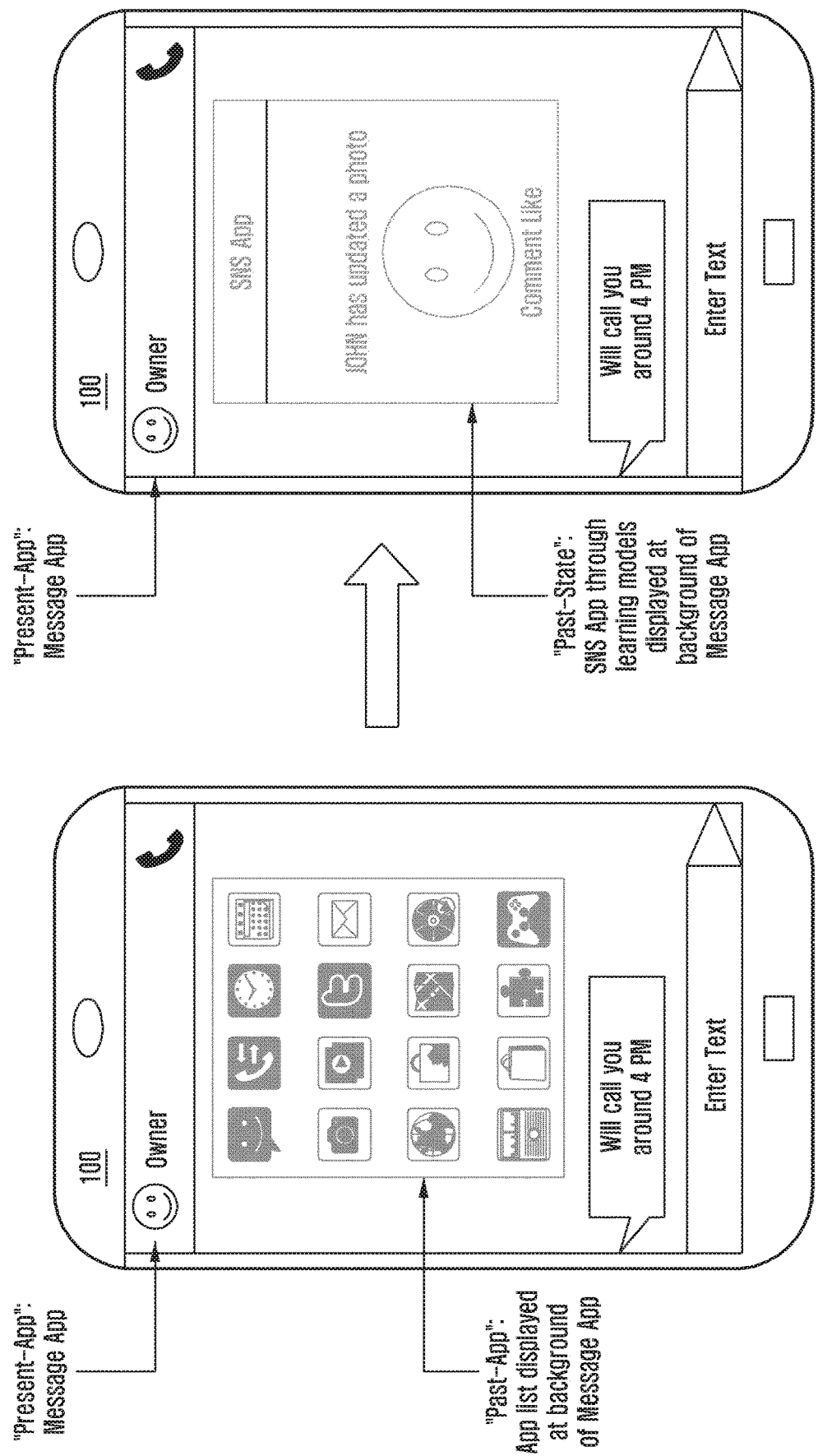
FIG. 25 is an example scenario in which a most probable "Past-Apps" are automatically suggested based on a learning model, according to an embodiment of the present disclosure.

FIG. 25 is an example scenario in which most probable "Past-Apps" are automatically suggested based on a learning model, according to an embodiment of the present disclosure.

Referring to FIG. 25, by using the learning models (known according to the related art), the controller unit 120 captures and learns a pattern of the user indicating the usage of various applications simultaneously. The learning models function in response to the user enabling such feature in the electronic device 100. Using the learning models, the controller unit 120 can automatically suggests the "Past-App" as well as the "Past-State" of the "Past-App" automatically.

"Past-App" Suggestion:

The following example scenario handles the case where there is no "Past-App". In case when the learning model feature is OFF, a home screen of the electronic device 100 is displayed in the background portion of the "Present-App". However, when the learning model feature is turned ON, the leaning model based on the user usage pattern suggests the application which holds the highest probability to be used with the "Present-App". As shown in FIG. 25, based on the user usage pattern, the learning model determines that whenever the "Message" app is the "Present-App", the user is most probable to use the "SNS" app. Thus, instead of displaying the home screen in the background of the "Present-App", the "SNS" app is displayed.

The Learning Model may determine the pattern for most probable application that can be used along with the "Present-App" in two ways as described below:

a. Learn the application that are most probable to be the "Past-App" of the "Present-App"

b. Learn the application that are most probable to be the "Present-App" for which the "Present-App" is a "Past-App"

Figure 26:
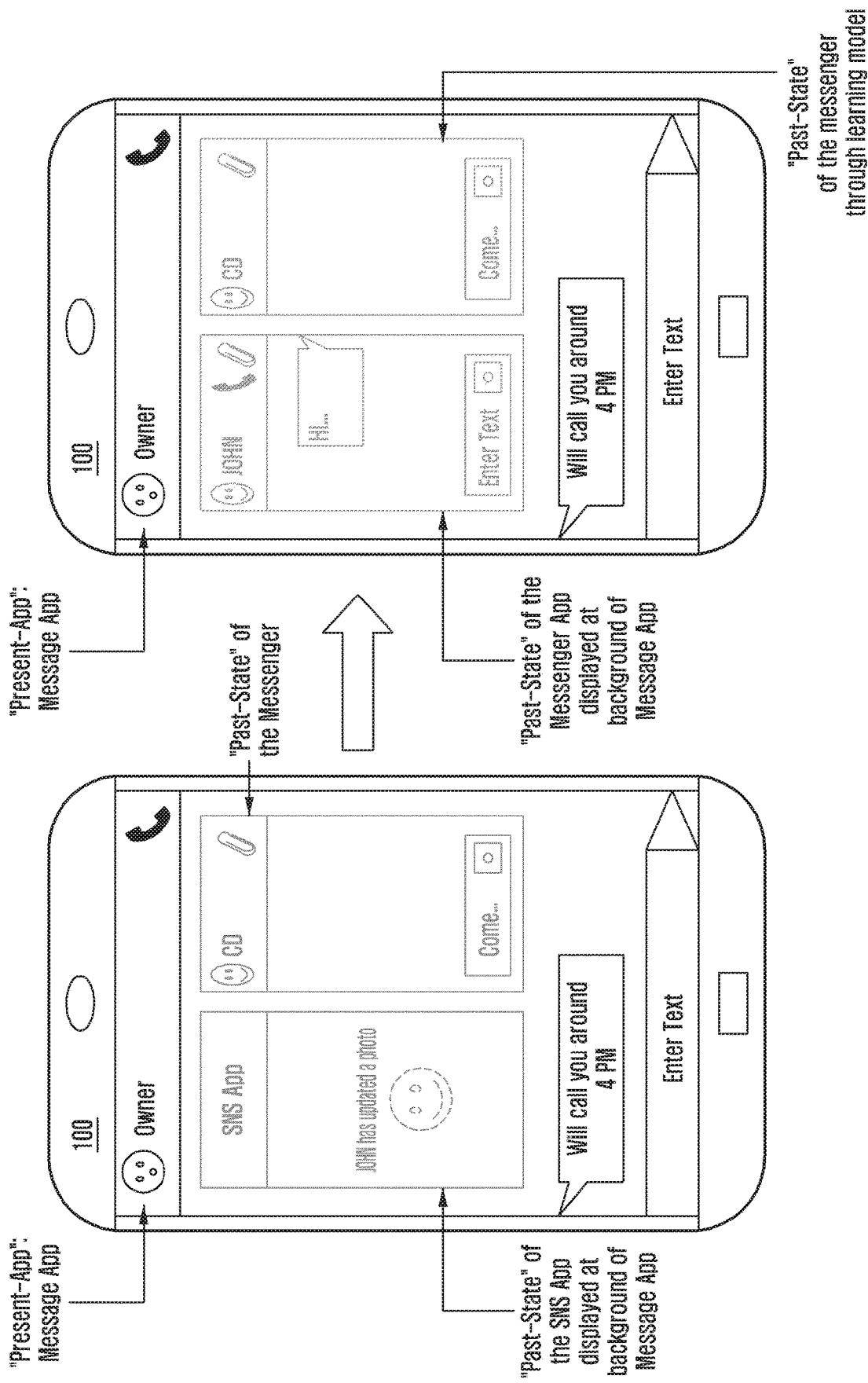
FIG. 26 is an example scenario in which a most probable "Past-State" of same "Past-App" is automatically suggested based on a learning model, according to an embodiment of the present disclosure.

FIG. 26 is an example scenario in which a most probable "Past-State" of the same "Past-App" is automatically suggested based on the learning model, according to an embodiment of the present disclosure.

"Past-State" Suggestion:

Referring to FIG. 26, the following example scenario handles the case when there is no or less number of "Past-States" of the "Past-App" and the user through specific user gestures specifies for the "Past-States" of the same "Past-App". When the learning model feature is OFF, the "Past-State" of the second most-recent "Past-App" is displayed in the background of the "Present-App". However, when the learning model feature is turned ON, the learning model based on the user usage pattern suggests the "Past-State" which holds the highest probability to be used with the "Present-App". In this case, all the "Past-States" are of the same "Past-App".

Referring to FIG. 26, based on the user usage pattern, the learning model determines that whenever the "Messages" App is the "Present-App" and "Messenger" App is the "Past-App", the user is most probable to use some particular "Past-State" of the "Past-App" i.e., "Messenger" App. Thus, instead of displaying the "Past-State" of "SNS" App in the background of the "Present-App", the most probable "Past-State" of "Messenger" App is displayed.

Figure 27:
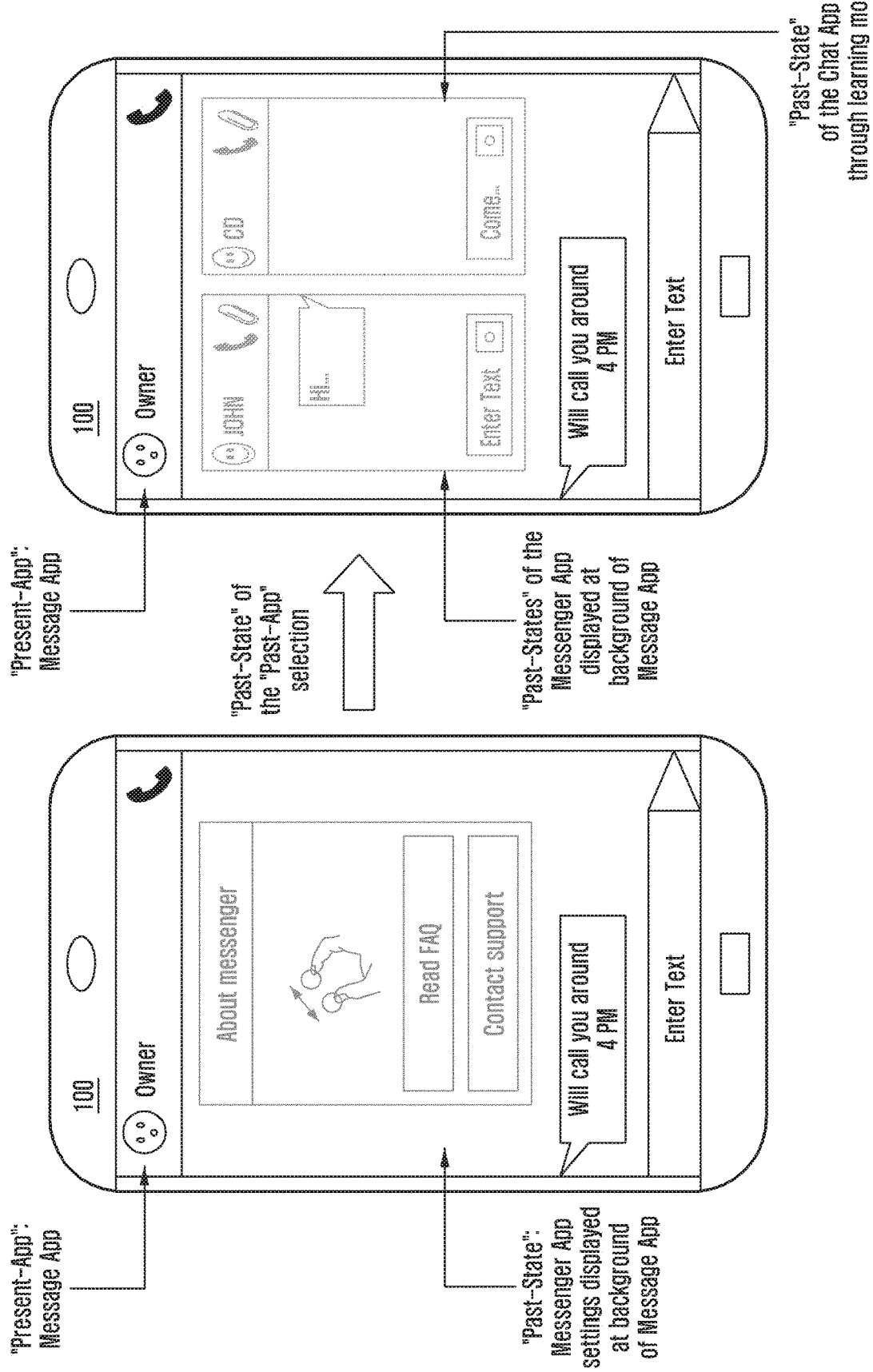
FIG. 27 is an example scenario in which a most probable "Past-State" of a most probable "Past-App" is automatically displayed based on a learning model, according to an embodiment of the present disclosure.

FIG. 27 is an example scenario in which a most probable "Past-State" of a most probable "Past-App" is automatically displayed based on the learning model, according to an embodiment of the present disclosure.

"Past-State" of "Past-App" Suggestion:

Referring to FIG. 27, The following example scenario handles the case when there is no or less number of the "Past-State" of the "Past-App" and the user through specific user gesture specifies to have a most probable "Past-State" of the most probable "Past-App". The learning model based on the user usage pattern suggests the most probable "Past-State" of the most probable "Past-App" to be used with the "Present-App" (i.e., the "Past-State" is of a different "Past-App").

Referring to FIG. 27, based on the user usage pattern, the learning model determines that whenever the "Messages" app is the "Present-App", the user is most probable to use a particular "Past-App" (i.e., "Chat App"). Moreover, the user is most probable to use some particular "Past-State" of this most probable "Past-App" (i.e. "Chat App"). Thus, the "Past-State" of the "Chat App" is displayed in the background of the "Present-App" along with the "Past-State" of "Messenger" App.

Figure 28:
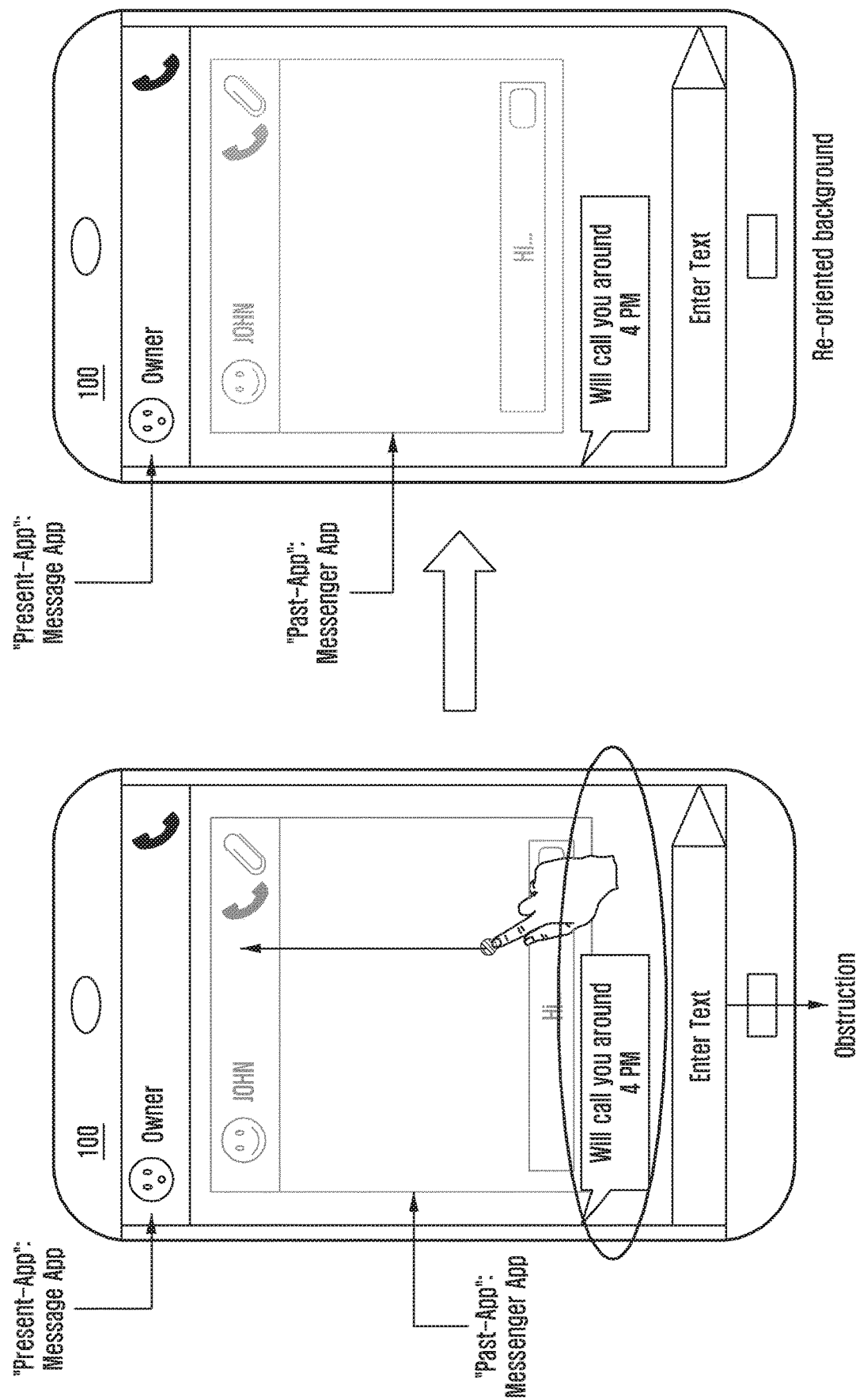
FIG. 28 is an example scenario in which a graphical representation of a "Past-App" is resized, according to an embodiment of the present disclosure.

FIG. 28 is an example scenario in which a graphical representation of a "Past-App" is resized, according to an embodiment of the present disclosure.

Resizing (i.e., Reorienting) of the Graphical Representation of the "Past-App":

Referring to FIG. 28, consider a scenario where the content of the "Present-App" obstructs the visibility of the graphical representation of the "Past-App". In this case, the user performs the gesture (For example: three finger hold and drag) to drag, move, and resize the position of the graphical representation of the "Past-App". In an embodiment, the graphical representation of the second application 300 displayed in the background portion of the first application 200 is re-sized.

Figure 29:
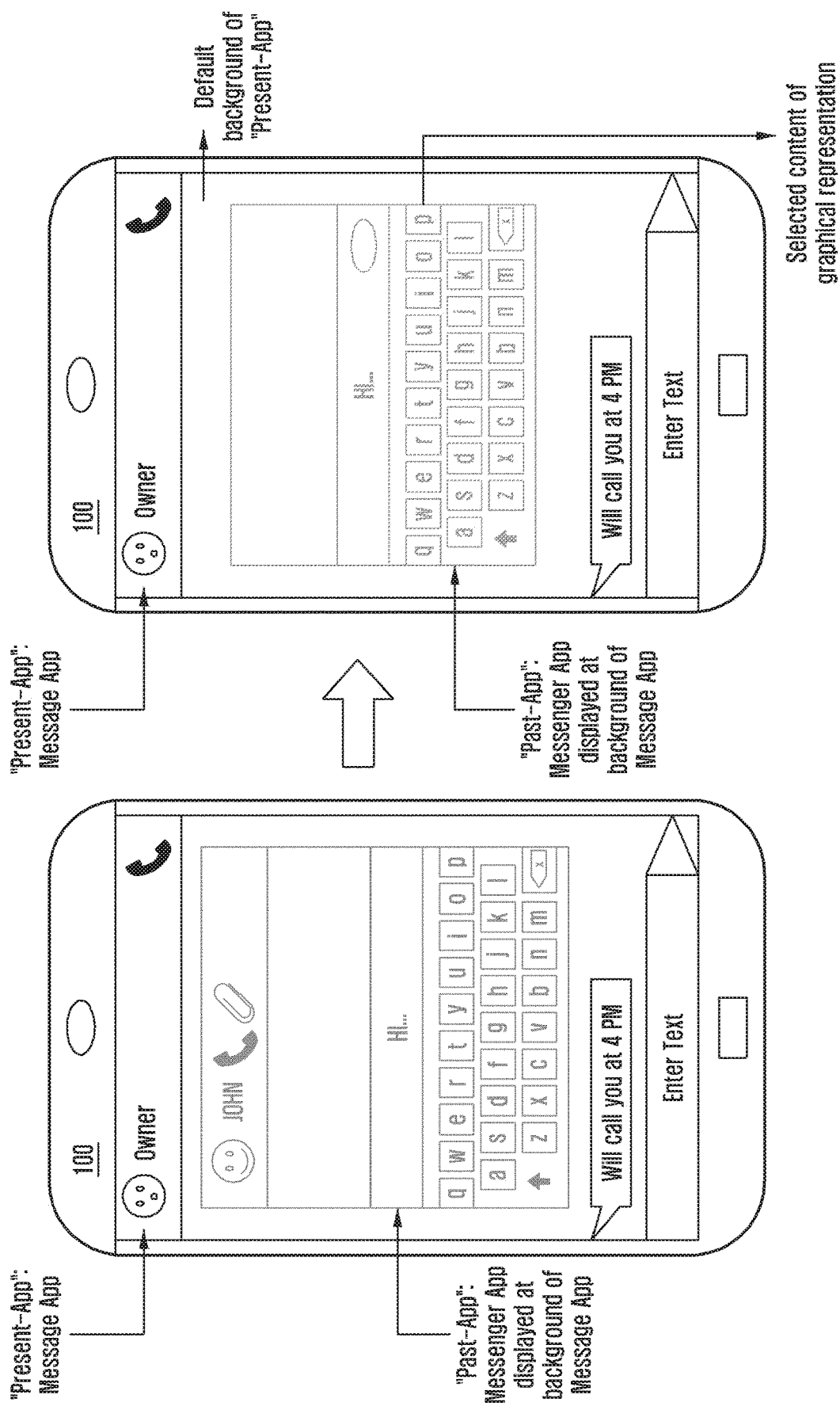
FIG. 29 is an example scenario in which a specific portion of the graphical representation of a "Past-App" is selected by a user, according to an embodiment of the present disclosure.

FIG. 29 is an example scenario in which a specific portion of the graphical representation of the "Past-App" is selected by the user, according to an embodiment of the present disclosure.

Content Selection of the Graphical Representation:

Referring to FIG. 29, consider a scenario where the user wishes to have some part of the graphical representation of the "Past-App" to be displayed along with the background portion of the "Present-App". In this case, the user performs the gesture (e.g. Three finger double tap) to select the desired content of the graphical representation of the "Past-App" to be displayed. The selected content is displayed and the default background of the "Present-App" is displayed in remaining portion, if specified by the user as shown in FIG. 29. The graphical representation of the second application 300 in the at least one portion and the graphical representation of the default background in other portions in the background portion of the first application 200 may be displayed.

Figure 30A:
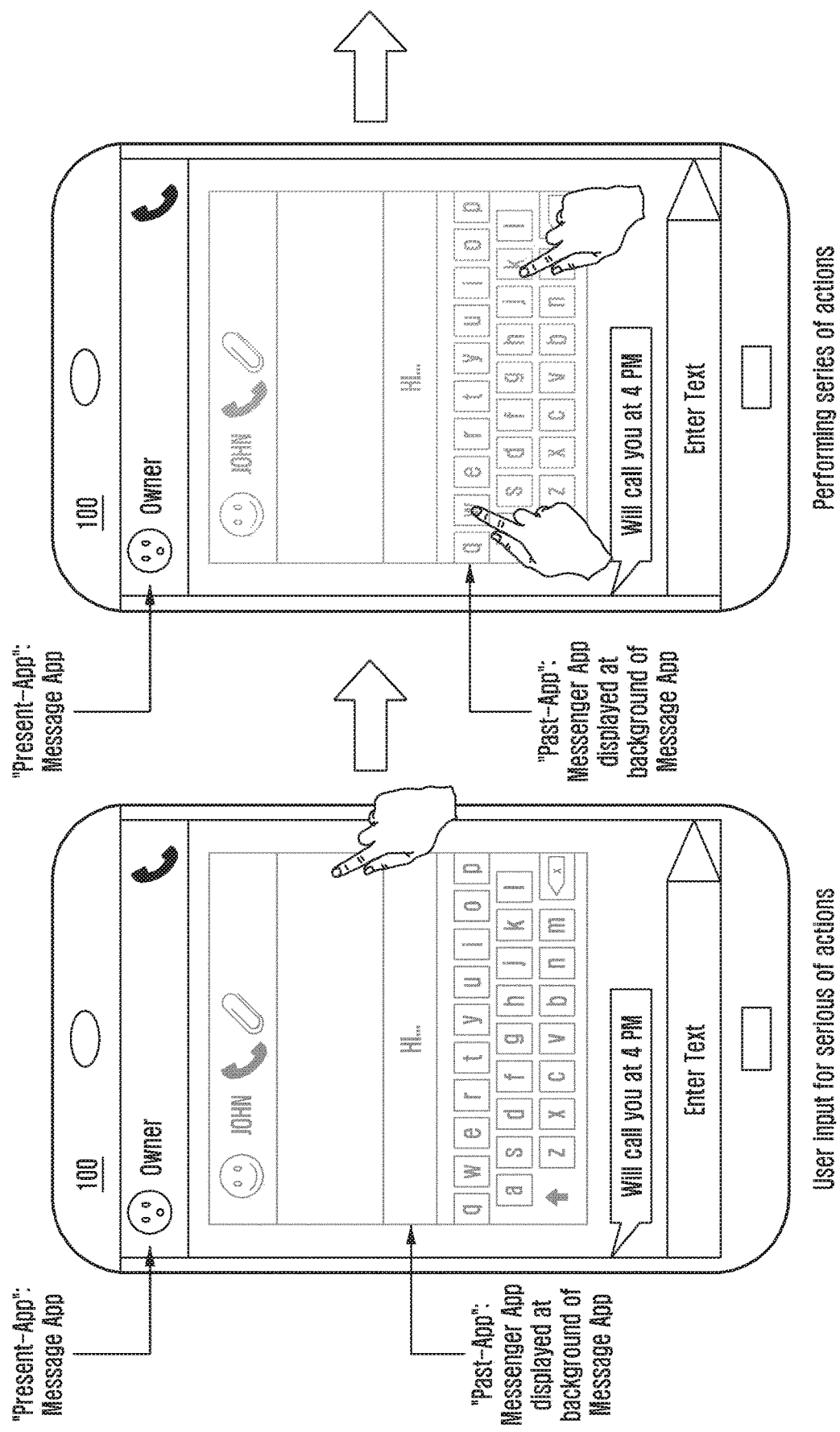
FIGS. 30A and 30B are example scenarios in which a series of actions are performed on a "Past-App", according to an embodiment of the present disclosure.
Figure 30B:
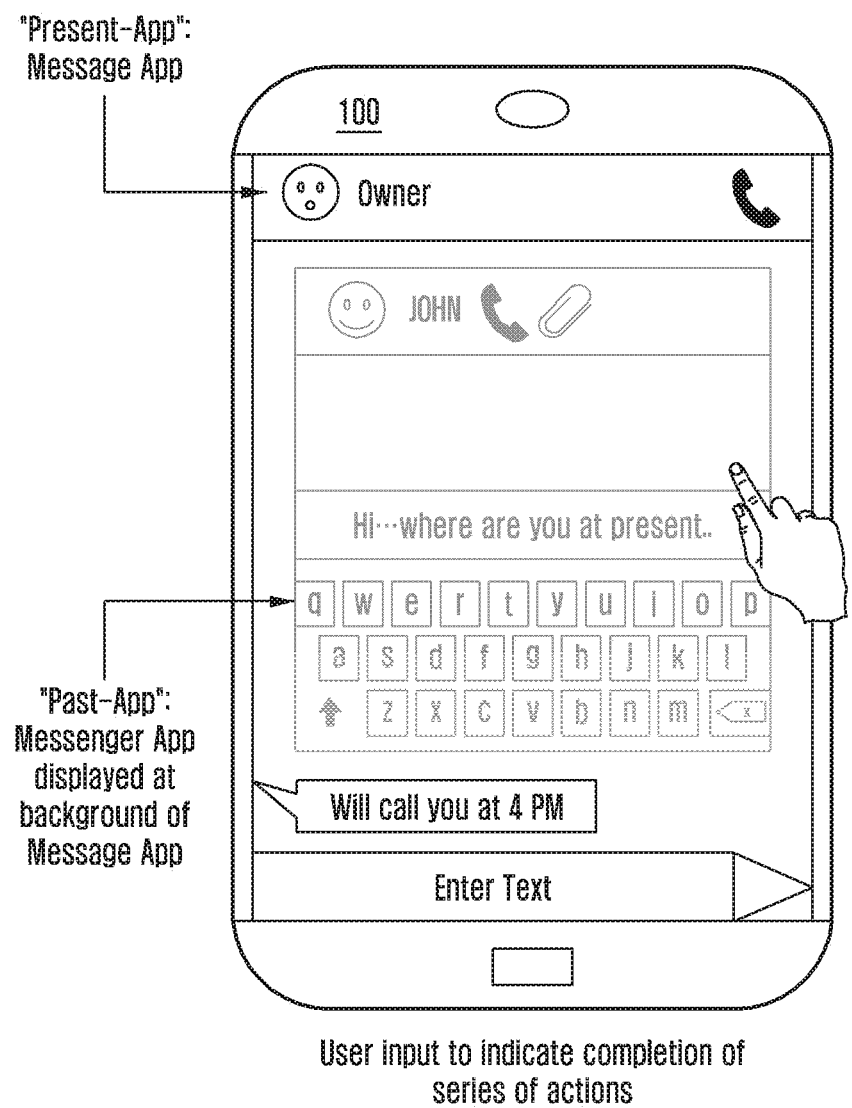

FIGS. 30A and 30B are example scenarios in which series of actions are performed on a "Past-App", according to an embodiment of the present disclosure.

Enabling Series of Actions:

Referring to FIGS. 30A and 30B, consider a scenario in which the user wishes to perform the series of actions on the "Past-App" through the graphical representation of the "Past-App" on the background portion of the "Present-App. In this case, the user performs the gesture (e.g., Three finger Tap+Pinch Out) to indicate the controller unit 120 about the series of actions. After receiving the indication, the controller unit 120 tracks the user input. After completion, the user performs the gesture (i.e., user input such as Three finger Tap+Pinch In) indicates the controller unit 120 about completion of series of actions. Upon this indication, the system executes the operations on the "Past-App" as per the series of user input and displays the updated graphical representation of the "Past-App" as shown in the FIGS. 30A and 30B.

Figure 31:
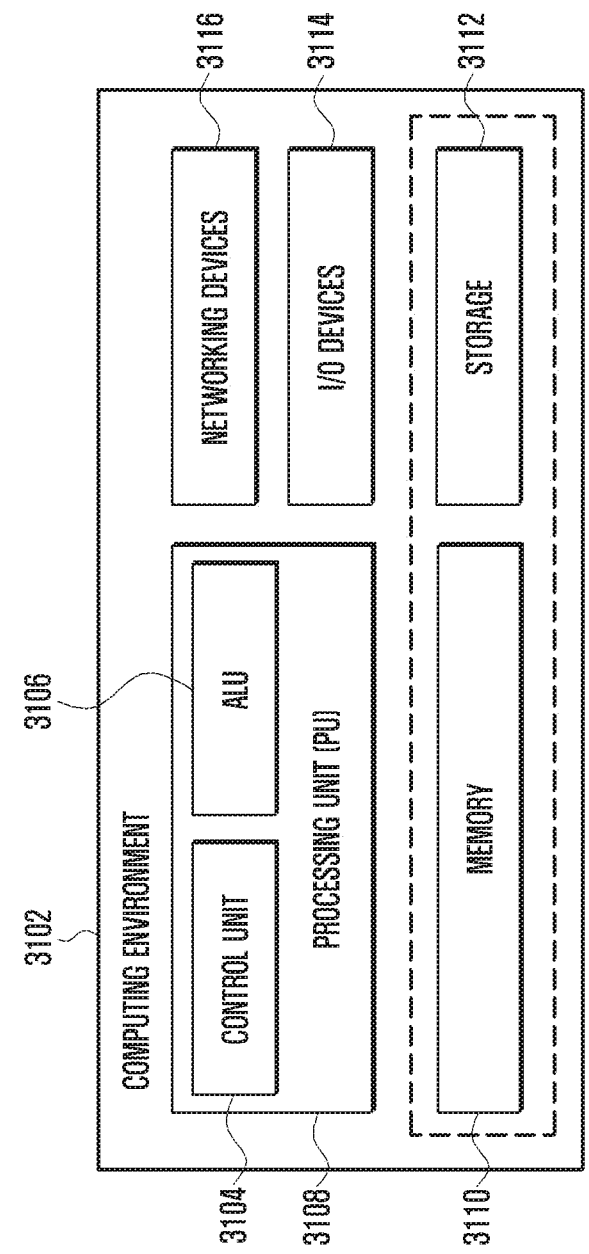
FIG. 31 illustrates a computing environment implementing the method and system of managing applications of an electronic device, according to an embodiment of the present disclosure.

FIG. 31 illustrates a computing environment implementing the method and system of managing applications of an electronic device, according to an embodiment of the present disclosure.

Referring to FIG. 31, the computing environment 3102 of the electronic device 100 comprises at least one processing unit 3108 that is equipped with a control unit 3104 and an arithmetic logic unit (ALU) 3106, a memory 3110, a storage unit 3112, plurality of networking devices 3116, and a plurality of input/output (I/O) devices 3114. The processing unit 3108 processes the instructions of the programs. The processing unit 3108 receives commands from the control unit 3104 in order to perform the processing. Any logical and arithmetic operations involved in the execution of the instructions are computed with the help of the ALU 3106.

The overall computing environment 3102 can be composed of multiple homogeneous or heterogeneous cores, multiple central processing units (CPUs) of different kinds, special media and other accelerators. The plurality of processing units 3108 may be located on a single chip or over multiple chips.

Programs comprising instructions and codes used for the implementation thereof are stored in either the memory unit 3110 or the storage 3112 or both. At the time of execution, the instructions may be fetched from the corresponding memory 3110 or storage unit 3112, and executed by the processing unit 3108.

In case of any hardware implementations, various networking devices 3116 or external I/O devices 3114 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 to 3, 4A to 4C, 5A to 5C, 6 to 9, 10A and 10B, 11 and 12, 13A to 13D, 14A to 14D, 15 to 23, 24A to 24C, 25 to 29, 30A and 30B, and 31 include blocks which can be at least one of a hardware device, or a combination of hardware device and software units.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for managing applications of an electronic device, the method comprising:
   in response to receiving a user input on a background of a first application, selecting, by the electronic device, at least one second application from a plurality of past applications;
   displaying a second graphic associated with the at least one second application within a first graphic associated with the first application;
   detecting a user input on at least one portion of the second graphic displayed in the at least one background portion of the first graphic; and
   performing at least one action on the at least one second application based on the user input while the second graphic is displayed in the first graphic,
   wherein the displaying the second graphic within the first graphic comprises:
      displaying the first graphic on a first image layer, and
      displaying the second graphic on a second image layer overlapping the first image layer, the second image layer being displayed behind the first image layer of the first graphic associated with the first application, and wherein a visual effect is applied to at least one of the first graphic displayed on the first image layer or the second graphic displayed on the second image layer.

2. The method of claim 1, wherein the second graphic comprises an image of the at least one second application.

3. The method of claim 1, wherein the performing of the at least one action on the second application based on the user input while the second graphic is displayed in the first graphic further comprises:
  detecting an application interaction event based on the user input;
  capturing the first graphic displayed on the screen of the electronic device;
  performing at least one action on the at least one second application based on the application interaction event; and
  displaying an updated second graphic based on the at least one action,
  wherein the updated second graphic includes the captured first graphic in at least one background portion of the updated second graphic.

4. The method of claim 1, wherein the performing of the at least one action on the second application based on the user input while the second graphic is displayed in the first graphic further comprises:
  detecting an application interaction event based on the user input;
  performing at least one action on the at least one second application based on the application interaction event;
  capturing an updated second graphic based on the at least one action; and
  displaying an updated first graphic,
  wherein the updated first graphic includes the updated second graphic in at least one background portion of the updated first graphic.

5. The method of claim 1, wherein the performing of the at least one action on the second application further comprises:
  displaying a third graphic within the first graphic, the third graphic being associated with at least one state of the at least one second application;
  detecting another user input on at least one portion of the third graphic; and
  performing at least one action on the at least one state of the at least one second application based on the other user input while accessing the first application.

6. The method of claim 1, wherein the at least one action comprises at least one of:
  setting the at least one second application as a foreground application,
  sharing a data item from the first application to the at least one second application,
  sharing a data item from the at least one second application to the first application,
  invoking functionality of the at least one second application,
  browsing available applications,
  invoking the at least one second application,
  invoking at least one state of the at least one second application,
  resizing the second graphic displayed in the background portion of the first application, or
  displaying the second graphic in at least one portion and a graphic of a default background in other portions in the background portion of the first application.

7. The method of claim 6, wherein the sharing a data item from the first application to the at least one second application comprises:
  receiving a first user input of dragging a first object located in the first graphic to the at least one portion of the second graphic, and
  in response to the first user input, inserting the first object located in the first graphic to the second graphic.

8. The method of claim 6, wherein the sharing a data item from the at least one second application to the first application comprises:
  receiving a second user input of dragging a second object located in the second graphic to the at least one portion of the first graphic, and
  in response to the second user input, inserting the second object located in the second graphic to the first graphic.

9. The method of claim 1, wherein the user input comprises a single input and a series of inputs performed while the second graphic is displayed in the first graphic.

10. The method of claim 1, wherein the at least one second application is one of a background application, a recently accessed application, a user defined application, or an application dynamically defined based on at least one of user activities, user behavior, user context, content of the first application, or context of the first application.

11. The method of claim 1, wherein the selecting, by the electronic device, of the at least one second application from a plurality of past applications comprises selecting a most recent application from the plurality of past applications.

12. An electronic device comprising:
  a display;
  a processor; and
  a memory electrically coupled with the processor, storing one or more applications associated with one or more preset conditions,
  wherein the memory stores instructions executable by the processor to:
    in response to receiving a user input on a background of a first application, select, by the processor of the electronic device, at least one second application from a plurality of past applications,
    display a second graphic associated with the at least one second application within a first graphic associated with the first application,
    detect a user input on at least one portion of the second graphic displayed in the at least one background portion of the first graphic, and
    perform at least one action on the at least one second application based on the user input while the second graphic is displayed in the first graphic,
  wherein the instructions for displaying the second graphic within the first graphic comprise instructions to:
    display the first graphic on a first image layer, and
    display the second graphic on a second image layer overlapping the first image layer, the second image layer being displayed behind the first image layer of the first graphic associated with the first application, and
  wherein a visual effect is applied to at least one of the first graphic displayed on the first image layer or the second graphic displayed on the second image layer.

13. The electronic device of claim 12, wherein the second graphic comprises an image of a second graphic, and an image of at least one state of the at least one second application.

14. The electronic device of claim 12, wherein the instructions for performing the at least one action on the second application based on the user input while the second graphic is displayed in the first graphic comprise instructions to:
- detect an application interaction event based on the user input;
- capture the first graphic displayed on the screen of the electronic device;
- perform at least one action on the at least one second application based on the application interaction event; and
- display an updated second graphic based on the at least one action,
- wherein the updated second graphic includes the captured first graphic in at least one background portion of the updated second graphic.

15. The electronic device of claim 12, wherein the instructions for performing the at least one action on the second application based on the user input while the second graphic is displayed in the first graphic comprise instructions to:
- detect an application interaction event based on the user input;
- perform at least one action on the at least one second application based on the application interaction event;
- capture an updated second graphic based on the at least one action; and
- display an updated first graphic,
- wherein the updated first graphic includes the updated second graphic in at least one background portion of the updated first graphic.

16. The electronic device of claim 12, wherein the instructions for performing the at least one action on the second application based on the user input comprises instructions to:
- display a third graphic within the first graphic, the third graphic being associated with at least one state of the at least one second application;
- detect another user input on at least one portion of the third graphic; and
- perform at least one action on the at least one state of the at least one second application based on the other user input while accessing the first application.

17. The electronic device of claim 12, wherein the at least one action comprises at least one of:
- setting the at least one second application as a foreground application,
- sharing a data item from the first application to the at least one second application,
- sharing a data item from the at least one second application to the first application,
- invoking functionality on the at least one second application,
- browsing available applications,
- invoking the at least one second application,
- invoking at least one state of the at least one second application,
- resizing the second graphic displayed in the background portion of the first application, or
- displaying the second graphic in at least one portion of the background portion of the first application and a graphic of a default background in other portions of the background portion of the first application.

18. The electronic device of claim 17, wherein the sharing a data item from the first application to the at least one second application comprises:
- receiving a first user input of dragging a first object located in the first graphic to the at least one portion of the second graphic, and
- in response to the first user input, inserting the first object located in the first graphic to the second graphic.

19. The electronic device of claim 17, wherein the sharing a data item from the at least one second application to the first application comprises:
- receiving a second user input of dragging a second object located in the second graphic to the at least one portion of the first graphic, and
- in response to the second user input, inserting the second object located in the second graphic to the first graphic.

20. The electronic device of claim 12, wherein the user input comprises a single input and a series of inputs performed while the second graphic is displayed in the first graphic.

21. The electronic device of claim 12, wherein the at least one second application is one of a background application, a recently accessed application, a user defined application, or an application dynamically defined based on at least one of user activities, user behavior, user context, content of the first application, or context of the first application.

22. A non-transitory computer-readable recording medium having recorded thereon at least one program comprising commands which, when executed by at least one processor, performs a method, the method comprising:
- in response to receiving a user input on a background of a first application, selecting, by the at least one processor, at least one second application from a plurality of past applications;
- displaying a second graphic associated with the at least one second application within a first graphic associated with the first application;
- detecting a user input on at least one portion of the second graphic displayed in the at least one background portion of the first graphic; and
- performing at least one action on the at least one second application based on the user input while the second graphic is displayed in the first graphic,
- wherein the displaying the second graphic within the first graphic comprises:
  - displaying the first graphic on a first image layer, and
  - displaying the second graphic on a second image layer overlapping the first image layer, the second image layer being displayed behind the
- first image layer of the first graphic associated with the first application, and
- wherein a visual effect is applied to at least one of the first graphic displayed on the first image layer or the second graphic displayed on the second image layer.

23. The non-transitory computer-readable recording medium of claim 22, wherein the second graphic comprises an image of the at least one second application.

24. The non-transitory computer-readable recording medium of claim 22, wherein the performing of the at least one action on the second application based on the user input while the second graphic is displayed in the first graphic further comprises:
- detecting an application interaction event based on the user input;
- capturing the first graphic displayed on the screen of the electronic device;
- performing at least one action on the at least one second application based on the application interaction event; and
- displaying an updated second graphic based on the at least one action, wherein the updated second graphic includes the captured first graphic in at least one background portion of the updated second graphic.

* * * * *